US009378756B2

(12) United States Patent
Yamada et al.

(10) Patent No.: US 9,378,756 B2
(45) Date of Patent: Jun. 28, 2016

(54) MAGNETIC RECORDING HEAD, MAGNETIC HEAD ASSEMBLY, MAGNETIC RECORDING APPARATUS, AND MAGNETIC RECORDING METHOD

(71) Applicant: KABUSHIKI KAISHA TOSHIBA, Tokyo (JP)

(72) Inventors: Kenichiro Yamada, Tokyo (JP); Hitoshi Iwasaki, Kanagawa-ken (JP); Masayuki Takagishi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/792,357

(22) Filed: Jul. 6, 2015

(65) Prior Publication Data

US 2015/0310880 A1 Oct. 29, 2015

Related U.S. Application Data

(62) Division of application No. 14/623,047, filed on Feb. 16, 2015, now Pat. No. 9,129,617, which is a division of application No. 14/184,406, filed on Feb. 19, 2014, now Pat. No. 8,995,085, which is a division of application No. 12/591,752, filed on Nov. 30, 2009, now Pat. No. 8,767,346.

(30) Foreign Application Priority Data

Nov. 28, 2008 (JP) .................. 2008-305693

(51) Int. Cl.
G11B 5/35 (2006.01)
G11B 5/09 (2006.01)
(Continued)

(52) U.S. Cl.
CPC ............... *G11B 5/09* (2013.01); *G11B 5/1278* (2013.01); *G11B 5/3123* (2013.01); *G11B 5/3133* (2013.01); *G11B 5/35* (2013.01); *G11B 20/10222* (2013.01); *G11B 2005/001* (2013.01)

(58) Field of Classification Search
CPC .......... G11B 2005/0024; G11B 5/314; G11B 5/3146; G11B 5/1278; G11B 5/3903; G11B 2005/0005; G11B 5/02; G11B 2005/0002; G11B 5/3133; G11B 5/09; G11B 5/3123; G11B 5/35; G11B 20/10222; G11B 2005/001
USPC ................................ 360/125.3, 128, 123.11
See application file for complete search history.

(56) References Cited

U.S. PATENT DOCUMENTS

| 3,899,834 A | 8/1975 | Harrison, Jr. |
| 4,103,315 A | 7/1978 | Hempstead et al. |

(Continued)

FOREIGN PATENT DOCUMENTS

| JP | 64-070947 | 3/1989 |
| JP | 05-20635 | 1/1993 |

(Continued)

OTHER PUBLICATIONS

X. Zhu and J.-G. Zhu, "Bias-Field-Free Microwave Oscillator Driven by Perpendicularly Polarized Spin Current," IEEE Trans. Magn. vol. 42, p. 2670 (2006).

(Continued)

*Primary Examiner* — Will J Klimowicz
(74) *Attorney, Agent, or Firm* — Nixon & Vanderhye, P.C.

(57) ABSTRACT

An example magnetic recording apparatus includes a magnetic recording medium, a magnetic recording head and a signal processor. The magnetic recording head includes a first magnetic pole to apply a recording magnetic field to the magnetic recording medium; a spin torque oscillator arranged parallel to the first magnetic pole; and a first coil to magnetize the first magnetic pole. The signal processor writes and reads a signal on the magnetic recording medium by using the magnetic recording head and includes a first current circuit to supply a recording current to the first coil, the recording current including a recording signal to be recorded on the magnetic recording medium. The recording current includes either one of a signal changing at a frequency higher than that of the recording signal, and a signal having the same frequency as the recording signal and changing an absolute value thereof in one cycle.

6 Claims, 32 Drawing Sheets

(51) Int. Cl.
  *G11B 5/127* (2006.01)
  *G11B 5/31* (2006.01)
  *G11B 20/10* (2006.01)
  *G11B 5/00* (2006.01)

(56) References Cited

U.S. PATENT DOCUMENTS

| | | | |
|---|---|---|---|
| 4,782,415 A | 11/1988 | Vinal | |
| 4,945,528 A | 7/1990 | Crasemann | |
| 5,499,150 A | 3/1996 | Kawana et al. | |
| 5,695,864 A | 12/1997 | Slonczewski | |
| 5,748,399 A | 5/1998 | Gill | |
| 5,768,066 A | 6/1998 | Akiyama et al. | |
| 5,898,546 A | 4/1999 | Kanai et al. | |
| 5,920,447 A | 7/1999 | Sakata et al. | |
| 6,011,664 A | 1/2000 | Kryder et al. | |
| 6,094,328 A | 7/2000 | Saito | |
| 6,141,161 A | 10/2000 | Sato et al. | |
| 6,153,062 A | 11/2000 | Saito | |
| 6,195,232 B1 | 2/2001 | Cohen | |
| 6,278,576 B1 | 8/2001 | Ogata et al. | |
| 6,282,069 B1 | 8/2001 | Nakazawa et al. | |
| 6,519,119 B1 | 2/2003 | van der Heijden et al. | |
| 6,580,589 B1 | 6/2003 | Gill | |
| 6,583,969 B1 | 6/2003 | Pinarbasi | |
| 6,591,479 B2 | 7/2003 | Nakazawa et al. | |
| 6,608,739 B1 | 8/2003 | Tanaka et al. | |
| 6,621,664 B1 | 9/2003 | Trindade et al. | |
| 6,697,231 B1 | 2/2004 | Kikuiri | |
| 6,785,092 B2 | 8/2004 | Covington et al. | |
| 6,809,900 B2 | 10/2004 | Covington | |
| 6,836,971 B1 | 1/2005 | Wan | |
| 6,927,952 B2 | 8/2005 | Shimizu et al. | |
| 6,937,446 B2 | 8/2005 | Kamiguchi et al. | |
| 6,977,108 B2 | 12/2005 | Hieda et al. | |
| 6,980,469 B2 | 12/2005 | Kent et al. | |
| 6,982,845 B2 | 1/2006 | Kai et al. | |
| 7,106,555 B2 | 9/2006 | Kikuiri et al. | |
| 7,119,990 B2 | 10/2006 | Bajorek et al. | |
| 7,120,988 B2 | 10/2006 | Le et al. | |
| 7,145,752 B2 | 12/2006 | Ueda et al. | |
| 7,154,707 B2 | 12/2006 | Watabe et al. | |
| 7,256,955 B2 | 8/2007 | Pokhil et al. | |
| 7,397,633 B2 | 7/2008 | Xue et al. | |
| 7,461,933 B2 | 12/2008 | Deily et al. | |
| 7,466,525 B2 | 12/2008 | Hasegawa et al. | |
| 7,471,491 B2 | 12/2008 | Sato et al. | |
| 7,473,478 B2 | 1/2009 | Sbiaa et al. | |
| 7,486,475 B2 | 2/2009 | Biskeborn | |
| 7,504,898 B2 | 3/2009 | Fukuzawa et al. | |
| 7,532,433 B2 | 5/2009 | Kawato et al. | |
| 7,532,434 B1 | 5/2009 | Schreck et al. | |
| 7,593,185 B2 | 9/2009 | Yazawa | |
| 7,616,412 B2 | 11/2009 | Zhu et al. | |
| 7,675,129 B2 | 3/2010 | Inomata et al. | |
| 7,724,469 B2 | 5/2010 | Gao et al. | |
| 7,732,881 B2 | 6/2010 | Wang | |
| 7,764,136 B2 | 7/2010 | Suzuki | |
| 7,791,829 B2 | 9/2010 | Takeo et al. | |
| 7,808,330 B2 | 10/2010 | Fukuzawa et al. | |
| 7,813,087 B2 | 10/2010 | Sato et al. | |
| 7,817,375 B2 | 10/2010 | Sato et al. | |
| 7,818,890 B2 | 10/2010 | Duric et al. | |
| 7,876,531 B2 | 1/2011 | Bozeman et al. | |
| 7,911,882 B2 | 3/2011 | Shimazawa et al. | |
| 7,957,098 B2 | 6/2011 | Yamada et al. | |
| 8,081,397 B2 | 12/2011 | Funayama et al. | |
| 8,094,399 B2 | 1/2012 | Roppongi et al. | |
| 8,139,322 B2 | 3/2012 | Yamada et al. | |
| 8,154,825 B2 | 4/2012 | Takashita et al. | |
| 8,164,852 B2 | 4/2012 | Lee et al. | |
| 8,164,854 B2 | 4/2012 | Takagishi et al. | |
| 8,238,058 B2 | 8/2012 | Shimizu et al. | |
| 8,238,060 B2 | 8/2012 | Yamada et al. | |
| 8,264,799 B2 | 9/2012 | Akiyama et al. | |
| 8,270,112 B2 | 9/2012 | Funayama et al. | |
| 8,295,009 B2 | 10/2012 | Yamada et al. | |
| 8,320,079 B2 | 11/2012 | Iwasaki et al. | |
| 8,325,442 B2 | 12/2012 | Koui et al. | |
| 8,400,734 B2 | 3/2013 | Yamada et al. | |
| 8,427,773 B2 | 4/2013 | Aoyama et al. | |
| 8,467,148 B2 | 6/2013 | Iwasaki et al. | |
| 8,526,138 B2 | 9/2013 | Biskeborn et al. | |
| 8,537,495 B1 | 9/2013 | Luo et al. | |
| 8,547,662 B2* | 10/2013 | Yamada | G11B 5/02 360/125.3 |
| 8,582,240 B1* | 11/2013 | Chen | G11B 5/399 360/125.3 |
| 8,654,480 B2 | 2/2014 | Shimizu et al. | |
| 8,687,321 B2 | 4/2014 | Yamada et al. | |
| 8,755,150 B2* | 6/2014 | Chen | G11B 5/399 360/125.3 |
| 8,767,346 B2* | 7/2014 | Yamada | G11B 5/09 360/123.11 |
| 8,995,085 B2* | 3/2015 | Yamada | G11B 5/09 360/119.03 |
| 9,129,617 B2* | 9/2015 | Yamada | G11B 5/3133 |
| 2001/0017746 A1 | 8/2001 | Nishida et al. | |
| 2001/0017752 A1 | 8/2001 | Hoshiya et al. | |
| 2002/0006013 A1 | 1/2002 | Sato et al. | |
| 2002/0014016 A1 | 2/2002 | Kato | |
| 2002/0051330 A1 | 5/2002 | Heijden et al. | |
| 2002/0075595 A1 | 6/2002 | Sato et al. | |
| 2002/0097536 A1 | 7/2002 | Komuro et al. | |
| 2002/0136927 A1 | 9/2002 | Hieda et al. | |
| 2002/0155321 A1 | 10/2002 | Kawasaki et al. | |
| 2003/0026040 A1 | 2/2003 | Covington et al. | |
| 2003/0090844 A1 | 5/2003 | Shimizu et al. | |
| 2004/0070869 A1 | 4/2004 | Nishida et al. | |
| 2004/0145828 A1 | 7/2004 | Im | |
| 2004/0150912 A1 | 8/2004 | Kawato et al. | |
| 2004/0190197 A1 | 9/2004 | Watabe et al. | |
| 2004/0228045 A1 | 11/2004 | Hasegawa et al. | |
| 2004/0252417 A1 | 12/2004 | Hasegawa et al. | |
| 2005/0023938 A1 | 2/2005 | Sato et al. | |
| 2005/0088789 A1 | 4/2005 | Hou et al. | |
| 2005/0105213 A1 | 5/2005 | Takeo et al. | |
| 2005/0110004 A1 | 5/2005 | Parkin et al. | |
| 2005/0111137 A1 | 5/2005 | Ju et al. | |
| 2005/0193578 A1 | 9/2005 | Toda | |
| 2005/0207050 A1 | 9/2005 | Pokhil | |
| 2005/0219767 A1 | 10/2005 | Nakamura et al. | |
| 2005/0219771 A1 | 10/2005 | Sato et al. | |
| 2006/0039089 A1 | 2/2006 | Sato | |
| 2006/0171051 A1 | 8/2006 | Wachenschwanz et al. | |
| 2006/0187580 A1 | 8/2006 | Samofalov et al. | |
| 2006/0198047 A1 | 9/2006 | Xue et al. | |
| 2006/0213070 A1 | 9/2006 | Goldsobel et al. | |
| 2006/0221507 A1 | 10/2006 | Sato et al. | |
| 2007/0063237 A1 | 3/2007 | Huai et al. | |
| 2007/0089311 A1 | 4/2007 | Amundson et al. | |
| 2007/0109147 A1 | 5/2007 | Fukuzawa et al. | |
| 2007/0253122 A1 | 11/2007 | Fukuzawa et al. | |
| 2008/0019040 A1 | 1/2008 | Zhu et al. | |
| 2008/0112080 A1 | 5/2008 | Lengsfield et al. | |
| 2008/0112087 A1 | 5/2008 | Clinton et al. | |
| 2008/0117545 A1 | 5/2008 | Batra et al. | |
| 2008/0129401 A1 | 6/2008 | Fukuzawa et al. | |
| 2008/0137224 A1 | 6/2008 | Gao et al. | |
| 2008/0144232 A1 | 6/2008 | Kaka et al. | |
| 2008/0150643 A1 | 6/2008 | Suzuki et al. | |
| 2008/0165452 A1 | 7/2008 | Bozeman et al. | |
| 2008/0180838 A1 | 7/2008 | Im et al. | |
| 2008/0208733 A1 | 8/2008 | Robb et al. | |
| 2008/0218891 A1 | 9/2008 | Gubbins et al. | |
| 2008/0231998 A1 | 9/2008 | Yoshikawa et al. | |
| 2008/0268291 A1 | 10/2008 | Akiyama et al. | |
| 2008/0304176 A1* | 12/2008 | Takagishi | G11B 5/1278 360/86 |
| 2009/0052095 A1 | 2/2009 | Yamada et al. | |
| 2009/0059417 A1* | 3/2009 | Takeo | G11B 5/02 360/75 |
| 2009/0059418 A1 | 3/2009 | Takeo et al. | |
| 2009/0059423 A1 | 3/2009 | Yamada et al. | |

(56) References Cited

U.S. PATENT DOCUMENTS

| | | | |
|---|---|---|---|
| 2009/0080105 A1 | 3/2009 | Takashita et al. | |
| 2009/0080106 A1 | 3/2009 | Shimizu et al. | |
| 2009/0080109 A1 | 3/2009 | Fukuzawa et al. | |
| 2009/0080120 A1 | 3/2009 | Funayama et al. | |
| 2009/0088095 A1 | 4/2009 | Kayano et al. | |
| 2009/0097167 A1 | 4/2009 | Sato et al. | |
| 2009/0097169 A1 | 4/2009 | Sato et al. | |
| 2009/0115541 A1 | 5/2009 | Persson et al. | |
| 2009/0141407 A1 | 6/2009 | Lee et al. | |
| 2009/0201614 A1* | 8/2009 | Kudo | B82Y 25/00 360/324.11 |
| 2009/0225465 A1* | 9/2009 | Iwasaki | G11B 5/1278 360/75 |
| 2009/0257151 A1 | 10/2009 | Zhang et al. | |
| 2009/0262457 A1 | 10/2009 | Rivkin et al. | |
| 2009/0316303 A1 | 12/2009 | Yamada et al. | |
| 2009/0316304 A1 | 12/2009 | Funayama et al. | |
| 2010/0007992 A1 | 1/2010 | Yamada et al. | |
| 2010/0007996 A1 | 1/2010 | Iwasaki et al. | |
| 2010/0027158 A1 | 2/2010 | Takagishi et al. | |
| 2010/0110592 A1 | 5/2010 | Koui et al. | |
| 2010/0134922 A1 | 6/2010 | Yamada et al. | |
| 2010/0220415 A1 | 9/2010 | Yamada et al. | |
| 2011/0038080 A1 | 2/2011 | Alex et al. | |
| 2011/0134561 A1 | 6/2011 | Smith et al. | |
| 2011/0205655 A1 | 8/2011 | Shimizu et al. | |
| 2011/0299192 A1 | 12/2011 | Yamada et al. | |
| 2011/0300409 A1 | 12/2011 | Yamada et al. | |
| 2012/0268844 A1 | 10/2012 | Yamada et al. | |
| 2012/0275060 A1 | 11/2012 | Shimizu et al. | |
| 2013/0329317 A1 | 12/2013 | Yamada et al. | |
| 2015/0162023 A1* | 6/2015 | Yamada | G11B 5/09 360/111 |

FOREIGN PATENT DOCUMENTS

| | | |
|---|---|---|
| JP | 07-244801 | 9/1995 |
| JP | 11-154609 | 6/1999 |
| JP | 2001-243602 | 9/2001 |
| JP | 2002-100005 | 4/2002 |
| JP | 2002-109712 | 4/2002 |
| JP | 2002-208744 | 7/2002 |
| JP | 2002-217029 | 8/2002 |
| JP | 2002-279616 | 9/2002 |
| JP | 2003-317220 | 11/2003 |
| JP | 2004-192744 | 7/2004 |
| JP | 2004-207707 | 7/2004 |
| JP | 2004-221298 | 8/2004 |
| JP | 2004-234830 | 8/2004 |
| JP | 2004-295987 | 10/2004 |
| JP | 2005-108315 | 4/2005 |
| JP | 2005-525663 | 8/2005 |
| JP | 2005-285242 | 10/2005 |
| JP | 2005-294376 | 10/2005 |
| JP | 2005-310363 | 11/2005 |
| JP | 2006-080385 | 3/2006 |
| JP | 2006-086508 | 3/2006 |
| JP | 2006-134540 | 5/2006 |
| JP | 2006-147023 | 6/2006 |
| JP | 2006-209960 | 8/2006 |
| JP | 2006-209964 | 8/2006 |
| JP | 2006-244693 | 9/2006 |
| JP | 2006-286855 | 10/2006 |
| JP | 3833512 | 10/2006 |
| JP | 2007-012264 | 1/2007 |
| JP | 2007-035251 | 2/2007 |
| JP | 2007-116003 | 5/2007 |
| JP | 2007-124340 | 5/2007 |
| JP | 2007-184923 | 7/2007 |
| JP | 2007-193906 | 8/2007 |
| JP | 2007-299880 | 11/2007 |
| JP | 2008-109118 | 5/2008 |
| JP | 2008-123669 | 5/2008 |
| JP | 2008-176908 | 7/2008 |
| JP | 2009-070439 | 4/2009 |
| JP | 2009-070541 | 4/2009 |
| JP | 2010-003354 | 1/2010 |
| JP | 2010-009671 | 1/2010 |
| KR | 1020030039289 | 5/2003 |
| WO | 2006-101040 | 9/2006 |

OTHER PUBLICATIONS

Zhu et al., "Microwave Assisted Magnetic Recording (MAMR)," Digest of the 18$^{th}$ Magnetic Recording conference, pp. 34-35, 2007.

Maat et al., "Magnetotransport properties and spin-torque effects in current perpendicular to the plane spin valves with Co—Fe—Al magnetic layers", Journal of Applied Physics 101, 093905 (2007); May 9, 2007.

Park et al., "Effect of Adjacent Layers on Crystallization and Magnetoresistance in CoFeB/MgO/CoFeB Magnetic Tunnel Junction", IEEE Transactions of Magnetics, vol. 42, No. 10, Oct. 2006.

Shen et al., "Effect of Film Roughness in MgO-based Magnetic Tunnel Junctions", Applied Physics Letters 88, 182508 (2006).

Tang et al., "Narrow Track Confinement by AC Field Generation Layer in Microwave Assisted Magnetic Recording", IEEE Transactions of Magnetics, vol. 44, Issue 11, pp. 3376-3379 (Nov. 2008).

Office Action dated Dec. 21, 2012 in JP Application No. 2008-305693 and English-language translation thereof.

English-language machine translation of JP11-154609.

Takeo et al., U.S. Appl. No. 12/196,841, filed Aug. 22, 2008—now abandoned.

Iwasaki et al., U.S. Appl. No. 12/232,014, filed Sep. 9, 2008—now abandoned.

Shimizu et al., U.S. Appl. No. 12/232,469, filed Sep. 17, 2008—now abandoned.

Takagishi et al., U.S. Appl. No. 12/461,027, filed Jul. 29, 2009—now abandoned.

Takagishi et al., U.S. Appl. No. 13/071,681, filed Mar. 25, 2011—now abandoned.

Yamada et al., U.S. Appl. No. 13/966,126, filed Aug. 13, 2013—now abandoned.

Yamada et al., U.S. Appl. No. 14/623,047, filed Feb. 16, 2015—allowed.

Office Action mailed Sep. 18, 2013 in counterpart Japanese Application No. 2012-069974 and English-language translation of same.

* cited by examiner

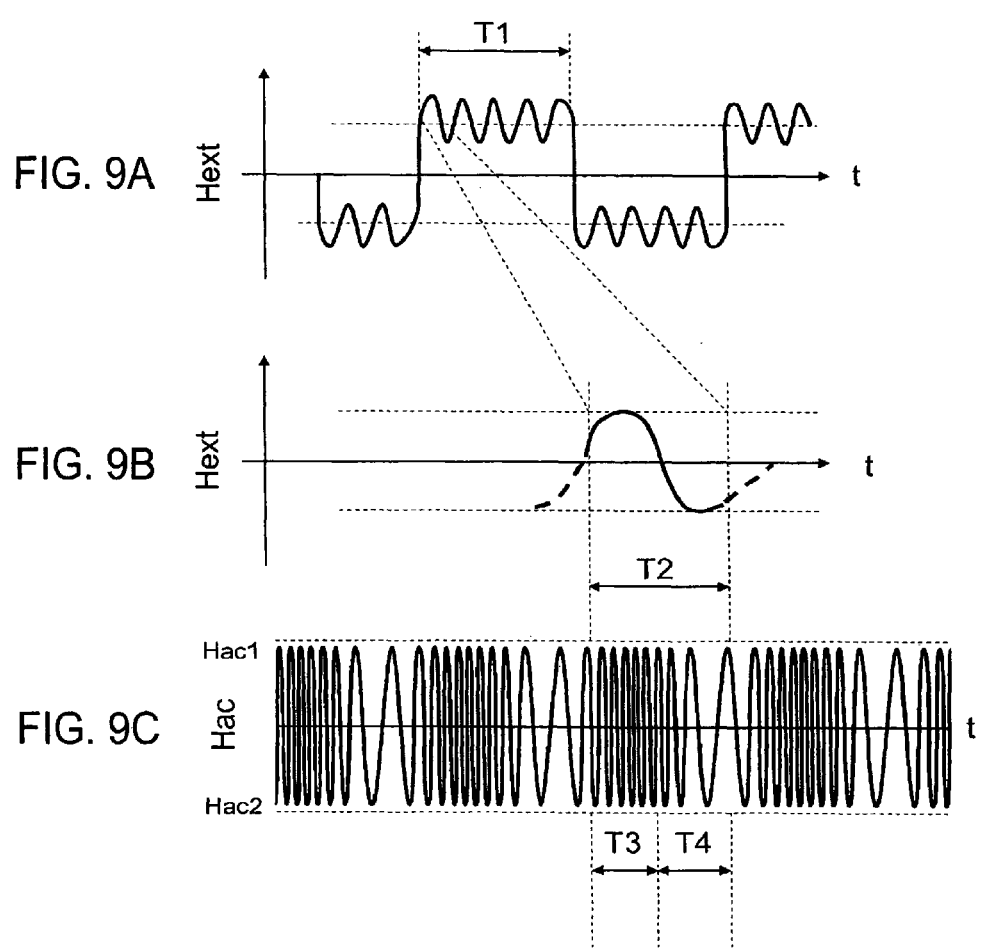

MAGNETIC RECORDING HEAD, MAGNETIC HEAD ASSEMBLY, MAGNETIC RECORDING APPARATUS, AND MAGNETIC RECORDING METHOD

CROSS REFERENCE TO RELATED APPLICATIONS

This application is a divisional of U.S. application Ser. No. 14/623,047, filed Feb. 16, 2015, which is a divisional of U.S. application Ser. No. 14/184,406, filed Feb. 19, 2014, now U.S. Pat. No. 8,995,085, which is a divisional of U.S. application Ser. No. 12/591,752, filed Nov. 30, 2009, now U.S. Pat. No. 8,767,346, which is based upon and claims the benefit of priority from the Japanese Patent Application No. 2008-305693, filed on Nov. 28, 2008. The entire contents of each of these applications are incorporated herein by reference.

FIELD OF THE INVENTION

The present invention relates to a magnetic recording head, a magnetic head assembly, a magnetic recording apparatus, and a magnetic recording method.

DESCRIPTION OF THE BACKGROUND

In the 1990s, the practical application of a MR (Magneto-Resistive effect) head and a GMR (Giant Magneto-Resistive effect) head has contributed to the skyrocketing of the recording density and capacity of an HDD (Hard Disk Drive). However, since the problems of heat fluctuation of a magnetic recording medium became conspicuous in the early 2000s, the speed of the increase in recording density has slowed down temporarily. Even so, a perpendicular magnetic recording was put in practical use in 2005, the perpendicular magnetic recording being more advantageous to high density recording theoretically than a longitudinal magnetic recording. This event triggers a recent growth rate of 40% for the recording density of HDD.

According to a latest demonstration experiment for HDD, 400 Gbits/inch$^2$ has been attained. If this trend continues strongly, a recording density of 1 Tbits/inch$^2$ is expected to be attained around 2012. However, it will not be easy to attain such a high recording density even employing the perpendicular magnetic recording, because the problems of heat fluctuation will still become conspicuous.

A "high-frequency magnetic field assist recording method" is proposed as a recording method which can solve this problem (U.S. Pat. No. 6,011,664). In the high-frequency magnetic field assist recording method, the magnetic field with a frequency sufficiently higher than a recording signal frequency near the resonant frequency of a magnetic recording medium is locally applied to the medium. As a result, the medium resonates, and a portion of the medium, to which the high frequency magnetic field is applied, has a coercivity half or less than that of the medium, to which no filed is applied. According to this effect, it is possible to write into a magnetic recording medium with a higher coercivity and higher anisotropy energy (Ku) by superimposing the high frequency magnetic field onto the recording field thereof. However, the method disclosed in U.S. Pat. No. 6,011,664 employs a coil to generate the high frequency magnetic field, making it difficult to efficiently apply the high frequency magnetic field to the medium.

Consequently, a method employing a spin torque oscillator has been proposed (see, for example, US-A20050023938, US-A20050219771, US-A20080019040, IEEE Trans. On Magn., Vol. 42, No. 10, PP. 2670). In the method disclosed, the spin torque oscillator includes a spin injection layer, an intermediate layer, a magnetic layer and electrodes. A direct current is passed through the spin torque oscillator via the electrodes to cause ferromagnetic resonance of magnetization in the magnetic layer, the ferromagnetic resonance being due to spin torque by spin injection. As a result, the spin torque oscillator generates the high frequency magnetic field.

Since the spin torque oscillator is about tens of nm in size, the high frequency magnetic field generated localizes in an area of about tens of nm near the spin torque oscillator. Furthermore, the in-plane component of the high frequency magnetic field allows it to cause the ferromagnetic resonance in a perpendicularly magnetized medium and to substantially reduce the coercivity of the medium. As a result, a high-density magnetic recording is performed only in a superimposed area of a recording field generated from a main magnetic pole and the high frequency magnetic field generated from the spin torque oscillator. This allows it to use a medium with a high coercivity (Hc) and high anisotropy energy (Ku). For this reason, the problem of heat fluctuation can be avoided at the time of high density recording.

In order to make a recording head for the high-frequency magnetic field assist recording, it becomes important to design and produce the spin torque oscillator capable of providing a stable oscillation with a low driving current and generating an in-plane high-frequency magnetic field to sufficiently cause a magnetic resonance of the magnetization in the medium. However, in order to acquire a very strong high frequency magnetic field, a large current must be applied to a spin torque oscillator. The large current gives rise to heating of the spin torque oscillator to deteriorate the performance thereof as a result of the heating. For this reason, a novel method is required to realize the high-frequency magnetic field assist recording using a weaker high-frequency magnetic field, i.e., a lower intensity high-frequency magnetic field.

SUMMARY OF THE INVENTION

According to a first aspect of the invention, a magnetic recording head includes a first magnetic pole, a second magnetic pole, a spin torque oscillator, a first coil, a second coil, and a third coil. The first magnetic pole applies a recording magnetic field to a magnetic recording medium. The second magnetic pole is provided parallel to the first magnetic pole. At least a portion of the spin torque oscillator is provided between the first magnetic pole and the second magnetic pole. The first coil magnetizes the first magnetic pole. A current is passed through the second coil independently of the first coil. A current is passed through the third coil independently of both the first coil and the second coil.

According to a second aspect of the invention, a magnetic recording head includes a first magnetic pole, a spin torque oscillator, and a second coil. The first magnetic pole applies a recording magnetic field to a magnetic recording medium. The spin torque oscillator is provided parallel to the first magnetic pole. The first coil magnetizes the first magnetic pole. A current is passed through the second coil independently of the first coil.

According to a third aspect of the invention, a magnetic head assembly includes the magnetic recording head according to one of the first and second aspects, a head slider, a suspension, and an actuator arm. The head slider mounts the magnetic recording head. The suspension mounts the head slider onto an end thereof. The actuator arm is connected to the other end of the suspension.

According to a fourth aspect of the invention, a magnetic recording apparatus includes a magnetic recording medium, the magnetic head assembly according to the third aspect of the invention, and a signal processor. The signal processor writes and reads a signal on the magnetic recording medium by using the magnetic recording head.

According to a fifth aspect of the invention, a magnetic recording apparatus includes a magnetic recording medium, a magnetic recording head, and a signal processor. The magnetic recording head includes a first magnetic pole, a second magnetic pole, a spin torque oscillator, a first coil, and a second coil. The first magnetic pole applies a recording magnetic field to the magnetic recording medium. The second magnetic pole is provided parallel to the first magnetic pole. At least a portion of the spin torque oscillator is provided between the first magnetic pole and the second magnetic pole. The first coil magnetizes the first magnetic pole. A current is passed through the second coil independently of the first coil. The signal processor writes and reads a signal on the magnetic recording medium by using the magnetic recording head. The signal processor includes a first current circuit and a second current circuit. The first current circuit supplies a recording current to the first coil. The recording current includes a recording signal to be recorded on the magnetic recording medium. The second current circuit supplies a modulating current to the second coil. In addition, the modulating current includes either one of a signal changing at a frequency higher than that of the recording signal, and a signal having the same frequency as the recording signal to change an absolute value thereof in one cycle.

According to a sixth aspect of the invention, a magnetic recording apparatus includes a magnetic recording medium, a magnetic recording head, and a signal processor. The magnetic recording head includes a first magnetic pole, a spin torque oscillator, and a first coil. The first magnetic pole applies a recording magnetic field to the magnetic recording medium. The spin torque oscillator is arranged parallel to the first magnetic pole. The first coil magnetizes the first magnetic pole. The signal processor writes and reads a signal on the magnetic recording medium by using the magnetic recording head, and includes a first current circuit to supply a recording current to the first coil. The recording current includes a recording signal to be recorded on the magnetic recording medium. In addition, the recording current includes either one of a signal changing at a frequency higher than that of the recording signal and a signal having the same frequency as the recording signal to change an absolute value thereof in one cycle.

According to a seventh aspect of the invention, a method for recording information onto a magnetic recording medium includes recording information onto the magnetic recording medium while applying a magnetic field to a spin torque oscillator arranged near a magnetic pole to record information onto the magnetic recording medium. The magnetic field includes either one of a first signal changing at a frequency higher than that of a recording signal to be recorded on the magnetic recording medium and a second signal having the same frequency as the recording signal to change an absolute value thereof in one cycle.

BRIEF DESCRIPTION OF DRAWINGS

FIGS. 9A to 9C are schematic views illustrating an operation of a magnetic recording head according to the first embodiment of the invention.

DETAILED DESCRIPTION OF THE EMBODIMENTS

Figure 1:
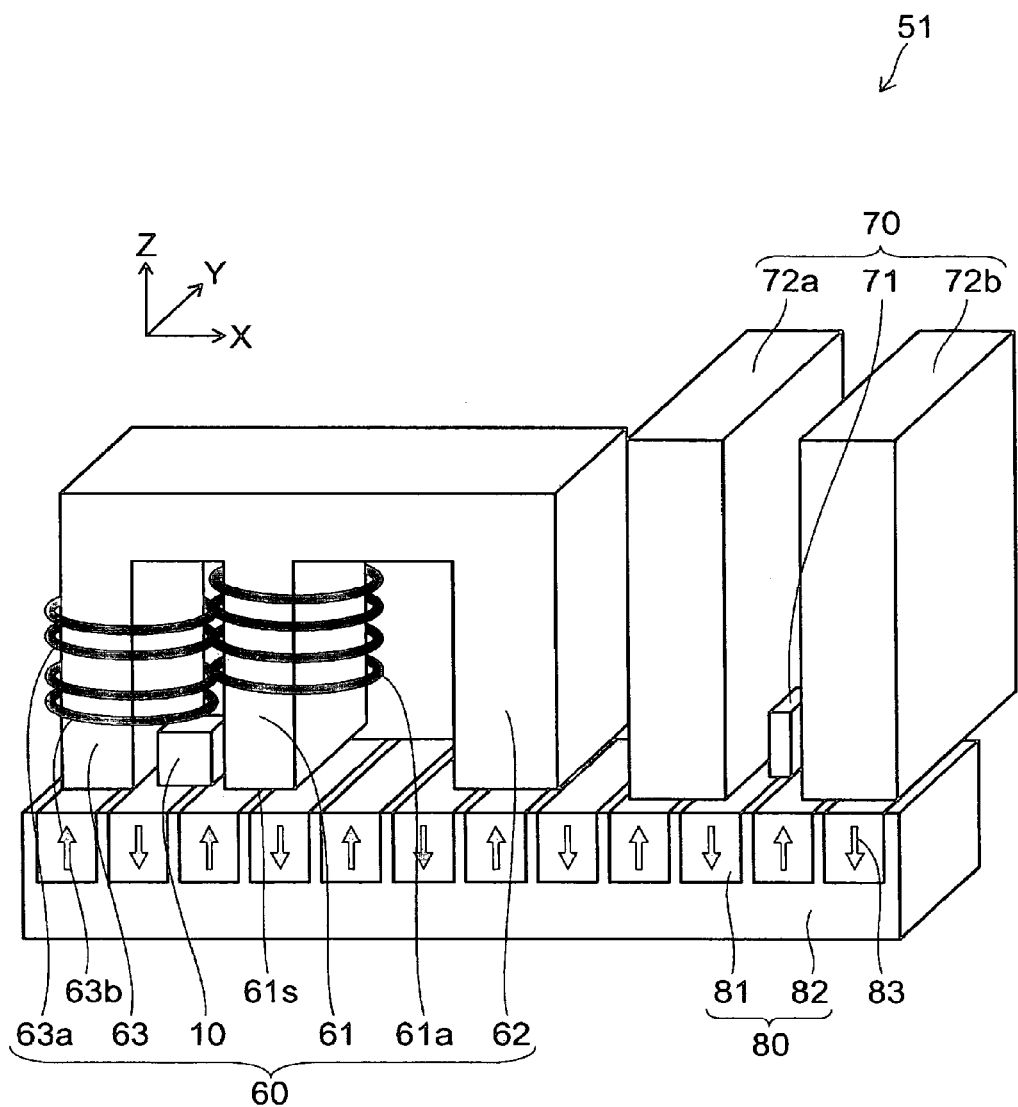
FIG. 1 is a perspective view schematically illustrating a configuration of a magnetic recording head according to a first embodiment of the invention.

Embodiments of the present invention are explained below with reference to accompanying drawings. The drawings are conceptual. Therefore, a relationship between the thickness and width of each portion and a proportionality factor among respective portions are not necessarily the same as an actual thing. Even when the same portions are drawn, their sizes or proportionality factors can be represented differently from each other depending on the drawings. The embodiments of the present invention will be described below with reference to accompanying drawings. Wherever possible, the same reference numerals will be used to denote the same or like portions throughout the detailed description and the figures.

First Embodiment

Figure 2:
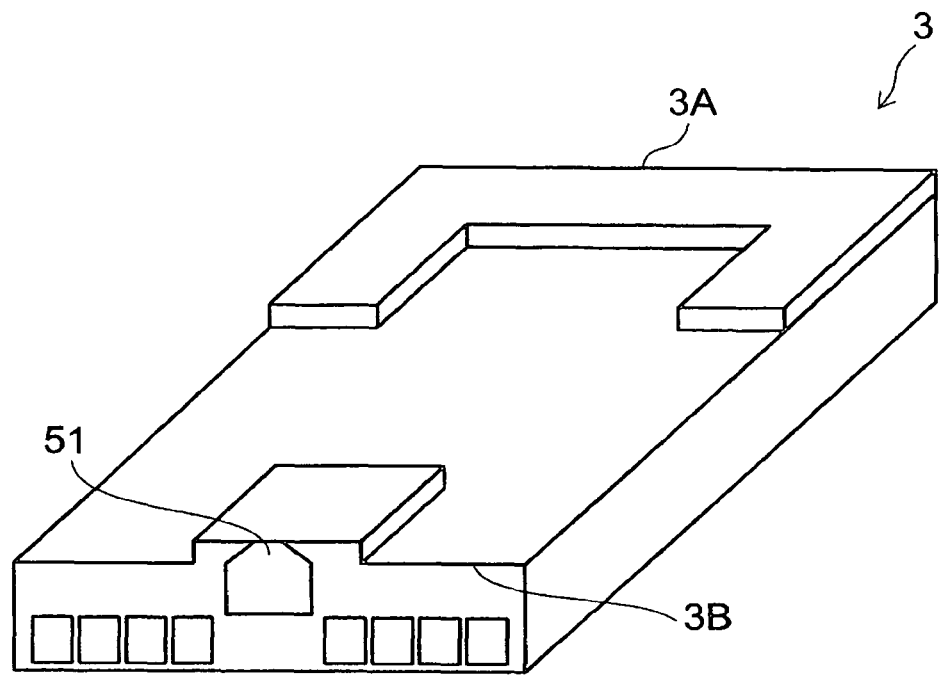
FIG. 2 is a perspective view schematically illustrating a configuration of a slider to carry the magnetic recording head according to the first embodiment of the invention.
Figure 3:
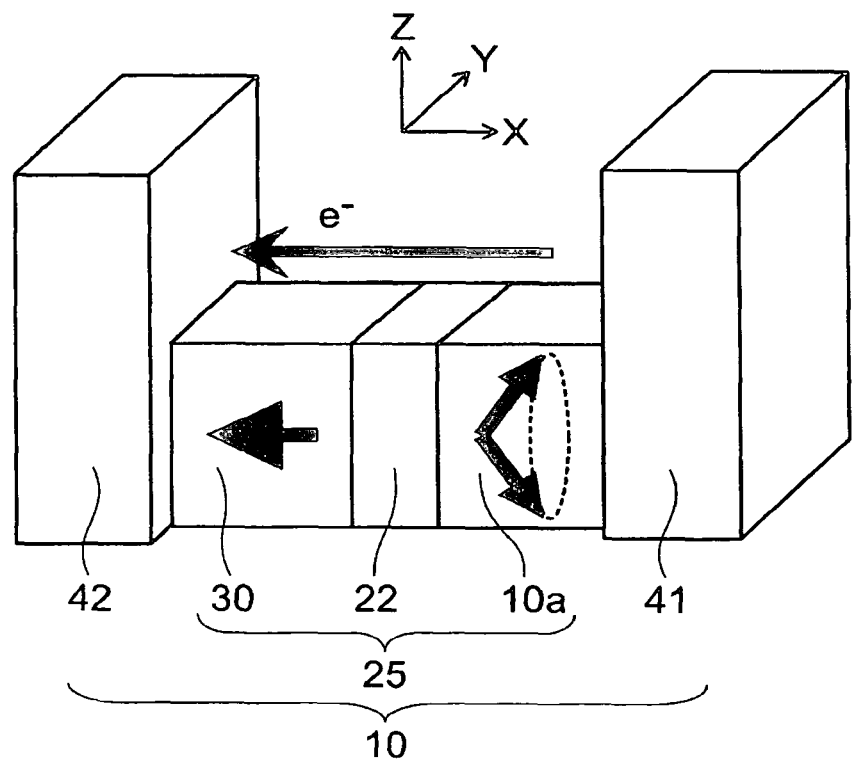
FIG. 3 is a perspective view schematically illustrating a configuration of a spin torque oscillator to be employed for a magnetic recording head according to the first embodiment of the invention.
Figure 4:
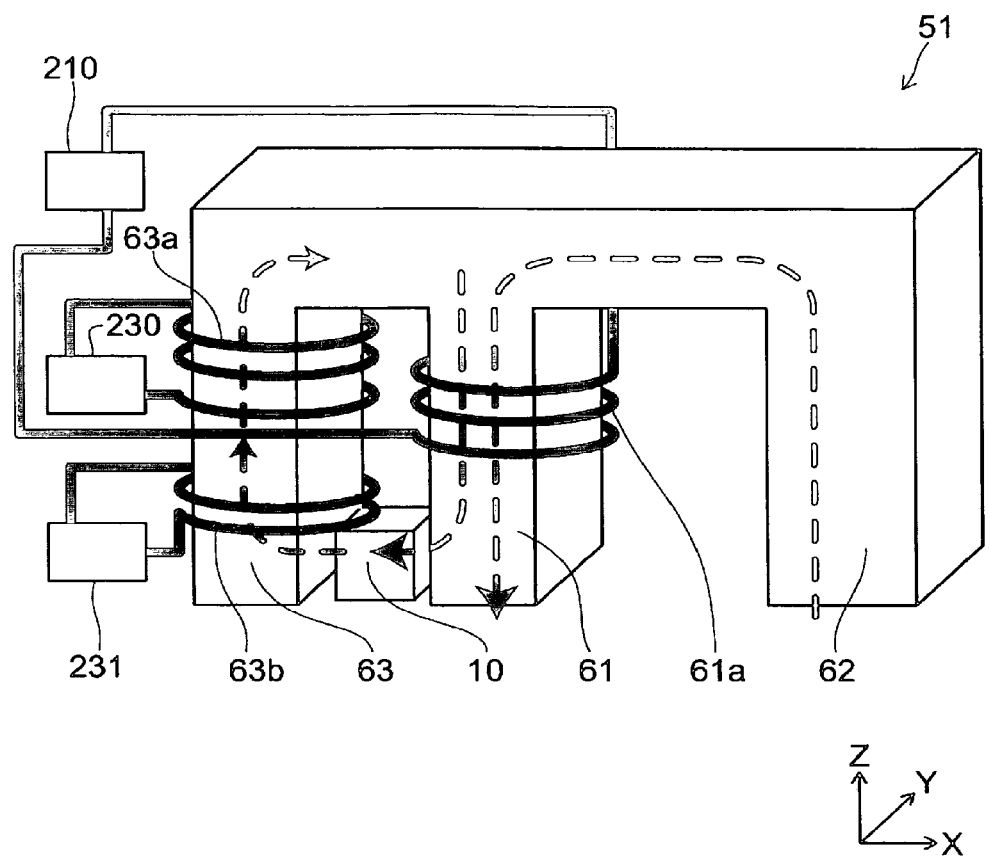
FIG. 4 is a perspective view schematically illustrating a configuration of a substantial portion of a magnetic recording head according to the first embodiment of the invention.

A magnetic recording head according to a first embodiment of the present invention is explained assuming that the head records on a perpendicular magnetic recording medium including magnetic grains (magnetic crystal grains). FIG. 1 is a perspective view schematically illustrating a configuration of the magnetic recording head according to the first embodiment of the invention. FIG. 2 is a perspective view schematically illustrating a configuration of a slider to carry the magnetic recording head according to the first embodiment of the invention. FIG. 3 is a perspective view schematically illustrating a configuration of a spin torque oscillator to be employed for the magnetic recording head according to the first embodiment of the invention. FIG. 4 is a perspective view schematically illustrating a configuration of a substantial portion of the magnetic recording head according to the first embodiment of the invention.

As illustrated in FIG. 1, the magnetic recording head according to the first embodiment of the invention is provided with the following:

a main magnetic pole 61 (a first magnetic pole) to apply a recording magnetic field to a magnetic recording medium 80; and a spin torque oscillator 10 provided between the main magnetic pole 61 and a controlling magnetic pole 63 (a second magnetic pole) which is arranged in a direction parallel to the main magnetic pole 61.

The magnetic recording head is further provided with the following:

a main magnetic pole coil 61a (a first coil) to magnetize the main magnetic pole 61;

a controlling magnetic pole coil 63a (a third coil) to magnetize the controlling magnetic pole 63; and a controlling magnetic pole modulation coil 63b (a modulating coil, i.e., a second coil) to magnetize the controlling magnetic pole 63.

It is possible to pass a current through the controlling magnetic pole 63a independently of the main magnetic pole coil 61a and the controlling magnetic pole modulation coil 63b. It is also possible to pass a current through the controlling magnetic pole modulation coil 63b independently of the main magnetic pole coil 61a and the controlling magnetic pole coil 63a.

In a specific example illustrated in FIG. 1, the spin torque oscillator 10 is provided between the main magnetic pole 61 and the controlling magnetic pole 63. Alternatively, the controlling magnetic pole 63 may be provided in a more recessed manner than a medium-facing surface 61s of the main magnetic pole 61 as will be mentioned later. In this alternative case, a potion of the spin torque oscillator 10 is provided between the main magnetic pole 61 and the controlling magnetic pole 63. Thus, at least a portion of the spin torque oscillator 10 may be provided between the main magnetic pole 61 and the controlling magnetic pole 63.

The above-mentioned main magnetic pole 61, the spin torque oscillator 10, the controlling magnetic pole 63, the main magnetic pole coil 61a, the controlling magnetic pole coil 63a, and the controlling magnetic pole modulation coil 63b are included in a writing head portion 60.

The writing head portion 60 can further include a return path (shield) 62. In the specific example illustrated in FIG. 1, the return path 62 is arranged on the side of a read section 70 across the main magnetic pole 61 so as to be easily viewable, but an arrangement of the return path 62 is not definite but optional. Alternatively, the return path 62 may be formed integrally with a side shield mentioned later.

In addition, the magnetic recording head is further provided with the read section 70 as illustrated in FIG. 1. The read section 70 includes a first magnetic shield layer 72a, a second magnetic shield layer 72b, and a magnetic read element 71. The magnetic read element 71 is provided between the first magnetic shield layer 72a and the second magnetic shield layer 72b. Each element of the above-mentioned read section 70 and each element of the above-mentioned writing head portion 60 are separated by insulators, such as alumina, etc. not illustrated in the figure. As the magnetic read element 71, a GMR element or a TMR (Tunnel Magneto-Resistive effect) element can be employed. In order to enhance a reproducing resolution, the magnetic read element 71 is disposed between the first and second magnetic shield layers 72a, 72b.

And as illustrated in FIG. 1, the magnetic recording medium 80 is provided to face the medium-facing surface 61s of a magnetic recording head 51. The medium-facing surface 61s of the magnetic recording head 51 may be a principal plane of the main magnetic pole 61 facing the magnetic recording medium 80 to be disposed for the magnetic recording head 51.

For example, as shown in FIG. 2, the magnetic recording head 51 is mounted to a head slider 3. The head slider 3 includes $Al_2O_3$/TiC, etc., and is designed to be produced so that the head slider 3 is capable of moving relatively to the magnetic recording medium 80, e.g., a magnetic disk with flying thereon or contacting thereto.

The head slider 3 has an air inflow side 3A and an air outflow side 3B. The magnetic recording head 51 is provided to the side surface of the air outflow side 3B, etc. Thereby, the magnetic recording head 51 mounted to the head slider 3 moves relatively to the magnetic recording medium 80 with flying thereon or contacting therewith.

As shown in FIG. 1, the magnetic recording medium 80 has a medium substrate 82 and a magnetic recording layer 81 provided on the medium substrate 82. Magnetization 83 of the magnetic recording layer 81 is controlled in a predetermined direction by a magnetic field applied from the writing head portion 60 to thus perform write-in. On the other hand, the read section 70 reads a direction of the magnetization 83 of the magnetic recording layer 81.

Here, as shown in FIG. 1, X-axis is normal to a plane across which the main magnetic pole 61 faces the controlling magnetic pole 63, and has a direction from the controlling magnetic pole 63 to the main magnetic pole 61. Y-axis is normal to X-axis, and parallel to the medium-facing surface 61s. Z-axis is normal to both X-axis and Y-axis. Therefore, Z-axis is normal to the medium-facing surface 61s.

As shown in FIG. 3, the spin torque oscillator 10 provided to the magnetic recording head 51 has an oscillation layer 10a (a first magnetic layer), a spin injection layer 30 (a second magnetic layer), and an intermediate layer 22 disposed between the oscillation layer 10a and the spin injection layer 30. Then, the oscillation layer 10a and the spin injection layer 30 are configured to have a coercivity smaller than a magnetic field applied from the main magnetic pole 61.

Thus, the spin torque oscillator 10 includes a laminated structure 25 of the oscillation layer 10a, the spin injection layer 30, and the nonmagnetic intermediate layer 22 disposed between the oscillation layer 10a and the spin injection layer 30.

The principal plane of these layers is normal to X-axis, and the lamination direction is parallel to X-axis. The invention is not limited to the above. Alternatively, the lamination direction of the laminated structure 25 may be parallel to Y-axis.

The spin torque oscillator 10 can be provided with a pair of electrodes (a first electrode 41 and a second electrode 42) to be capable of passing a current through the laminated structure 25. That is, the first and second electrodes 41, 42 are provided to the side of the oscillation layer 10a of the laminated structure 25 and the side of the spin injection layer 30 of the laminated structure 25, respectively.

In the example illustrated in FIG. 3, the side of the first electrode 41, i.e., the side of the oscillation layer 10a is arranged on the side of the main magnetic pole 61, and the side of the second electrode 42, i.e., the side of the spin injection layer 30 is arranged on the side of the controlling magnetic pole 63. Thereby, the oscillation layer 10a and the main magnetic pole 61 are close to each other. Furthermore, a high frequency magnetic field Hac generated from the spin torque oscillator 10 and a recording magnetic field Hw generated from the main magnetic pole 61 are easily superimposed on each other to be applied to the magnetic recording medium 80, thus allowing it to perform a high frequency magnetic field assist recording more effectively. However, the invention is not limited to the above. Alternatively, the side of the second electrode 42, i.e., the side of the spin injection layer 30 may be arranged on the side of the main magnetic pole 61, and the side of the first electrode 41, i.e., the side of the oscillation layer 10a may be arranged on the side of the controlling magnetic pole 63, depending on designs of each constituent and materials selected.

In the spin torque oscillator 10, a current is passed through the first and second electrodes 41, 42 to generate a high frequency magnetic field from the oscillation layer 10a. A driving current for the spin torque oscillator 10 is preferably from $5\times10^7$ $A/cm^2$ to $1\times10^9$ $A/cm^2$, and is controlled to acquire a desired oscillation state.

Materials, which are hard to be oxidized and have low resistances, such as Ti, Cu, etc. are employed for the first and second electrodes 41, 42. Alternatively, at least either one of the first and second electrodes 41, 42 mentioned above may double as at least one of the main magnetic pole 61 and the controlling magnetic pole 63. Either one of the first and second electrode 41, 42 may be modified to double as the return path 62.

Materials with high spin transmissivity, such as Cu, Au, and Ag, can be used for the intermediate layer 22. The intermediate layer 22 is preferably one atomic layer to 5 nm in thickness. This allows it to adjust exchange coupling between the oscillation layer 10a and the spin injection layer 30.

The oscillation layer 10a includes a high-Bs soft magnetic material (FeCo/NiFe laminated film) to generate a magnetic field during oscillation. The thickness of the oscillation layer 10a is preferably from 5 nm to 20 nm.

The spin injection layer 30 is made of a CoPt alloy with its magnetization oriented perpendicularly to the film plane. The thickness of the spin injection layer 30 is preferably from 2 nm to 60 nm.

The spin injection layer 30 and the oscillation layer 10a can be a soft magnetic layer selected from the group consisting of CoFe, CoNiFe, NiFe, CoZrNb, FeN, FeSi, FeAlSi, FeCoAl, FeCoSi, CoFeB, etc. which have a relatively high saturation magnetic flux density and magnetic anisotropy in a direction parallel to the film plane, or a CoCr-based or CoIr-based magnetic alloy film with its magnetization oriented in a direction parallel to the film plane. It is also possible to suitably use a material layer well oriented perpendicularly such as a CoCrPt, CoCrTa, CoCrTaPt, CoCrTaNb, or other CoCr-based magnetic layer, a TbFeCo or other RE-TM amorphous alloy magnetic layer, a Co/Ni, Co/Pd, Co/Pt, CoCrTa/Pd, or other Co artificial lattice magnetic layer, a CoPt-based or FePt-based alloy magnetic layer, or a SmCo-based alloy magnetic layer, which have the magnetization oriented in a direction perpendicular to the film plane. Two or more of the above materials laminated may be employed. This allows it to easily adjust the saturation magnetic flux density (Bs) and the anisotropy magnetic field (Hk) of the oscillation layer 10*a* and the spin injection layer 30.

The main magnetic pole 61, the controlling magnetic pole 63, and the return path 62 can be a soft magnetic layer selected from the group consisting of FeCo, CoFe, CoNiFe, NiFe, CoZrNb, FeN, FeSi, and FeAlSi, etc. having a relatively high saturation magnetic flux density.

Alternatively, the material on the side of the medium-facing surface 61*s* of the main magnetic pole 61 is different from that of any portions other than the portion on the side of the medium-facing surface 61*s* in the main magnetic pole 61 and the controlling magnetic pole 63. That is, in order to increase a magnetic field applied to the magnetic recording medium 80 or a magnetic field generated by the spin torque oscillator 10, FeCo, CoNiFe, FeN, etc. with a particularly large saturation magnetic flux density are employed for the materials of the portion on the side of the medium-facing surface 61*s* of the main magnetic pole 61. Any portions other than the portion on the side of the medium-facing surface 61*s* of the main magnetic pole 61 may include FeNi, etc. with a particularly high permeability. Alternatively, the size of the portion on the side of the medium-facing surface 61*s* of the main magnetic pole 61 may be smaller in order to enlarge a magnetic field applied to the magnetic recording medium 80 or a magnetic field generated by the spin torque oscillator 10. Thereby, magnetic flux concentrates on the side of the medium-facing surface 61*s*, thereby allowing it to generate a high magnetic field.

Materials, which are hard to be oxidized and have low resistances, such as Ti, Cu, etc. may be employed for the main magnetic pole coil 61*a*, the controlling magnetic pole coil 63*a*, and the controlling magnetic pole modulation coil 63*b*.

As illustrated in FIG. 4, the main magnetic pole coil 61*a* magnetizes the main magnetic pole 61. The controlling magnetic pole modulation coil 63*b* magnetizes the controlling magnetic pole 63, and it is possible to pass a current through the controlling magnetic pole modulation coil 63*b* independently of the main magnetic pole coil 61*a*. The controlling magnetic pole coil 63*a* magnetizes the controlling magnetic pole 63. It is possible to pass a current through the controlling magnetic pole modulation coil 63*b* independently of the main magnetic pole coil 61*a* and the controlling magnetic pole modulation coil 63*b*.

For example, as illustrated in FIG. 4, the main magnetic pole coil 61*a* is connected to a recording current circuit 210 (a first current circuit). Then the controlling magnetic pole coil 63*a* is connected to an controlling magnetic pole current circuit 230 (a third current circuit). The controlling magnetic pole modulation coil 63*b* is connected to a controlling magnetic pole modulation current circuit 231 (a modulating current circuit, i.e., a second current circuit).

This allows it to apply a magnetic field (an external magnetic field Hext) to the spin torque oscillator 10. The external magnetic field Hext includes a modulation signal changing at a frequency higher than a recording signal of the recording magnetic field applied to the magnetic recording medium 80. The external magnetic field Hext is applied to the spin torque oscillator 10 to allow it to modulate the frequency fs of the high frequency magnetic field Hac generated in the spin torque oscillator 10, thereby making the magnetic recording medium 80 resonate easily with the high frequency magnetic field Hac. This provides a magnetic recording head capable of performing a stable high-frequency magnetic field assist recording using a lower intensity high-frequency magnetic field Hac.

Figure 5A:
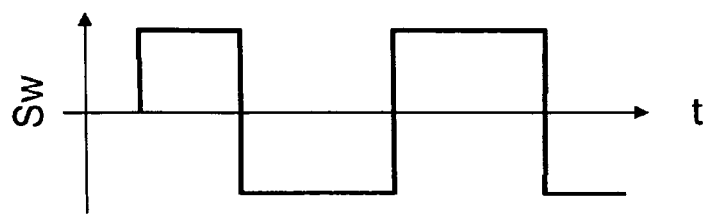
FIGS. 5A to 5D are schematic views illustrating currents to be passed through a magnetic recording head according to the first embodiment of the invention.
Figure 5B:
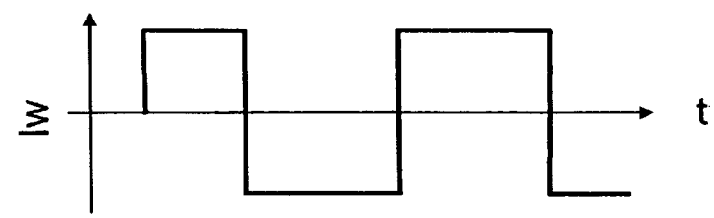
Figure 5C:
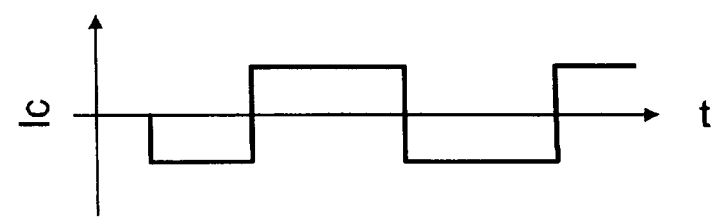
Figure 5D:
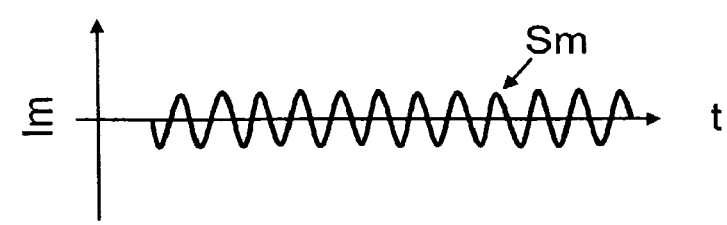

An operation of a magneto-resistive effect element recording head according to the first embodiment is explained in detail below. FIGS. 5A to 5D are schematic views illustrating currents to be passed through the magnetic recording head according to the first embodiment of the invention. FIG. 5A illustrates a recording signal Sw to record information on the magnetic recording medium 80 via the main magnetic pole 61. FIG. 5B illustrates a recording current Iw supplied to the main magnetic pole coil 61*a*. FIG. 5C illustrates an controlling current Ic supplied to the controlling magnetic pole coil 63*a*. FIG. 5D illustrates an controlling magnetic pole modulation current Im supplied to the controlling magnetic pole modulation coil 63*b*.

As shown in FIG. 5A, the recording signal Sw changes with time based on information to be recorded on the magnetic recording medium 80.

As illustrated in FIG. 5B, the recording current Iw changes based on the recording signal Sw. The main magnetic pole 61 applies the recording magnetic field to the magnetic recording medium 80 using the recording current Iw. Alternatively, the polar character of the recording current Iw may be opposite to that of the recording signal Sw depending on a winding manner of the main magnetic pole coil 61*a*, and there may be a phase shift between the recording current Iw and the recording signal Sw. In this embodiment, it is assumed that the recording current Iw and the recording signal Sw have the same polar character, and there is no phase shift therebetween.

On the other hand, as illustrated in FIG. 5C, the controlling current Ic is maintained to be constant by compensating a difference in recording conditions for the magnetic recording medium 80 or a variation in the oscillation frequency of the spin torque oscillator 10. The difference can occur between the inner and outer circumferences of the magnetic recording medium 80. The variation can occur depending on a variation in manufacturing processes of the spin torque oscillator 10. In this example, the frequency of the controlling current Ic is the same as that of the recording signal Sw, i.e., the frequency of the recording current Iw. In addition, there may be phase shift between the controlling current Ic and the recording current Iw, or between the controlling current Ic and the recording signal Sw. However, a case without the phase shift is explained below.

As illustrated in FIG. 5D, the controlling magnetic pole modulation current Im oscillates at a frequency higher than that of the recording current Iw. That is, the controlling magnetic pole modulation current Im includes a modulation signal Sm which changes at a frequency higher than that of the recording signal Sw of the recording magnetic field Hw. For example, the frequency of the controlling magnetic pole modulation current, i.e., the frequency of the modulation signal Sm is set to be higher than 1.5 GHz.

Figure 6A:
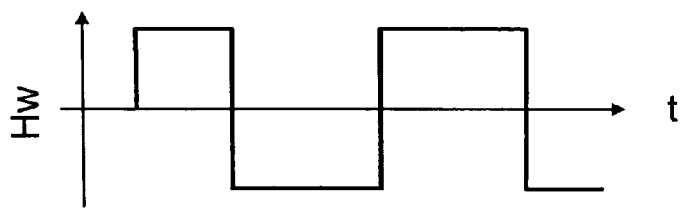
FIGS. 6A to 6E are schematic views illustrating magnetic fields generated in a magnetic recording head according to the first embodiment of the invention.
Figure 6B:
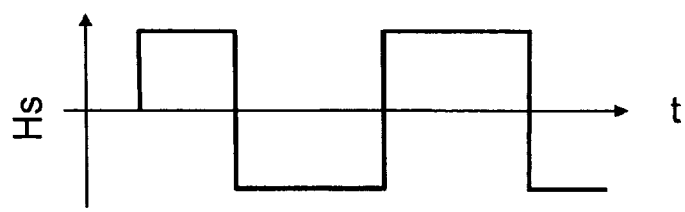
Figure 6C:
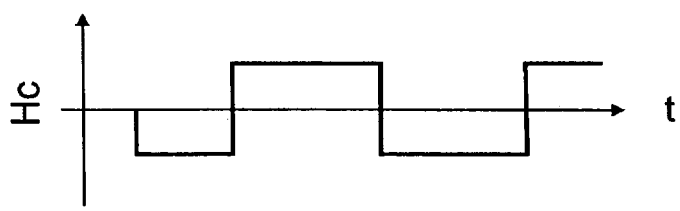
Figure 6D:
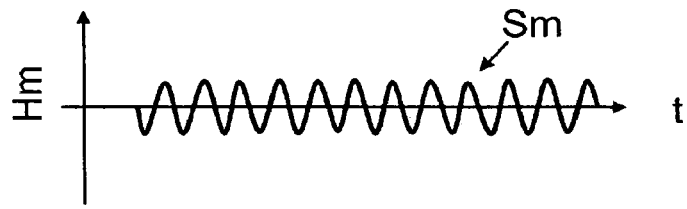
Figure 6E:
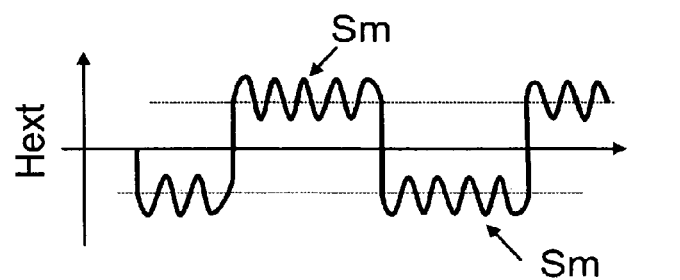

FIGS. 6A to 6E are schematic views illustrating magnetic fields generated in the magnetic recording head according to the first embodiment of the invention. FIG. 6A illustrates the recording magnetic field Hw, which is generated from the magnetic pole coil 61*a* of the magnetic pole 61, to be applied to the magnetic recording medium 80. FIG. 6B illustrates a main magnetic pole application field Hs generated from the main magnetic pole 61 to be applied to the spin torque oscillator 10. FIG. 6C illustrates the controlling magnetic field component Hc generated from the controlling magnetic pole 63 of the controlling magnetic pole coil 63*a*. FIG. 6D illustrates a modulating magnetic field component Hm generated from the controlling magnetic pole modulation coil 63*b* of the controlling magnetic pole 63. FIG. 6E illustrates the external magnetic field Hext of the respective magnetic fields mentioned above which are superimpose on each other to be applied to the spin torque oscillator.

As illustrated in FIG. 6A, the magnetic field based on the recording signal Sw, i.e., the recording current Iw is generated from the main magnetic pole 61, and the magnetic field is applied as the recording magnetic field Hw to the magnetic recording medium 80.

Then, as illustrated in FIG. 6B, a portion of the magnetic field generated from the main magnetic pole 61 is applied as a main magnetic pole application magnetic field Hs to the spin torque oscillator 10. Thus, a portion of the magnetic field generated from the main magnetic pole 61 is the recording magnetic field Hw and the other portion is the main magnetic pole application magnetic field Hs. Therefore, the main magnetic pole application magnetic field Hs is a magnetic field which changes with time as well as the recording magnetic field Hw. That is, the main magnetic pole application magnetic field Hs also includes the recording signal Sw in the recording magnetic field Hw.

On the other hand, as illustrated in FIG. 6C, the controlling magnetic field component Hc is generated from the controlling magnetic pole 63 based on the controlling current Ic, and is applied to the spin torque oscillator 10.

And, as illustrated in FIG. 6D, the modulating magnetic field component Hm is generated from the controlling magnetic pole 63 based on the controlling magnetic pole modulation current Im, and is applied to the spin torque oscillator 10. The modulating magnetic field component Hm includes the modulation signal Sm which changes at a frequency higher than that of the recording signal Sw of the recording magnetic field Hw. For example, the frequency of the modulating magnetic field component Hm is set to be than 1.5 GHz.

As illustrated in FIG. 6E, the external magnetic field Hext applied to the spin torque oscillator 10 is a superimposed field of the main magnetic pole application magnetic field Hs, the controlling magnetic field component Hc, and the modulating magnetic field component Hm. That is, the external magnetic field Hext is a superimposed magnetic field of the following two magnetic fields. One is the magnetic field having the frequency of the recording signal Sw included in the recording magnetic field Hw. The other is the magnetic field including the modulation signal Sm which oscillates at a frequency higher than that of the recording signal Sw of the recording magnetic field Hw.

Thus, in the magnetic recording head 51 according to the embodiment, the magnetic field including the modulation signal Sm which oscillates at a frequency higher than that of the recording signal Sw of the recording magnetic field Hw is applied. Then, the frequency fs of the high frequency magnetic field Hac generated by the spin torque oscillator 10 changes in response to the intensity (an instantaneous value of Hext) of the external magnetic field Hext. As a result, the high frequency magnetic field Hac generated by the spin torque oscillator 10 can be frequency-modulated coincident with the intensity (an instantaneous value of Hext) of the external magnetic field Hext.

Figure 7:
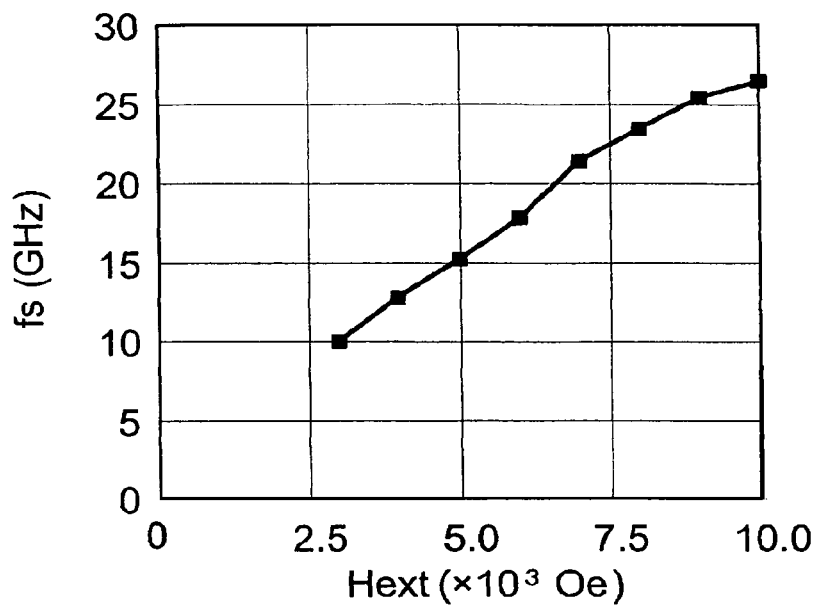
FIG. 7 is a graph illustrating a characteristic of a magnetic recording head according to the first embodiment of the invention.

FIG. 7 is a graph illustrating a characteristic of the magnetic recording head according to the first embodiment of the invention. That is, the graph illustrates a measurement of the frequency fs of the high frequency magnetic field Hac, which the spin torque oscillator 10 generates, with changing the external magnetic field Hext applied to the spin torque oscillator 10. The horizontal and vertical axes of FIG. 7 express the external magnetic field Hext and the frequency fs, respectively. The stronger the external magnetic field Hext applied to the spin torque oscillator 10, the higher the frequency fs of the high frequency magnetic field Hac generated by the spin torque oscillator 10, as illustrated in FIG. 7.

Figure 8:
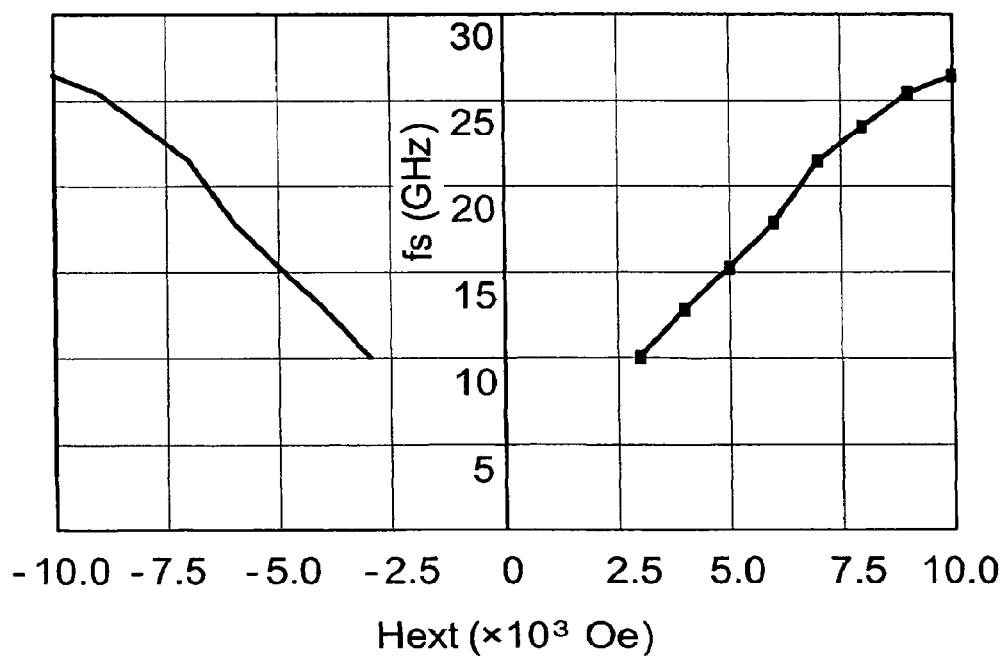
FIG. 8 is a graph schematically illustrating a characteristic of a magnetic recording head according to the first embodiment of the invention.

FIG. 8 is a graph schematically illustrating a characteristic of the magnetic recording head according to the first embodiment of the invention. That is, FIG. 8 is a typical graph where the polar character of the external magnetic field Hext is extended to polarity based on the experimental result illustrated in FIG. 7. The horizontal and vertical axes of FIG. 8 express the external magnetic field Hext and the frequency fs, respectively. In a range where the absolute value of the external field Hext is larger than the coercivities of the spin injection layer 30 and the oscillation layer 10a, the direction of the external magnetic field Hext and the magnetization direction of the spin injection layer 30 are parallel to each other independently of the polarity of the external field Hext. For this reason, when the absolute value of the external magnetic field Hext is equal to the coercivities of the spin injection layer 30 and the oscillation layer 10a, the oscillation characteristic of the spin torque oscillator 10 is constant independently of the polarity of the external magnetic field Hext.

As a result, as illustrated in FIG. 8, when the external magnetic field Hext is in the negative direction, the characteristic of the frequency fs versus the external magnetic field Hext becomes a characteristic to be acquired by folding back the characteristic illustrated in FIG. 7 where the external magnetic field Hext is in the positive direction, symmetrically with respect to the vertical axis. Therefore, when the absolute value of the external magnetic field Hext applied to the spin torque oscillator 10 becomes large irrespective of the polarity (the direction of a magnetic field) of the external magnetic field Hext, the frequency fs of the high frequency magnetic field Hac generated by the spin torque oscillator 10 becomes high. And, when the absolute value of the external magnetic field Hext becomes small, the frequency fs of the high frequency magnetic field Hac generated by the spin torque oscillator 10 becomes low.

Accordingly, the strength of the external magnetic field Hext is changed to control the frequency fs, thereby allowing it to modulate the frequency fs of the high frequency magnetic field Hac which the spin torque oscillator 10 generates.

FIGS. 9A to 9C are schematic views illustrating an operation of the magnetic recording head according to the first embodiment of the invention. That is, FIG. 9A illustrates the external magnetic field Hext applied to the spin torque oscillator 10. FIG. 9B illustrates the change in the external magnetic field Hext by expanding the time axis (the horizontal axis). FIG. 9C illustrates the high frequency magnetic field Hac generated by the spin torque oscillator 10.

As illustrated in FIGS. 9A to 9C, when the wave height of the external magnetic field Hext is large, the frequency fs of the high frequency magnetic field Hac becomes high, and vice versa. In addition, the amplitude (the difference between the wave heights of the magnetic field Hac1 and the magnetic field Hac2) of the high frequency magnetic field Hac is constant. Thus, when the intensity of the external magnetic field Hext is modulated irrespective of the recording magnetic field Hw, the frequency fs of the high frequency magnetic field Hac generated by the spin torque oscillator 10 is modulated.

And, the magnetic recording medium 80 resonates more easily with the high frequency magnetic field Hac when the high frequency magnetic field Hac with a modulated frequency is applied to the magnetic recording medium 80 than when the high frequency magnetic field Hac with a constant frequency is applied to the magnetic recording medium 80. That is, as illustrated in FIG. 9C, the phases of the high frequency magnetic field Hac and the magnetization 83 of the magnetic recording medium 80 coincide well with each other just when the frequency fs of the high frequency magnetic field Hac shifts from the period T3 of a relatively higher frequency to the period T4 of a relatively lower frequency.

For example, when the frequency fs of the high frequency magnetic field Hac oscillates, the high frequency magnetic field Hac can be absorbed during two to three revolutions of the magnetization 83 of the magnetic recording medium 80 even at the time when the resonant frequency changes on the way to the reversal of the magnetization 83 of the magnetic recording medium 80. On the other hand, when the frequency fs of the high frequency magnetic field Hac is constant, the high frequency magnetic field Hac can be absorbed during just one revolution. For this reason, when the frequency fs of the high frequency magnetic field Hac changes, the magnetic recording medium 80 resonates easily with the high frequency magnetic field Hac.

For this reason, when the high frequency magnetic field Hac is frequency-modulated, and the frequency fs thereof changes from a high frequency to a low frequency, the magnetic recording medium 80 resonates easily with the high frequency magnetic field Hac, and the energy of the high frequency magnetic field Hac can be absorbed more efficiently. As a result, a stable high frequency magnetic field assist recording is available with a relatively low frequency component of the high frequency magnetic field Hac. That is, making the magnetic recording medium 80 efficiently absorb the high frequency magnetic field Hac improves write-in capability. For this reason, even if magnetic grains included in the magnetic recording medium 80 have variations in their magnetic characteristics, it becomes possible to record on the magnetic recording medium 80, thereby expanding an allowable range for the characteristics variations.

Thus, according to the magnetic recording head 51 of this embodiment, a magnetic recording capable of performing a stable high frequency magnetic field assist recording is provided using a lower intensity high frequency magnetic field Hac.

As illustrated in FIGS. 9A to 9C, the external magnetic field Hext includes a frequency component based on the recording signal Sw of the recording magnetic field Hw, i.e., a component corresponding to the period T1, and a component of frequency higher than that of the recording signal Sw, i.e., a component corresponding to the period T2 (a component of the modulation signal Sm). Then, the period T1 is set as a time interval for the magnetic recording head to perform write-in onto one recording bit of the magnetic recording medium 80, i.e., a time interval for the magnetic recording head to pass through one recording bit.

On the other hand, the period T2 is set to be a time interval for the high frequency magnetic field Hac to be applied to each of two or more medium magnetic grains (magnetic grains) at least during a frequency-modulated period (a total period of the period T3 with a higher frequency and the period T4 with a lower modulated frequency magnetic field in the high frequency magnetic field Hac). That is, the period T2 is set to be a period for the magnetic recording head 51 to pass through one medium magnetic grain or shorter. That is, for example, when one recording bit includes N medium magnetic grains, the period T2 can be set as 1/N of the period T1.

Alternatively, the above-mentioned explains a designing guideline about the period T1 or the period T2, and these periods may be modified with variations in various constituents, manufacturing variations, etc.

Figure 10A:
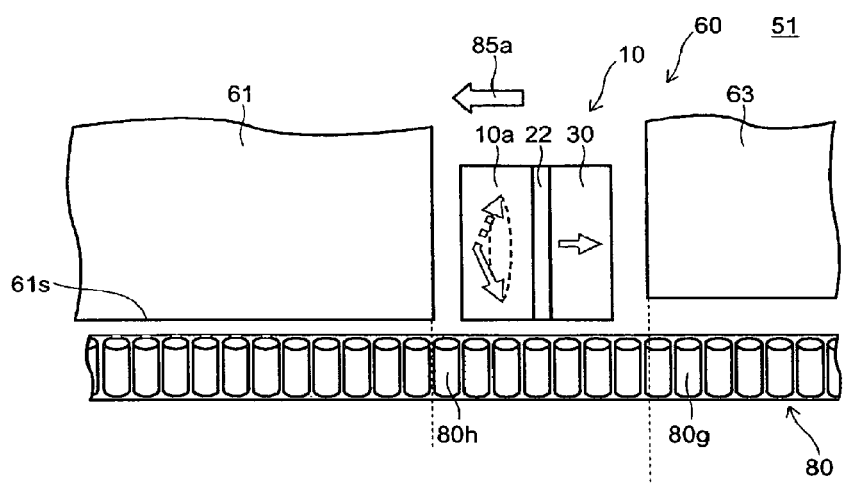
FIG. 10A is a schematic view illustrating an arrangement of a main magnetic pole in a writing head portion of a magnetic recording head according to the first embodiment of the invention.
Figure 10B:
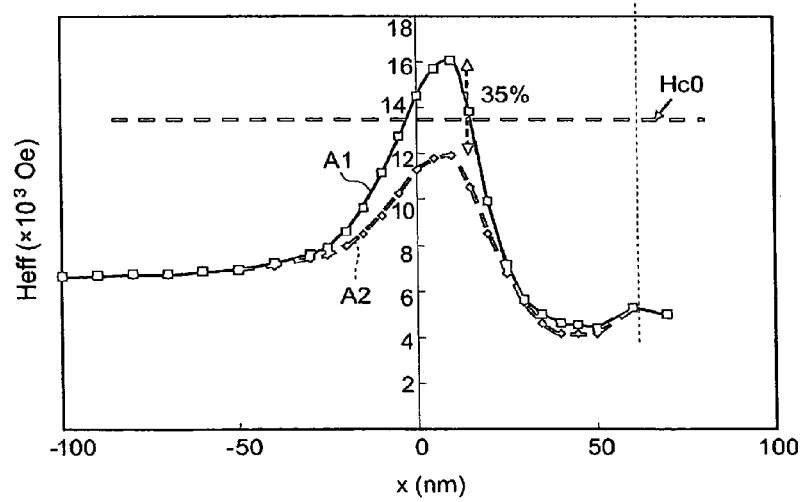
FIG. 10B is a graph illustrating a simulation of a characteristic of a magnetic recording head according to the first embodiment of the invention.

FIG. 10A is a schematic view illustrating an arrangement of the main magnetic pole 61 in the writing head portion 60 of the magnetic recording head 51 according to the first embodiment of the invention. FIG. 10A illustrates the spin torque oscillator 10, the controlling magnetic pole 63, and the magnetic recording medium 80 according to the first embodiment of the invention. In FIG. 10A, the first and second electrodes 41, 42 are left out. FIG. 10B is a graph illustrating a simulation of the characteristic of the magnetic recording head 51. That is, in FIG. 10B, the horizontal axis expresses the distance x in a direction from the main magnetic pole 61 towards the spin torque oscillator 10, and the vertical axis expresses an effective magnetic field Heff effectively applied to the magnetic recording medium 80. And, in the FIG. 10B, the characteristic (the dashed line A2) of a comparative example is also illustrated in addition to the characteristic (the solid line A1) of the magnetic recording head 51 according to this embodiment.

As illustrated in FIG. 10A, the spin torque oscillator 10 is arranged between the main magnetic pole 61 and the controlling magnetic pole 63. And, the oscillation layer 10a of the spin torque oscillator 10 is arranged on the side of the main magnetic pole 61, and the spin injection layer 30 is arranged on the side of the controlling magnetic pole 63. In this example, the distance between the main magnetic pole 61 and the controlling magnetic pole 63 is about 60 nm. However, in the present invention, the distance between the main magnetic pole 61 and the controlling magnetic pole 63 is optional.

On the other hand, the magnetic recording medium 80 is disposed to face the medium-facing surface 61s of the main magnetic pole 61. The medium-facing surface 61s faces the magnetic recording medium 80. The magnetic recording medium 80 includes the medium magnetic grains 80g (magnetic grains) which are microscopic grains. A diameter (size) of the medium magnetic grains 80g is, e.g., 7 nm, and a distance between the adjacent medium magnetic grains 80g is, e.g., 1 nm. Therefore, the alignment pitch of the medium magnetic grains 80g is 8 nm.

In this example, two or three grains of the medium magnetic grains 80g are used as one recording bit in the moving direction of the magnetic recording head. However, the present invention is not limited to this. The size of the above-mentioned medium magnetic grains 80g, the distance therebetween, and the number thereof corresponding to one recording bit is optional. For example, one recording bit may include just one medium magnetic grain 80g.

In the medium magnetic grains 80g, the boundaries among the grains can be observed on the surface of the magnetic recording medium 80 using a scanning electron microscope, etc. However, the boundaries among the medium magnetic grains 80g are not limited to this, and may not be necessarily clear. The medium magnetic grains 80g may stick to each other to form grain-aggregates whose sizes allow it to control the direction of the magnetization 83. For this reason, the medium magnetic grains 80g may be magnetic crystal grains included in a granular medium, for example, and may be magnetic discrete bits.

In this example, the magnetic recording head 51 moves in the direction of the arrow 85a relatively to the magnetic recording medium 80 to record information on the magnetic recording medium 80 by applying the recording magnetic field Hw from the main magnetic pole 61 while applying the high frequency magnetic field Hac from the spin torque oscillator 10. Therefore, FIG. 10A illustrates a certain instantaneous arrangement in which the magnetic recording head 51 and the magnetic recording medium 80 move relatively to each other.

As illustrated in FIG. 10B, the effective magnetic field Heff peaks at a distance x of about 10 nm, and has a maximum of $16.2 \times 10^3$ Oe at the distance x. Then, the magnetic recording medium 80 has a coercivity Hc0 of $13.5 \times 10^3$ Oe, and the effective magnetic field Heff is much larger than the coercivity Hc0. And, in the range of the distance x from 2 nm to 15 nm, the effective magnetic field Heff is larger than the coercivity Hc0. When the medium magnetic grains 80g of the magnetic recording medium 80 exist in the range of the distance x, the magnetization 83 of the medium magnetic grains 80g is reversed in accordance with the recording signal. In the example illustrated in FIG. 10A, the medium magnetic grain 80h is between the main magnetic pole 61 and the spin torque oscillator 10, and the direction of the magnetization 83 thereof is reversed.

On the other hand, the magnetic recording head of the comparative example does not have the controlling magnetic pole modulation coil 63b. Therefore, the modulating magnetic field component Hm illustrated in FIG. 6C is not applied to the spin torque oscillator 10. Therefore, the external magnetic field Hext applied to the spin torque oscillator 10 has a waveform to be formed by removing the modulating magnetic field component Hm from the external magnetic field Hext illustrated in FIG. 6D. That is, the wave form has only a component of the same frequency as the recording magnetic field Hw, and does not include the modulation signal Sm. In this case, since the absolute value of the external magnetic field Hext is constant, the frequency fs of the high frequency magnetic field Hac generated by the spin torque oscillator 10 is constant, and is not frequency-modulated.

Therefore, as illustrated in FIG. 10B, in the comparative example (the dashed line A2), the maximum of the effective magnetic field Heff is $12.0 \times 10^3$ Oe, and the effective magnetic field Heff is smaller than the coercivity Hc0 at any distance x. Therefore, in the medium magnetic grains 80g at any distance x, the effective magnetic field Heff is smaller than the coercivity Hc0, and cannot reverse the direction of the magnetization 83.

In the high frequency magnetic field assist recording, the high frequency magnetic field Hac is applied to the magnetic recording medium 80 so that the magnetic recording medium 80 resonates with the high frequency magnetic field Hac, thereby causing a reduction in the coercivity Hc0. Under this condition, the recording magnetic field Hw is applied to the magnetic recording medium 80 to record information thereon. FIG. 10B illustrates the effective magnetic field Heff which changes relatively to the constant coercivity Hc0 by assuming as follows. That is, it is assumed that the coercivity Hc0 of the magnetic recording medium 80 does not change and is constant even when the magnetic recording medium 80 resonates with the high frequency magnetic field Hac. It is known that the magnetic recording medium 80 resonates with the high frequency magnetic field Hac which is frequency-modulated to reduce the high frequency magnetic field necessary for write-in by 35%.

For this reason, the magnetic recording medium 80 resonates with the high frequency magnetic field Hac so that the effective magnetic field Heff exceeds the coercivity thereof to reverse the direction of the magnetization 83, thus allowing it to perform a magnetic recording. On the other hand, in the comparative example, the magnetic recording medium 80 does not fully resonate with the high frequency magnetic field Hac. As a result, the effective magnetic field Heff is smaller than the coercivity Hc0 at any time, and cannot reverse the direction of the magnetization 83, thus making it impossible to perform a magnetic recording.

Thus, according to the magnetic recording head 51 of this embodiment, the high frequency magnetic field Hac is frequency-modulated to allow a stable high frequency magnetic field assist recording with the high frequency magnetic field Hac of which intensity is lower than that of the comparative example by 35%.

In addition, it is preferable to apply a combination of the higher and lower modulated frequency magnetic fields of the frequency-modulated high frequency magnetic field Hac to the respective medium magnetic grains 80g included in the magnetic recording medium 80. That is, as was explained about FIG. 9, it is preferable to apply the high frequency magnetic field Hac to two or more medium magnetic grains included in a recording bit during at least one cycle (a total period of T3 for the higher frequency and T4 for the relatively lower frequency).

Therefore, the frequency of the modulation signal Sm (signal of the modulating magnetic field component Hm in this case) which oscillates at a frequency higher than that of the recording signal Sw is preferably not less than a relative velocity between the magnetic recording head 51 and the magnetic recording medium divided by the average size of the medium magnetic grains 80g included in the magnetic recording medium 80. Thereby, it is possible to apply the combination of the higher modulated frequency magnetic field and the lower modulated frequency magnetic field to each of the medium magnetic grains 80g. This allows each of the medium magnetic grains 80g to easily resonate with the high frequency magnetic field Hac, yielding a uniform write-in characteristic. This also allows it to reduce jitter in the magnetic recording and reproducing.

For example, when it is assumed as follows:
the magnetic recording medium 80 is a disk;
a peripheral velocity, i.e., a relative velocity between the magnetic recording head 51 and the magnetic recording medium 80, is 10 m/s; and
the average size of the medium magnetic grains 80g of the magnetic recording medium 80 is 7 nm,
the frequency of the modulation signal Sm can be not less than 1.5 GHz. Alternatively, the size of the medium magnetic grains 80g included in the magnetic recording medium 80 can particularly be a length of the medium magnetic grains 80g in a direction parallel to the moving direction of the magnetic recording head.

Figure 11:
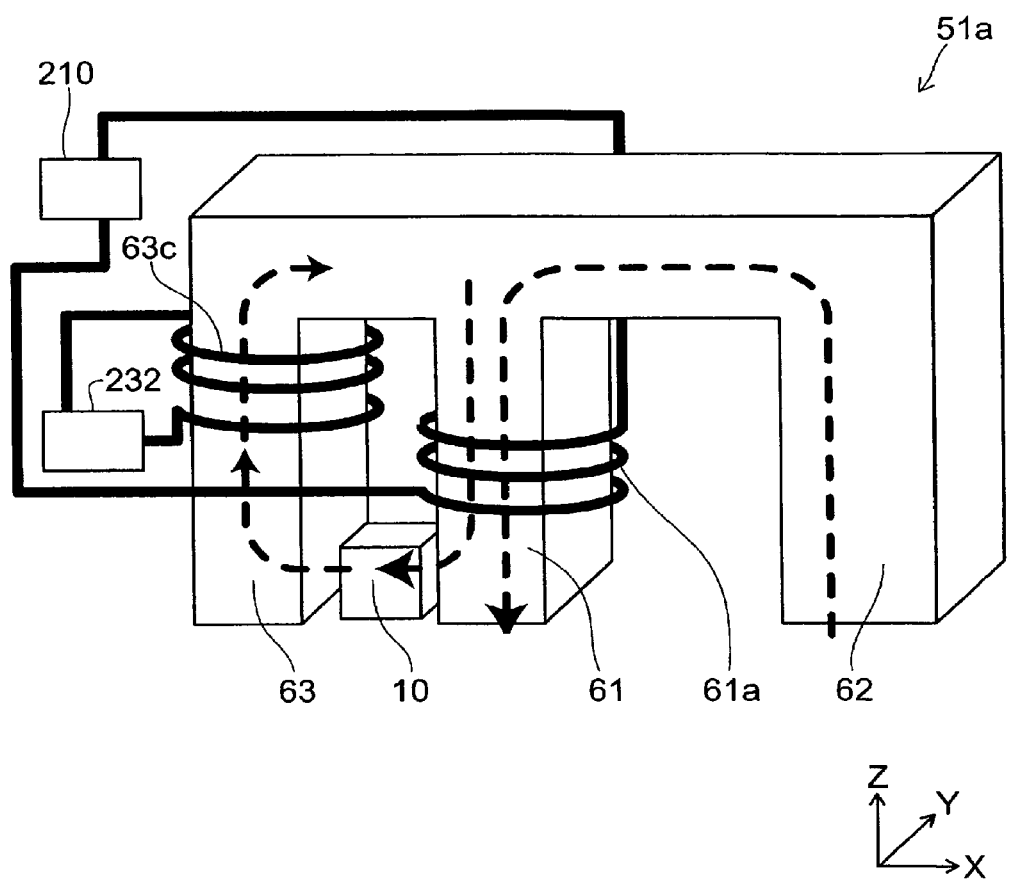
FIG. 11 is a perspective view schematically illustrating a structure of a substantial portion of another magnetic recording head according to the first embodiment of the invention.

FIG. 11 is a perspective view schematically illustrating a structure of a substantial portion of another magnetic recording head according to the first embodiment of the invention. As illustrated in FIG. 11, in another magnetic recording head 51a according to this embodiment, only one coil 63c is mounted to the controlling magnetic pole 63. Explanations are left out because anything except this is the same as the magnetic recording head 51.

In this case, the coil 63c mounted to the controlling magnetic pole 63 can be regarded as the controlling magnetic pole modulation coil 63b or as a coil serving as both the controlling magnetic pole modulation coil 63b and the controlling magnetic pole coil 63a. Explanations are made assuming the coil 63c serves as both the controlling magnetic pole coil 63a and the controlling magnetic pole modulation coil 63b.

The main magnetic pole coil 61a magnetizes the main magnetic pole 61 also in this case. And the coil 63c (the second coil) magnetizes the controlling magnetic pole 63, and a current can be passed therethrough irrespective of the main magnetic pole coil 61a. That is, for example, as illustrated in FIG. 11, the main magnetic pole coil 61a is connected to the recording current circuit 210, and the coil 63c is connected to the current circuit 232 (the second current circuit).

The frequency modulation of the high frequency magnetic field Hac generated in the spin torque oscillator 10 is carried out by applying the external magnetic field Hext which changes at a frequency higher than that of the recording signal Sw of the recording magnetic field Hw to be applied from the main magnetic pole 61 to the magnetic recording medium 80.

Figure 12A:
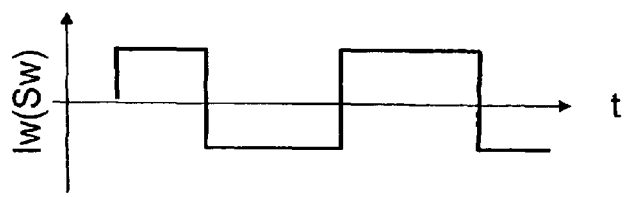
FIGS. 12A to 12E are schematic views illustrating currents to be passed through another magnetic recording head according to the first embodiment of the invention, and magnetic fields to be generate by the currents.
Figure 12B:
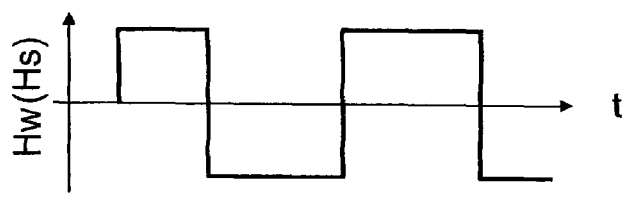
Figure 12C:
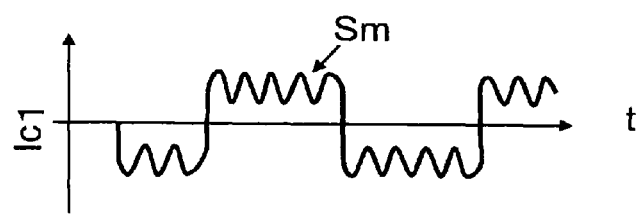
Figure 12D:
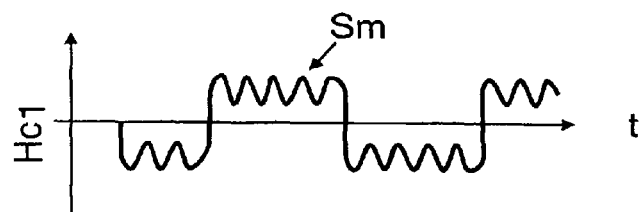
Figure 12E:
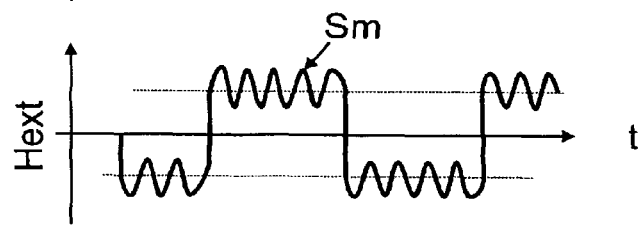

FIGS. 12A to 12E are schematic views illustrating currents to be passed through another magnetic recording head according to the first embodiment of the invention, and magnetic fields to be generate by the currents. That is, FIG. 12A illustrates the recording current Iw supplied to the recording signal Sw 61a at the time of recording information on the magnetic recording medium 80 by the main magnetic pole 61, i.e., the main magnetic pole coil 61a of the main magnetic pole 61, and FIG. 12B illustrates the recording magnetic field Hw generated by the main magnetic pole 61. As mentioned above, a portion of the magnetic field generated by the main magnetic pole 61 is the recording magnetic field Hw to be applied to the magnetic recording medium 80, and the other portion is the main magnetic pole application magnetic field Hs to be applied to the spin torque oscillator 10. Therefore, FIG. 12B illustrates also the main magnetic pole application magnetic field Hs simultaneously. FIG. 12C illustrates an controlling magnetic pole current Ic1 to be supplied to the coil 63c. FIG. 12D illustrates an controlling magnetic pole magnetic field Hc1 generated by the coil 63c. FIG. 12E illustrates the external magnetic field Hext to be applied to the spin torque oscillator 10. The main magnetic pole application magnetic field Hs and the controlling magnetic pole magnetic field Hc1 are superimposed on each other to be the external magnetic field Hext.

As illustrated in FIGS. 12A and 12B, the recording signal Sw, i.e., a magnetic field based on the recording current Iw is generated from the main magnetic pole 61 to be applied to the magnetic recording medium 80 as the recording magnetic field Hw. The other portion of the magnetic field generated by the main magnetic pole 61 is applied to the spin torque oscillator 10 as the main magnetic pole application magnetic field Hs. As mentioned above, the main magnetic pole application magnetic field Hs is a magnetic field including the recording signal Sw included in the recording magnetic field Hw.

On the other hand, as illustrated in FIG. 12C, the controlling magnetic pole current Ic1 is formed by superimposing the controlling current Ic on the controlling magnetic pole modulation current Im. The controlling current Ic changes in the same period as the recording signal Sw as illustrated in FIG. 5C. The controlling magnetic pole modulation current Im includes the modulation signal Sm which oscillates at a frequency higher than that of the recording signal Sw (recording current Iw) as illustrated in FIG. 5D. In addition, the frequency of the modulation signal Sm in the controlling magnetic pole current Ic1 is then set to be not less than 5 GHz, for example.

As illustrated in FIG. 12D, the controlling magnetic pole field Hc1 includes the modulation signal Sm, and is applied to the spin torque oscillator 10. The controlling magnetic pole field Hc1 is generated from the controlling magnetic pole 63 based on the controlling magnetic pole current Ic1 on which the modulation signal Sm, i.e., a high frequency component is superimposed. The modulation signal Sm oscillates at a frequency higher than that of the recording signal Sw.

As a result, as illustrated in FIG. 12E, the external magnetic field Hext to be applied to the spin torque oscillator 10 is formed by superimposing the main magnetic pole application magnetic field Hs and the controlling magnetic pole magnetic field Hc1 on each other. The controlling magnetic pole magnetic field Hc1 includes the high frequency component (the modulation signal Sm).

Thus, also in the magnetic recording head 51a according to this embodiment, a magnetic field is applied to the spin torque oscillator 10. The magnetic field includes the modulation signal Sm changing at a frequency higher than that of the recording signal Sw of the recording magnetic field Hw. This allows it to modulate the frequency fs of the high frequency magnetic field Hac generated from the spin torque oscillator 10 in response to the intensity of the external magnetic field Hext (the wave height of the external magnetic field Hext). As a result, the magnetic recording medium 80 resonates easily with the high frequency magnetic field Hac, thereby allowing it to perform a stable high frequency magnetic field assist recording with a lower intensity high frequency magnetic field Hac.

In the above explanation, it is assumed that the coil 63c serves as both the controlling magnetic pole coil 63a and the controlling magnetic pole modulation coil 63b. That is, it is also assumed that the current circuit 232 passes a current through the coil 63c. The current is supplied by superimposing the controlling magnetic pole modulation current Im including the modulation signal Sm on the controlling current Ic. However, the present invention is not limited to this. Alternatively, the coil 63c may serve only as the controlling magnetic pole modulation coil 63b. For example, the controlling magnetic pole current Ic1 supplied to the coil 63 may have the waveform of the controlling magnetic pole modulation current Im, e.g., illustrated in FIG. 5D. Thus, the controlling magnetic pole modulation current Im including only the modulation signal Sm may be passed through the coil 63c. This allows it to modulate the frequency fs of the high frequency magnetic field Hac.

Figure 13:
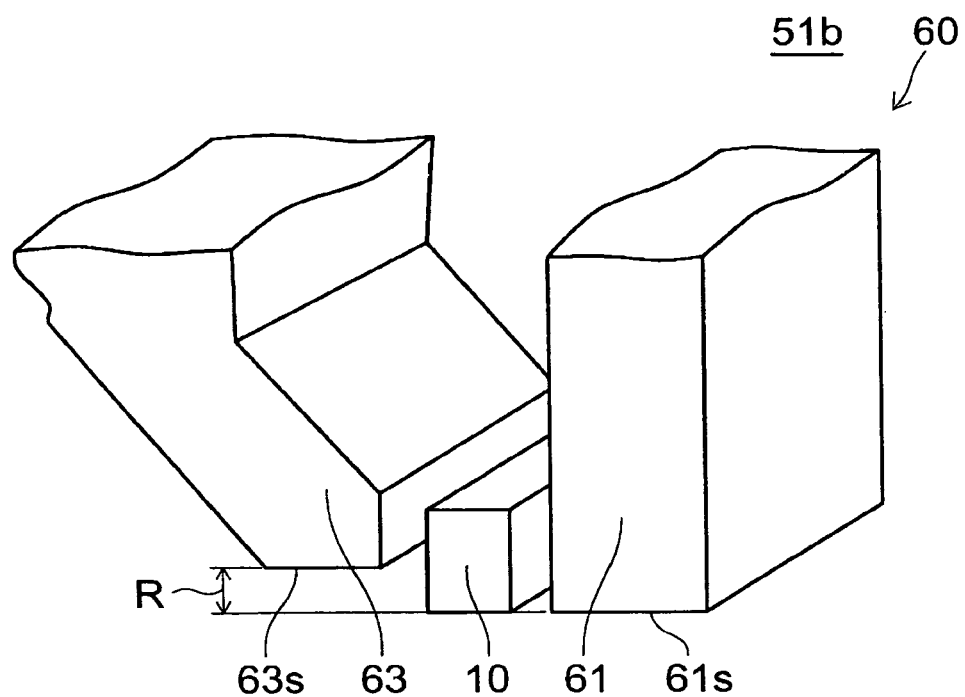
FIG. 13 is a perspective view schematically illustrating a structure of a substantial portion of another magnetic recording head according to the first embodiment of the invention.

FIG. 13 is a perspective view schematically illustrating a structure of a substantial portion of another magnetic recording head according to the first embodiment of the invention. As illustrated in FIG. 13, in another magnetic recording head 51b according to the first embodiment of the invention, an end face 63s on the side of the medium-facing surface 61s of the controlling magnetic pole 63 is recessed from the medium-facing surface 61s of the main magnetic pole 61. That is, the controlling magnetic pole 63 is more recessed than the main magnetic pole 61, viewed from the magnetic recording medium 80. Explanations are left out because anything except this is the same as the magnetic recording head 51.

That is, in the magnetic recording head 51b according to this embodiment, the end surface 63s of the controlling magnetic pole 63 is disposed more upward than the medium-facing surface 61s of the main magnetic pole 61. The distance between the end face 63s on the side of the medium-facing surface 61s of the controlling magnetic pole 63 and the magnetic recording medium 80 is longer than the distance between the medium-facing surface 61s of the main magnetic pole 61 and the magnetic recording medium 80 by a distance R.

This allows it to reduce an influence of the controlling magnetic pole 63 on the magnetic recording medium 80, thereby preventing a magnetic field generated by the controlling magnetic pole 63 from erasing information recorded on the magnetic recording medium 80.

The controlling magnetic pole 63 reduces the influence thereof on the magnetic recording medium 80 without substantially affecting the magnetic field applied to the spin torque oscillator 10. Thereby, the controlling magnetic pole 63 applies a suitable magnetic field to the spin torque oscillator 10 efficiently. This allows it to efficiently perform the frequency modulation of the high frequency magnetic field Hac generated in the spin torque oscillator 10.

Thus, the magnetic recording head 51b of this example is configured so that the controlling magnetic pole 63 is recessed so as not to magnetically affect the magnetic recording medium 80 directly. Alternatively, the magnetic recording head 51a may also be configured so that the controlling magnetic pole 63 is recessed. That is, when the controlling magnetic pole 63 is provided to the magnetic recording heads according to the embodiment of the invention, the controlling magnetic pole 63 is configured so as not to magnetically affect the magnetic recording medium 80 directly.

A surface of the magnetic recording medium 80 on the side of the spin torque oscillator 10 can be arranged in a plane parallel to the medium-facing surface 61s of the main magnetic pole 61. That is, the spin torque oscillator 10 is not recessed, but can be close to the magnetic recording medium 80, unlike the controlling magnetic pole 63. Thereby, the recording magnetic field Hw from the main magnetic pole 61 and the high frequency magnetic field Hac from the spin torque oscillator 10 can be efficiently applied to the magnetic recording medium 80 to perform an efficient magnetic recording.

As illustrated in FIG. 13, in the portion on the side of the spin torque oscillator 10, the shape of the controlling magnetic pole 63 can be formed so that the portion of the controlling magnetic pole 63 on the side of the spin torque oscillator 10 is close to the spin torque oscillator 10, i.e., close to the main magnetic pole 61, whereas the portion of the controlling magnetic pole 63 above the spin torque oscillator 10 is distant from the main magnetic pole 61. This structure allows it to make the spin torque oscillator 10 and the controlling magnetic pole 63 close to each other, and to efficiently apply the magnetic field of the controlling magnetic pole 63 to the spin torque oscillator 10, thereby expanding a margin of driving conditions for magnetic recording heads, and providing magnetic recording heads easy to manufacture.

Figure 14:
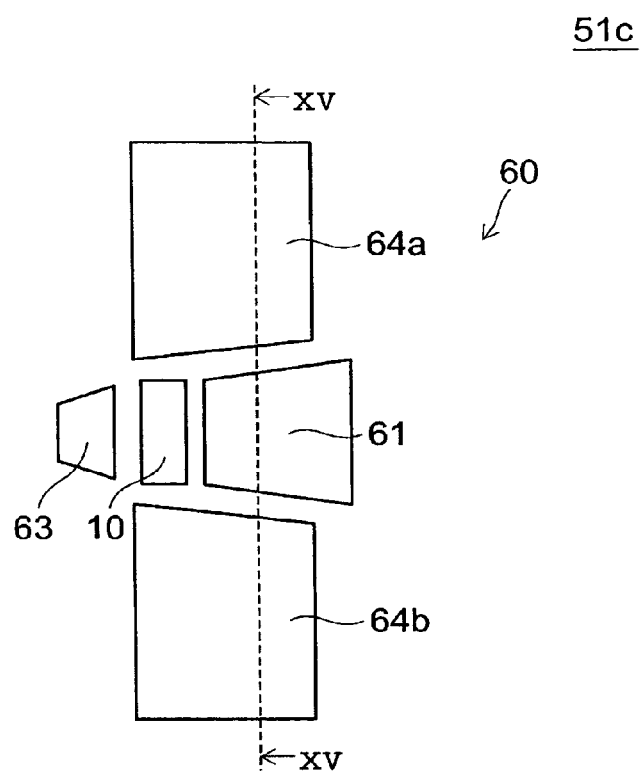
FIG. 14 is a schematic view illustrating a structure of a substantial portion of another magnetic recording head according to the first embodiment of the invention.
Figure 15:
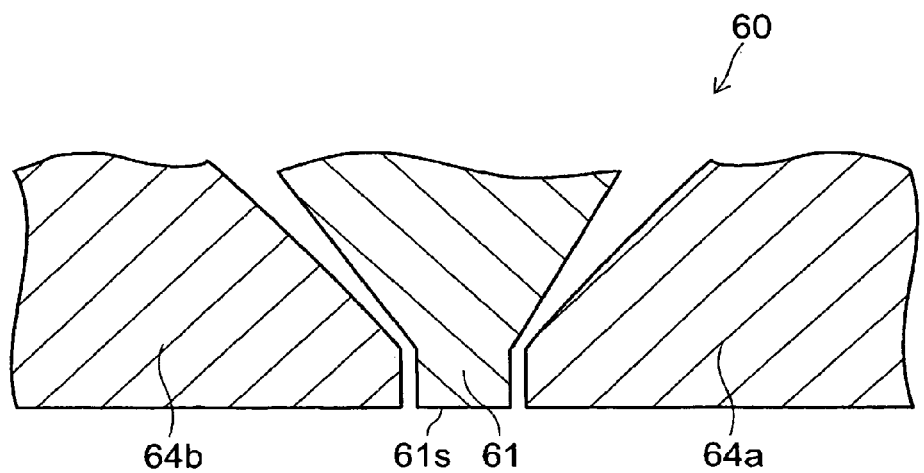
FIG. 15 is a sectional view cut along the line XV-XV of FIG. 14.

FIG. 14 is a schematic view illustrating a structure of a substantial portion of another magnetic recording head according to the first embodiment of the invention. FIG. 14 is a plain view illustrating the structure of the writing head portion 60 on the side of the medium-facing surface 61s. FIG. 15 is a sectional view cut along the line XV-XV of FIG. 14.

As illustrated in FIG. 14, another magnetic recording head 51c according to the first embodiment of the invention is provided with side shields 64a, 64b on the sides of the main magnetic pole 61 and the spin torque oscillator 10. That is, the main magnetic pole 61 and the spin torque oscillator 10 are arranged between the two shields 64a, 64b. The side shields 64a, 64b are arranged so as to face side walls of at least one of the main magnetic pole 61 and the spin torque oscillator 10. The side walls are normal to the medium-facing surface 61s of the main magnetic pole 61. The side shields 64a, 64b are aligned in a direction normal to the alignment direction of the main magnetic pole 61 and the spin torque oscillator 10. Explanations are left out because anything except this is the same as the magnetic recording head 51.

In another magnetic recording head 51c according to this embodiment, it is possible to control spatial spreads of the recording magnetic field Hw from the main magnetic pole 61 and the high frequency magnetic field Hac from the spin torque oscillator 10 to adjacent tracks on the magnetic recording medium 80. Thereby, the recording magnetic field Hw from the main magnetic pole 61 and the high frequency magnetic field Hac from the spin torque oscillator 10 are superimposed on each other, and focused on a gap area between the main magnetic pole 61 and the spin torque oscillator 10. The gap area is a recording area of the high frequency magnetic field assist recording. That is, a side-fringe magnetic field is controlled. As a result, it becomes possible to record just on a targeted track, thereby enabling a more efficient and higher density recording.

Alternatively, the side shields 64a, 64b can be integrated with the return path 62.

It is possible to make short the distance between the side shields 64a, 64b and the main magnetic pole 61 near the medium-facing surface 61s of the main magnetic pole 61, and make long the distance therebetween far from the medium-facing surface 61s of the main magnetic pole 61, as illustrated in FIG. 15. The recording magnetic field Hw of the main magnetic pole 61 can be focused more efficiently near the medium-facing surface 61s, thereby allowing a more effective recording. Alternatively, the side shields 64a, 64b may be provided also to the above-mentioned magnetic recording heads 51a, 51b.

Furthermore, the arrangement of the return path 62 is optional. That is, in the magnetic recording head 51 illustrated in FIG. 1, the main magnetic pole 61 is arranged between the controlling magnetic pole 63 and the return path 62. Alternatively, the controlling magnetic pole 63 may be arranged between the main magnetic pole 61 and the return path 62. That is, the return path 62 can be disposed at any optional position in the respective arrangements of the main magnetic pole 61, the controlling magnetic pole 63, and the spin torque oscillator 10.

Second Embodiment

Figure 16:
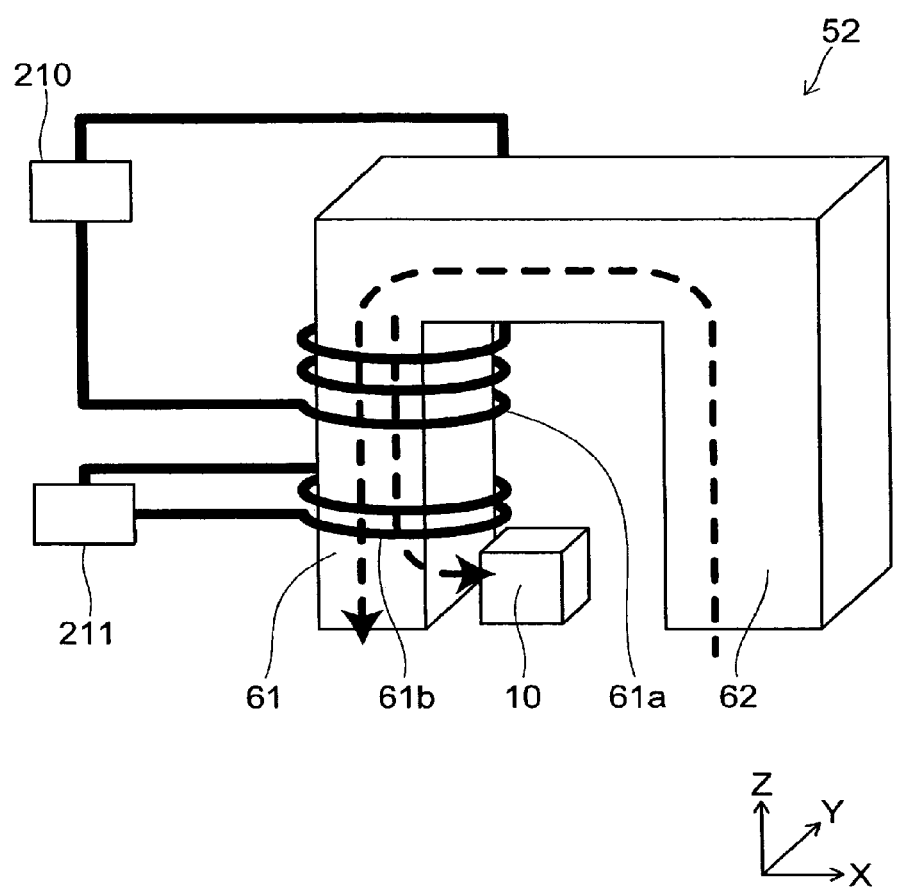
FIG. 16 is a perspective view schematically illustrating a structure of a substitutional portion of a magnetic recording head according to a second embodiment of the invention.

FIG. 16 is a perspective view schematically illustrating a structure of a substantial portion of a magnetic recording head according to a second embodiment of the invention. As illustrated in FIG. 16, another magnetic recording head 52 according to this embodiment is not provided with the controlling magnetic pole 63, and the main magnetic pole modulation coil 61b (the modulating coil, i.e., the second coil) is mounted to the main magnetic pole 61.

The magnetic recording head 52 is provided with a main magnetic pole 61 to apply the recording magnetic field Hw to the magnetic recording medium 80, the spin torque oscillator 10 arranged together with the main magnetic pole 61, the main magnetic pole coil 61a, and the main magnetic pole modulation coil 61b capable of passing a current therethrough to magnetize the main magnetic pole 61 irrespective of the main magnetic pole coil 61a.

That is, e.g., as illustrated in FIG. 16, the main magnetic pole coil 61a is connected to a recording current circuit 210, and the main magnetic pole modulation coil 61b is connected to a main magnetic pole modulation current circuit 211 (the second current circuit).

The external magnetic field Hext is applied to the spin torque oscillator 10 to modulate the frequency fs of the high frequency magnetic field Hac generated in the spin torque oscillator 10. The external magnetic field Hext changes at a frequency higher than that of the recording signal Sw of the recording magnetic field Hw to be applied to the magnetic recording medium 80.

Alternatively, the same materials as those for the main magnetic pole coil 61a or the controlling magnetic pole modulation coil 63b mentioned above can be employed for the main magnetic pole modulation coil 61b. The main magnetic pole modulation coil 61b can operate as well as the controlling magnetic pole modulation coil 63b.

Figure 17A:
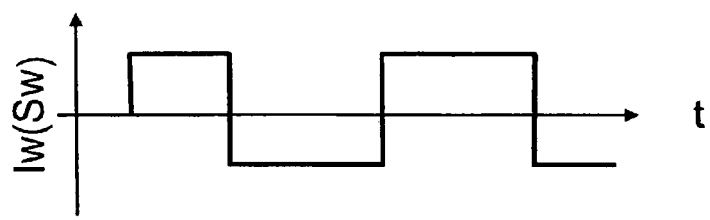
FIGS. 17A to 17E are schematic views illustrating currents to be passed through the magnetic recording head according to the second embodiment of the invention, and magnetic fields to be generated by the currents.
Figure 17B:
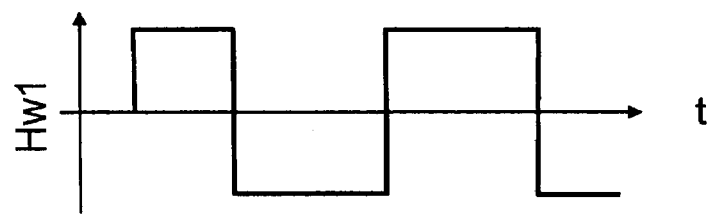
Figure 17C:
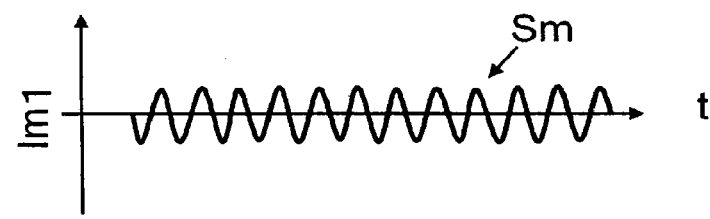
Figure 17D:
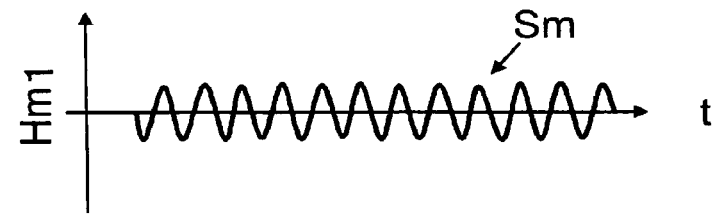
Figure 17E:
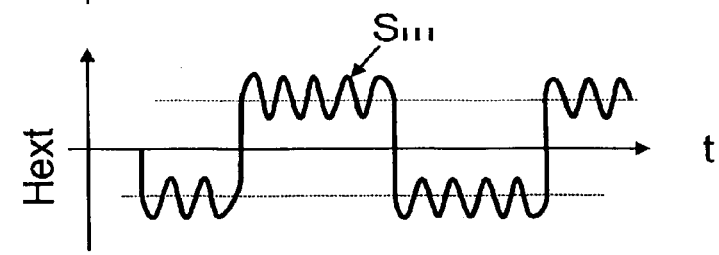

FIGS. 17A to 17E are schematic views illustrating currents to be passed through the magnetic recording head according to the second embodiment of the invention, and magnetic fields to be generated thereby. That is, FIG. 17A illustrates a recording current Iw to be supplied to the main magnetic pole coil 61a of the main magnetic pole 61, i.e., the recording signal Sw for recording information on the magnetic recording medium 80 via the main magnetic pole 61. FIG. 17B illustrates a recording magnetic field component Hw1 generated by the main magnetic pole 61. A portion of the recording magnetic field component Hw1 is applied to the magnetic recording medium 80, and the other portion thereof is applied to the spin torque oscillator 10. FIG. 17C illustrates a main magnetic pole modulation current Im1 (modulating current) supplied to the main magnetic pole modulation coil 61b. FIG. 17D illustrates a main magnetic pole modulating magnetic field component Hm1. FIG. 17E illustrates the external magnetic field Hext to be applied to the spin torque oscillator 10. A portion of the above-mentioned recording magnetic field component Hw1 and the main magnetic pole modulating magnetic field component Hm1 are superimposed on each other.

As illustrated in FIGS. 17A and 17B, the recording magnetic field component Hw1 based on the recording current Iw, i.e., the recording signal Sw, is generated from the main magnetic pole 61, and a portion of the recording magnetic field component Hw1 is applied to the spin torque oscillator 10.

On the other hand, as illustrated in FIG. 17C, the current same as the current including the modulation signal Sm illustrated in FIG. 5D is used for the main magnetic pole modulation current Im1. At this time, a superimposed current of the modulation signal Sm illustrated in FIG. 5C and the controlling current Ic illustrated in FIG. 5D may be used as the main magnetic pole modulation current Im1. The frequency of the modulation signal Sm, which oscillates at a frequency higher than the frequency of the recording signal Sw (recording current Iw), is set to be higher than 1.5 GHz.

Thereby, as illustrated in FIG. 17D, the main magnetic pole modulating magnetic field component Hm1 changes at a frequency higher than the frequency of the recording signal Sw included in the recording magnetic field Hw to be applied to the spin torque oscillator 10. Here, the main magnetic pole modulating magnetic field component Hm1 is generated from the main magnetic pole 61, and based on the main magnetic pole modulation current Im1 on which the high frequency component (modulation signal Sm) is superimposed.

As illustrated in FIG. 17E, the external magnetic field Hext applied to the spin torque oscillator 10 is formed of the above-mentioned recording magnetic field component Hw1 (a portion thereof), and the main magnetic pole modulating magnetic field component Hm1 on which the high frequency component is superimposed, thereby being formed of the following two magnetic fields:

a magnetic field with the frequency of the recording signal Sw included in the recording magnetic field Hw; and a magnetic field including the modulation signal Sm which changes at a frequency higher than that of the recording signal Sw included in the recording magnetic field Hw.

Thus, also in the magnetic recording head 52 according to this embodiment, the magnetic field including the modulation signal Sm which changes at a frequency higher than that of the recording signal Sw of the recording magnetic field Hw is applied to the spin torque oscillator 10. This allows it to modulate the frequency fs of the high frequency magnetic field Hac generated from the spin torque oscillator 10 in response to the intensity (wave height of Hext) of the external magnetic field Hext. As a result, the magnetic recording medium 80 resonates easily with the high frequency magnetic field Hac, thereby allowing it to perform a stable high frequency magnetic field assist recording with a lower intensity high frequency magnetic field Hac.

The main magnetic pole modulation coil 61b may be mounted to, for example, the magnetic recording heads 51, 51a to 51c when the controlling magnetic pole 63 is provided. In this case, the main magnetic pole modulation coil 61b can be provided irrespective of the existence of the controlling magnetic pole modulation coil 63b of the controlling magnetic pole 63 or the coil 63c. When providing the controlling magnetic pole modulation coils 63b, 63c of the controlling magnetic pole 63 and the main magnetic pole modulation coil 61b simultaneously, it is possible to generate a highly precise modulating magnetic field using a highly precise modulation signal Sm by these coils provided, and to thus apply a highly precise external magnetic field Hext, thereby allowing a highly precise control. Alternatively, the side shields 64a, 64b may be provided to the magnetic recording head 52.

Third Embodiment

Figure 18:
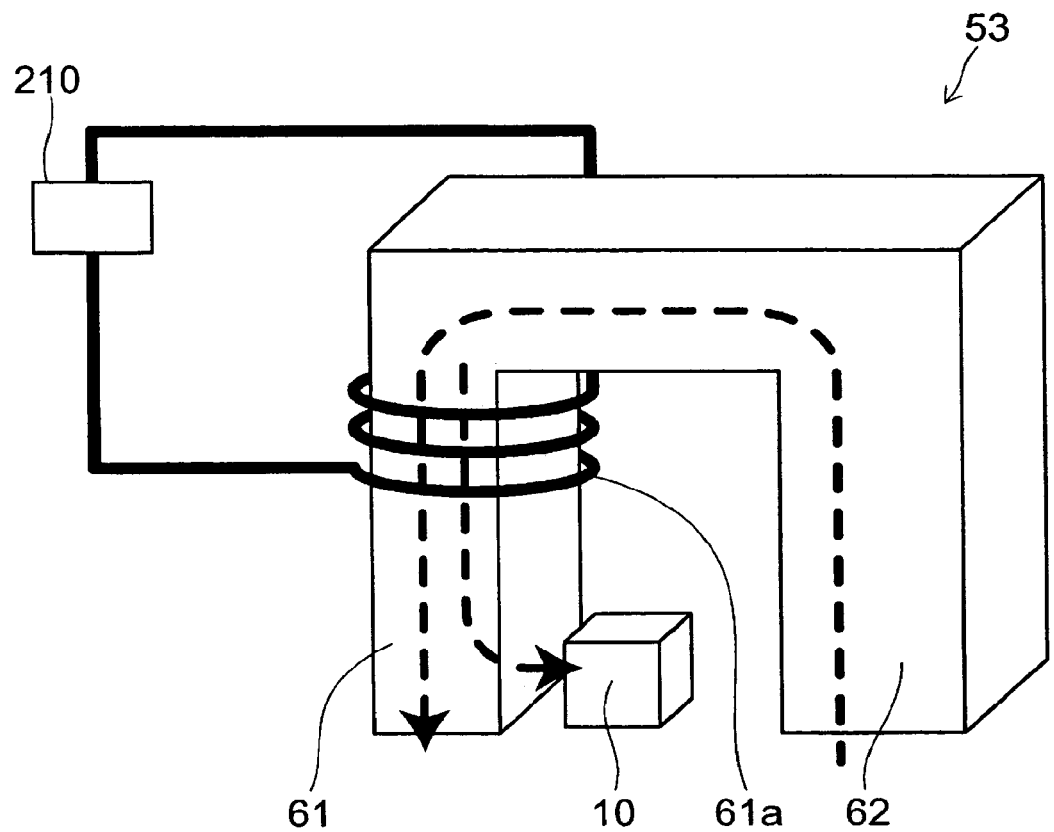
FIG. 18 is a perspective view schematically illustrating a structure of a substantial portion of a magnetic recording head according to a third embodiment of the invention.

FIG. 18 is a perspective view schematically illustrating a structure of a substantial portion of a magnetic recording head according to a third embodiment of the invention. As illustrated in FIG. 18, another magnetic recording head 53 according to this embodiment is provided with neither the controlling magnetic pole 63 nor the main magnetic pole modulation coil 61b of the main magnetic pole 61. Then, a current with a component changing at a frequency higher than that of the recording signal Sw of the recording magnetic field Hw is being passed through the main magnetic pole coil 61a. Here, the recording magnetic field Hw records information on the magnetic recording medium 80.

The magnetic recording head 53 is provided with the main magnetic pole 61, the spin torque oscillator 10, and the main magnetic pole coil 61a. Here, the main magnetic pole 61 applies the recording magnetic field Hw to the magnetic recording medium 80. The spin torque oscillator 10 is provided to the main magnetic pole 61. The main magnetic pole coil 61a magnetizes the main magnetic pole 61. The current with the modulation signal Sm changing at a frequency higher than that of the recording signal Sw of the recording magnetic field Hw is being passed through the main magnetic pole coil 61a.

For example, as illustrated in FIG. 18, the main magnetic pole coil 61a is connected to the recording current circuit 210. And a current including the modulation signal Sm changing at a frequency higher than that of the recording signal Sw of the recording magnetic field Hw is supplied from the recording current circuit 210 to the main magnetic pole coil 61a. Here, the recording magnetic field Hw records information on the magnetic recording medium 80.

Thereby, the magnetic field (external magnetic field Hext) including the modulation signal Sm changing at a frequency higher than that of the recording signal Sw of the recording magnetic field to be applied from the main magnetic pole 61 to the magnetic recording medium 80 is applied to the spin torque oscillator 10 to modulate the frequency fs of the high frequency magnetic field Hac generated in the spin torque oscillator 10.

Figure 19A:
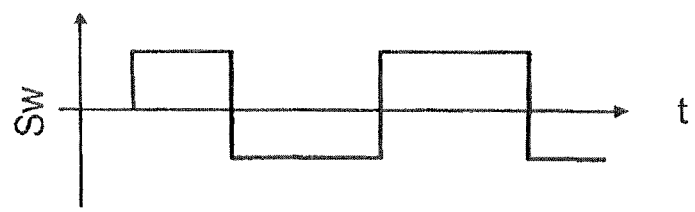
FIGS. 19A to 19D are schematic views illustrating currents to be passed through the magnetic recording head according to the third embodiment of the invention, and magnetic fields to be generated by the currents.
Figure 19B:
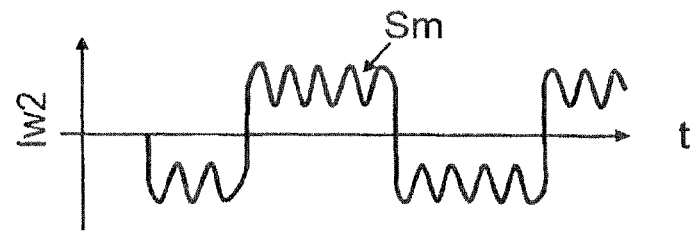
Figure 19C:
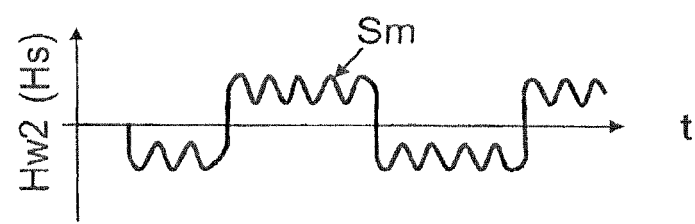

FIGS. 19A to 19D are schematic views illustrating currents to be passed through the magnetic recording head according to the third embodiment of the invention, and magnetic fields to be generated by the currents. That is, FIG. 19A illustrates a recording signal Sw at the time of recording information on the magnetic recording medium 80 via the main magnetic pole 61. And FIG. 19B illustrates a recording current Iw2 to be supplied to the main magnetic pole coil 61a of the main magnetic pole 61. FIG. 19C illustrates a recording magnetic field Hw2 generated by the main magnetic pole 61 to be applied to the magnetic recording medium 80. FIG. 19C illustrates also a main magnetic pole application magnetic field Hs generated by the main magnetic pole 61 to be applied to the spin torque oscillator 10. FIG. 19C illustrates an external magnetic field Hext to be applied to the spin torque oscillator 10.

As illustrated in FIG. 19A, the recording signal Sw is a signal, which changes with time, based on information to be recorded on the magnetic recording medium 80. As illustrated in FIG. 19B, the recording current Iw2 including the component of the recording signal Sw and the modulation signal Sm which changes at a frequency higher than that of the recording signal Sw is passed through the main magnetic pole coil 61a.

As illustrated in FIG. 19C, a magnetic field is generated from the main magnetic pole 61 on the basis of the recording current Iw2, and a portion thereof is applied to the magnetic recording medium 80 as the recording magnetic field Hw2. And another portion of the magnetic field generated from the main magnetic pole 61 is applied to the spin torque oscillator 10 as the main magnetic pole application magnetic field Hs. This recording magnetic field Hw2 and the main magnetic pole application magnetic field Hs have a component of the recording signal Sw to record information, and a component of the modulation signal Sm changing at a frequency higher than that of the recording signal Sw.

Figure 19D:
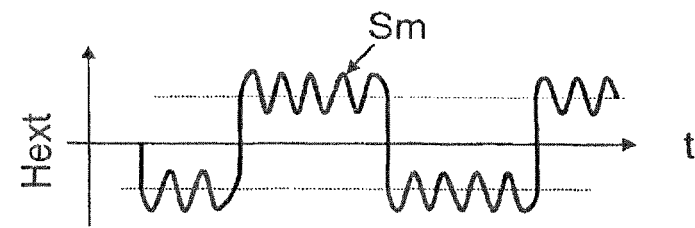

Thereby, as illustrated in FIG. 19D, the external magnetic field Hext to be applied to the spin torque oscillator 10 is the same magnetic field as the above-mentioned recording magnetic field Hw2, i.e., the main magnetic pole application field Hs. The external magnetic field Hext is also formed of the following two fields:

the magnetic field component with a frequency of the recording signal Sw included in the recording magnetic field Hw2; and the magnetic field generated by the modulation signal Sm changing at a frequency higher than that of the recording signal Sw included in the recording magnetic field Hw2, which are superimposed on each other.

Thus, also in the magnetic recording head 53 according to this embodiment, the magnetic field including the modulation signal Sm changing at a frequency higher than that of the recording signal Sw of the recording magnetic field Hw2 is applied to the spin torque oscillator 10. This allows it to modulate the frequency fs of the high frequency magnetic field Hac generated from the spin torque oscillator 10 in response to the intensity of the external magnetic field Hext (the wave height of the external magnetic field Hext). As a result, the magnetic recording medium 80 resonates easily with the high frequency magnetic field Hac, thereby allowing it to perform a stable high frequency magnetic field assist recording with a lower intensity high frequency magnetic field Hac. Alternatively, the magnetic recording head 53 may be provided with the side shields 64a, 64b.

Figure 20A:
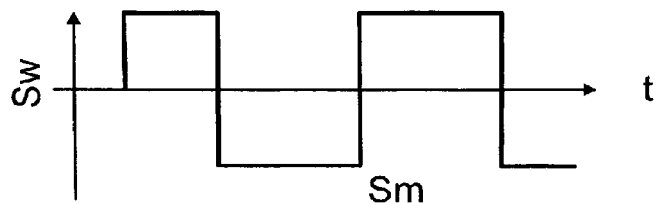
FIGS. 20A to 20F are schematic views illustrating external magnetic fields applied to a spin torque oscillator of the magnetic recording head according to the third embodiment of the invention.

FIGS. 20A to 20F are schematic views illustrating external magnetic fields applied to the spin torque oscillator of the magnetic recording head according to the embodiment of the invention. FIG. 20A illustrates the recording signal Sw of the magnetic recording head. FIGS. 20B to 20F illustrate various kinds of modified examples of the external magnetic field Hext to be applied to the spin torque oscillator 10.

As illustrated in FIG. 20A, the signal component of the recording current Iw for recording information to be passed through the main magnetic pole coil 61a of the main magnetic pole 61 is the recording signal Sw.

Figure 20B:
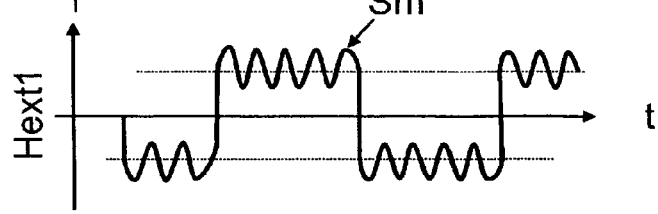

As illustrated in FIG. 20B, the external magnetic field Hext1 to be applied to the spin torque oscillator 10 has a waveform which superimposes the wave form of the recording signal Sw on that of the magnetic field (magnetic field including the modulation signal Sm) which changes in a sine wave at a frequency higher than that of the recording signal Sw. In addition, the external magnetic field Hext1 with this waveform corresponds to the above-mentioned external magnetic field Hext.

Figure 20C:
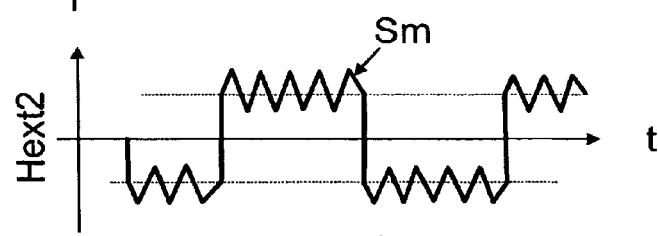
Figure 20D:
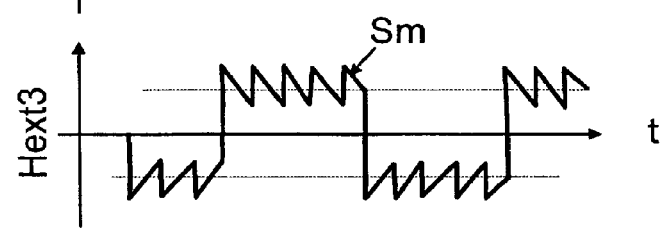
Figure 20E:
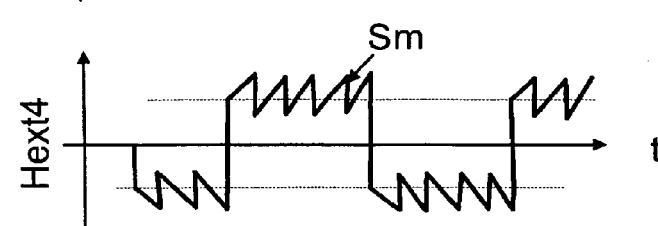
Figure 20F:
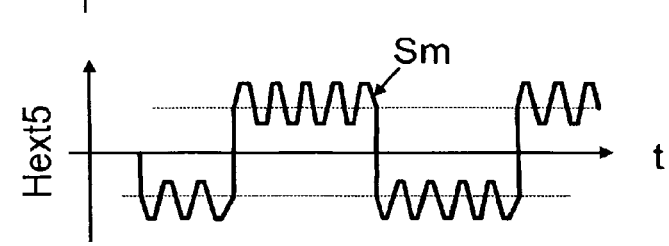

As illustrated in FIG. 20C, the magnetic field (magnetic field including the modulation signal Sm) having a triangle waveform whose rise time and fall time are substantially equal to each other is superimposed on the external magnetic field Hext2 of the modified example. As illustrated in FIG. 20D, the magnetic field (magnetic field including the modulation signal Sm) having a triangle waveform whose rise time and fall time are nearly zero and long, respectively, is superimposed on the external magnetic field Hext3 of another modified example. As illustrated in FIG. 20E, the magnetic field (magnetic field including the modulation signal Sm) having a triangle waveform whose rise time and fall time are long and nearly zero, respectively, is superimposed on the external magnetic field Hext4 of another modified example. As illustrated in FIG. 20F, the magnetic field (magnetic field including the modulation signal Sm) having a trapezoid waveform, whose rise and fall have a certain amount of time interval, with a maximum maintained for a given length of time is superimposed on the external magnetic field Hext5 of another modified example.

All of these external magnetic fields Hext1 to Hext5 include modulation signal Sm changing at a frequency higher than that of the recording signal Sw included in the recording magnetic field Hw (and the recording magnetic field Hw2) to be applied to the magnetic recording medium 80 for recording information.

This allows it to modulate the frequency of the high frequency magnetic field Hac generated from the spin torque oscillator 10 in response to the intensity of the external magnetic field Hext (the wave height of the external magnetic field Hext), and provide a magnetic recording head capable of performing a stable high frequency magnetic field assist recording using a lower intensity high frequency magnetic field Hac.

In the magnetic recording heads 52, 53 illustrated in FIG. 16 and FIG. 18, respectively, the spin torque oscillator 10 is arranged between the main magnetic pole 61 and the return path 62, while the arrangement of the spin torque oscillator 10 is optional. For example, the spin torque oscillator 10 may be arranged on the opposite side of the return path 62 of the main magnetic pole 61.

Fourth Embodiment

A magnetic recording head 54 (not shown) according to a fourth embodiment of the invention can have the same structure as the magnetic recording heads 51, 51a, 51b, 51c, 52, and 53 according to the first to third embodiments mentioned above. However, the waveform of the external magnetic field Hext applied to the spin torque oscillator 10 of the magnetic recording head 54 differs from those of the magnetic recording heads 51, 51a, 51b, 51c, 52, and 53. An example applied to the magnetic recording head 51 provided with the controlling magnetic pole 63, the controlling magnetic pole coil 63a, and the controlling magnetic pole modulation coil 63b is explained below.

Figure 21A:
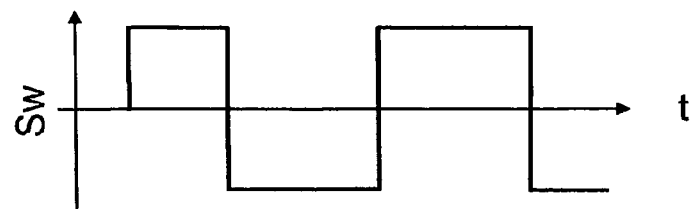
FIGS. 21A to 21D are schematic views illustrating currents to be passed through the magnetic recording head according to a fourth embodiment of the invention.
Figure 21B:
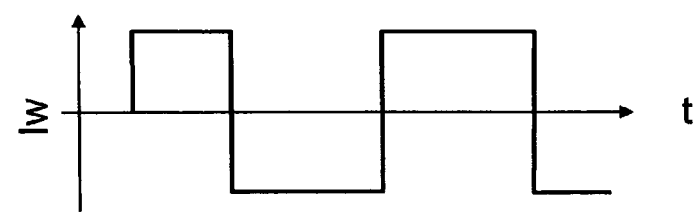
Figure 21C:
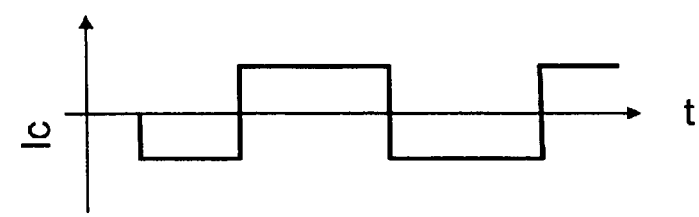
Figure 21D:
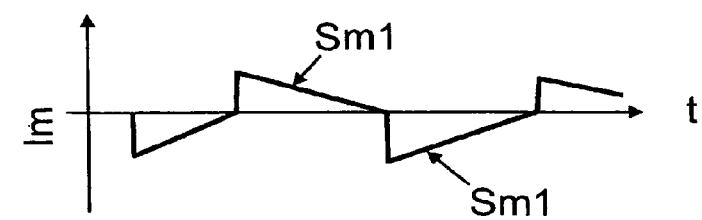

FIGS. 21A to 21D are schematic views illustrating currents to be passed through the magnetic recording head according to the fourth embodiment of the invention. FIG. 21A illustrates the recording signal Sw for recording information on the magnetic recording medium 80 via the main magnetic pole 61. FIG. 21B illustrates the recording current supplied to the main magnetic pole coil 61a. FIG. 21C illustrates the controlling current Ic supplied to the controlling magnetic pole coil 63*a*. FIG. 21D illustrates the controlling magnetic pole modulation current Im supplied to the controlling magnetic pole modulation coil 63*b*.

Figure 22A:
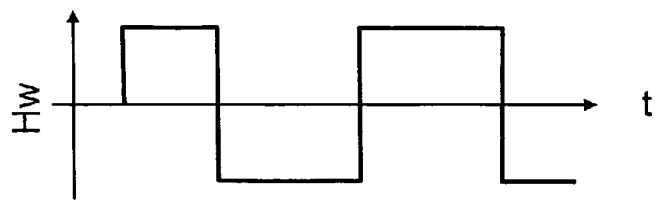
FIGS. 22A to 22E are schematic views illustrating magnetic fields to be generated in the magnetic recording head according to the fourth embodiment of the invention.
Figure 22B:
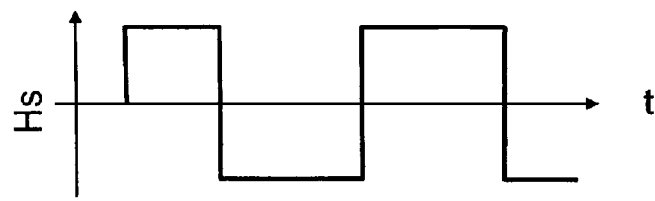
Figure 22C:
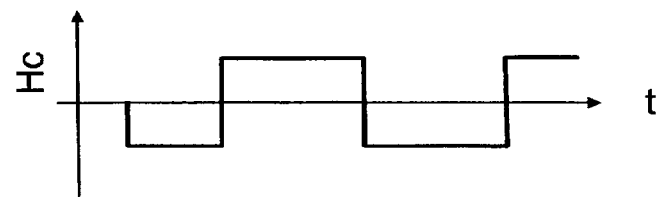
Figure 22D:
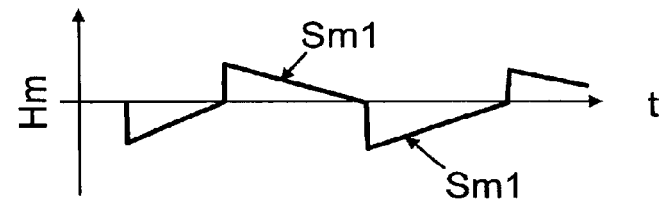

FIGS. 22A to 22E are schematic views illustrating magnetic fields to be generated in the magnetic recording head according to the fourth embodiment of the invention. FIG. 22A illustrates a recording magnetic field, which is generated from the magnetic pole coil 61*a* of the magnetic pole 61, to be applied to the magnetic recording medium 80. FIG. 22B illustrates a main magnetic pole application field Hs generated by the main magnetic pole coil 61*a* from the main magnetic pole 61 to be applied to the spin torque oscillator 10. FIG. 22C illustrates an controlling magnetic field component Hc generated from the controlling magnetic pole 63 of the controlling magnetic pole coil 63*a*. FIG. 22D illustrates a modulating magnetic field component Hm generated from the controlling magnetic pole modulation coil 63*b* of the controlling magnetic pole 63. FIG. 6E illustrates the external magnetic field Hext which superimposes the respective magnetic fields mentioned above on each other to be applied to the spin torque oscillator.

As illustrated in FIGS. 21A, 21B and 21C, the recording signal Sw, i.e., the recording current Iw changes based on information to be recorded on the magnetic recording medium 80. A magnetic field is generated from the main magnetic pole 61 based on the recording signal Sw, i.e., the recording current Iw to be applied to the magnetic recording medium 80 as the recording magnetic field Hw.

Then, as illustrated in FIG. 22B, a portion of the magnetic field generated from the main magnetic pole 61 is applied to the spin torque oscillator 10 as the main magnetic pole application magnetic field Hs. The main magnetic pole application magnetic field Hs is a magnetic field which changes with time as well as the recording magnetic field Hw. That is, the main magnetic pole application magnetic field Hs also includes the recording signal Sw.

On the other hand, as illustrated in FIG. 21C and FIG. 22C, the controlling magnetic field component Hc is generated from the controlling magnetic pole 63 based on the controlling current Ic, and is applied to the spin torque oscillator 10. The controlling current Ic controls differences among recording conditions of the magnetic recording media 80 or a variation in the oscillation characteristic of the spin torque oscillator 10.

As illustrated in FIG. 21D, the controlling magnetic pole modulation current Im has the recording signal Sw, i.e., the same frequency as that of the recording current Iw, and the current value thereof changes in the triangle waveform pulses. That is, the controlling magnetic pole modulation current Im includes the modulation signal Sm1 having the same frequency as the recording signal Sw. The modulation signal Sm1 changes its absolute value in one cycle.

Thereby, as illustrated in FIG. 22D, the modulating magnetic field component Hm is generated from the controlling magnetic pole 63, and changes in the triangle waveform pulses to be applied to the spin torque oscillator 10. That is, the modulating magnetic field component Hm includes the modulation signal Sm1 having the same frequency as the recording signal Sw. The modulation signal Sm1 changes its absolute value in one cycle.

Figure 22E:
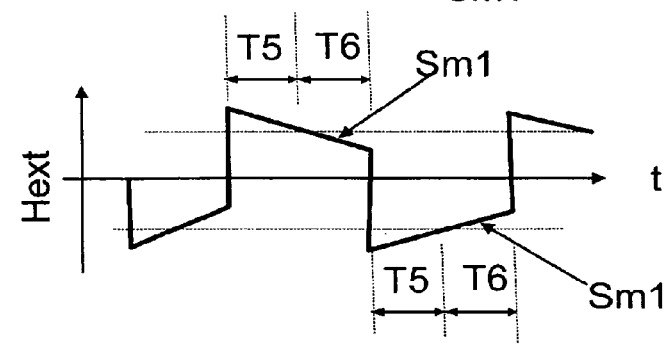

As illustrated in FIG. 22E, the external magnetic field Hext applied to the spin torque oscillator 10 is formed of the above-mentioned main magnetic pole application magnetic field Hs, the controlling magnetic field component Hc, and the modulating magnetic field component Hm. The external magnetic field Hext has the same frequency as that of the recording signal Sw, and the intensity thereof changes in the triangle waveform pulses. That is, the external magnetic field Hext has the same frequency as the recording signal Sw, and changes its absolute value in one cycle.

As a result, the frequency fs of the high frequency magnetic field Hac becomes high in a period T5 where the wave height of the external magnetic field Hext is relatively large, whereas the frequency fs thereof becomes low in a period T6 where the wave height thereof is relatively small.

When the intensity of the external magnetic field Hext applied to the spin torque oscillator 10 is regulated in a triangle waveform, it is possible to modulate the frequency fs of the high frequency magnetic field Hac generated by the spin torque oscillator 10.

When using such an external magnetic field Hext, a magnetic field component thereof having a relatively larger absolute value and a magnetic field component thereof having a relatively smaller absolute value are continuously applied to the respective magnetic grains of the magnetic recording medium 80. A total time of T5 and T6 is set to a transit time which is necessary for the magnetic recording head 51 to pass on surfaces of the respective magnetic grains of the magnetic recording medium 80. Here, T5 is a period where the wave height of the external magnetic field Hext is relatively large, whereas T6 is a period where the wave height thereof is relatively small. In this case, the triangle waveform component of the external magnetic field Hext can have the same frequency as that of the recording signal Sw of the recording magnetic field Hw, thereby making the respective magnetic grains of the magnetic recording medium 80 correspond to recording bits for recording information on the magnetic recording medium 80.

In addition, the absolute value of the external magnetic field Hext should just change also in this case. For example, as illustrated in FIGS. 20B to 20F, the absolute value of the external magnetic field Hext may have various waveforms, such as a sine waveform, a triangle waveform, a trapezoidal waveform, etc. The triangle waveform may be a triangle waveform whose rise time and fall time are substantially equal to each other, a triangle waveform whose rise time and fall time are nearly zero and long, respectively, a triangle waveform whose rise time and fall time are long and nearly zero, respectively, or a trapezoid waveform, whose rise and fall have a certain length of time, with a maximum maintained for a given length of time.

The example of the magnetic recording head 51 provided with the controlling magnetic pole 63, the controlling magnetic pole coil 63*a*, and the controlling magnetic pole modulation coil 63*b* has been explained above. However, since the absolute value of the external magnetic field Hext applied to the spin torque oscillator 10 should just change, either one of the magnetic recording heads 51*a*, 51*b*, 51*c*, 52, and 53 may be employed.

In the magnetic recording head 51 illustrated in FIG. 1, the main magnetic pole 61 is arranged between the read section 70 and the spin torque oscillator 10. Alternatively, the spin torque oscillator 10 may be arranged between the read section 70 and the main magnetic pole 61. In the above-mentioned magnetic recording heads 51*a*, 51*b*, 51*c*, 52, 53, and 54, the mutual positional relationship of the read section 70, the main magnetic pole 61, and spin torque oscillator 10 is optional.

Fifth Embodiment

A magnetic recording apparatus and a magnetic head assembly according to a fifth embodiment of the invention are explained below. The above-explained magnetic recording heads according to the embodiments of the invention are built into the magnetic head assembly of all-in-one write-in/read-out type, and can be mounted to the magnetic recording apparatus. In addition, the magnetic recording apparatus according to this embodiment can also have only a recording function, and can also have both recording and reproducing functions.

Figure 23:
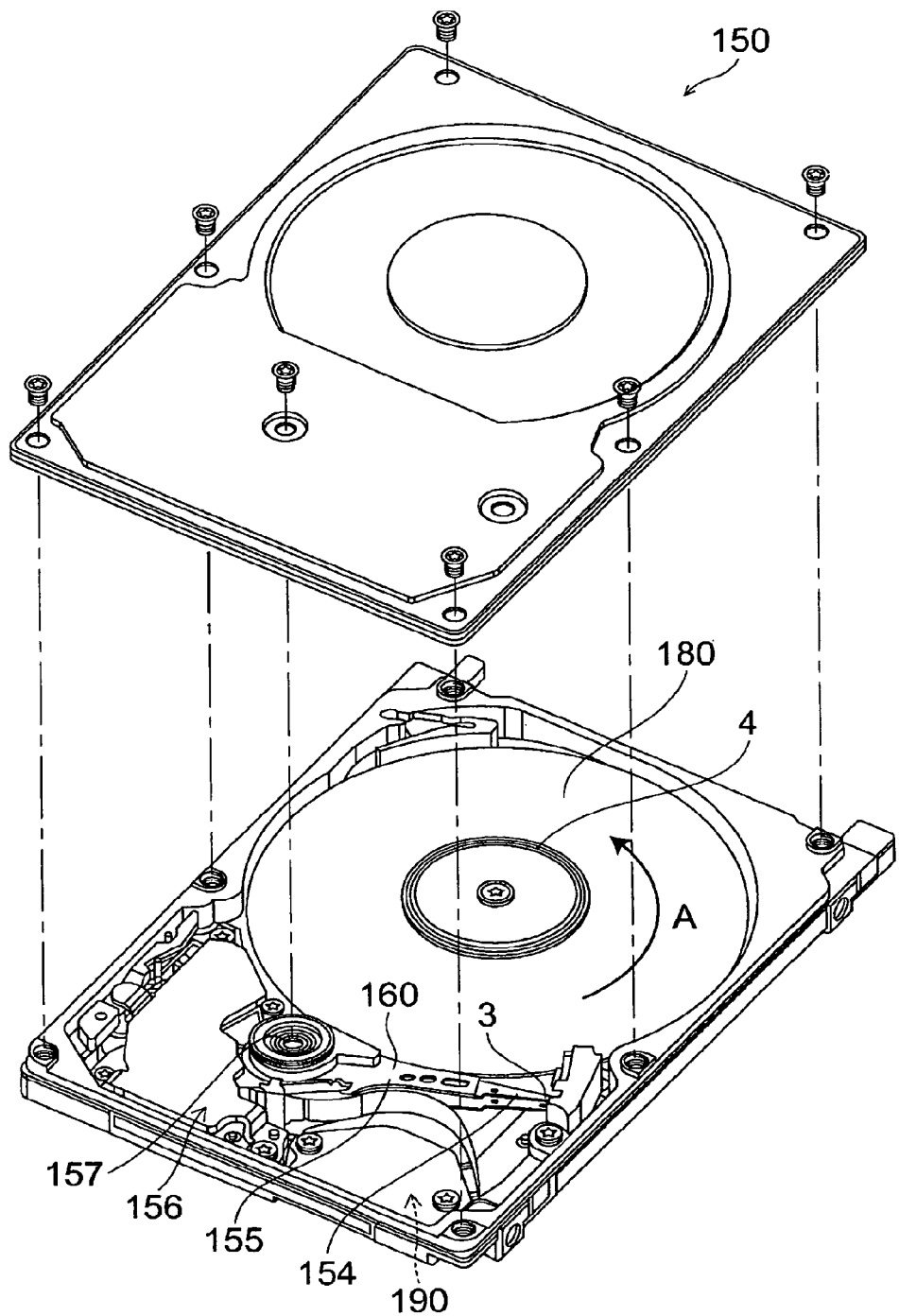
FIG. 23 is a perspective view schematically illustrating a configuration of a magnetic recording apparatus according to a fifth embodiment of the invention.
Figure 24A:
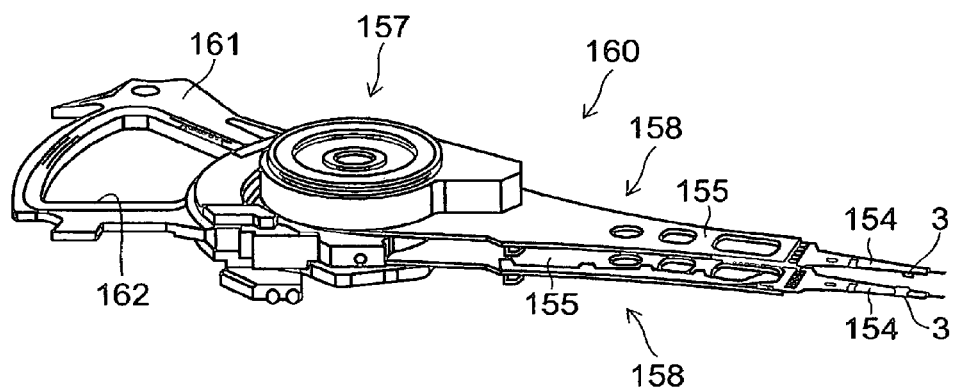
FIGS. 24A and 24B are typical perspective views illustrating a configuration of a portion of the magnetic recording apparatus according to the fifth embodiment of the invention.
Figure 24B:
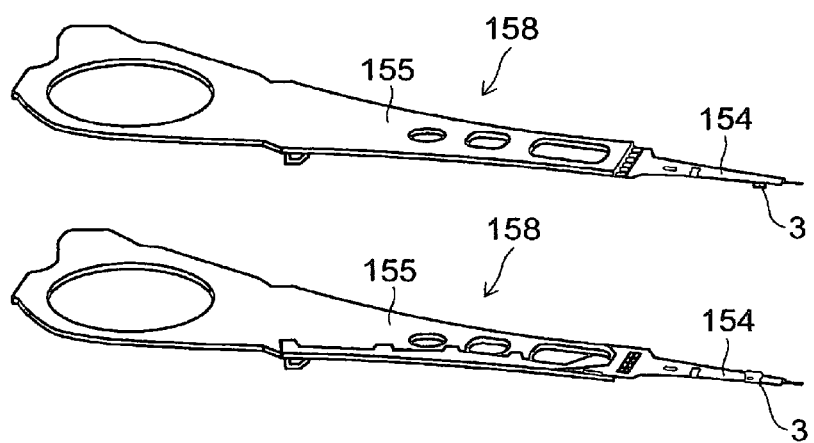

FIG. 23 is a perspective view schematically illustrating a configuration of the magnetic recording apparatus according to the fifth embodiment of the invention. FIGS. 24A and 24B are typical perspective views illustrating a configuration of a portion of the magnetic recording apparatus according to the fifth embodiment of the invention. As illustrated in FIG. 23, a magnetic recording apparatus 150 according to the fifth embodiment of the invention is a type of apparatus using a rotary actuator. As illustrated in FIG. 23, a recording medium disk 180 is mounted to a spindle motor 4, and is rotated in the direction of the arrow A by the motor not shown in the figure in response to control signals from a control portion of the driving unit not shown in the figure. Alternatively, the magnetic recording apparatus 150 according to this embodiment may be provided with two or more recording medium disks 180.

A head slider 3 which performs recording/reading information to be stored in the medium disk 180 has the configuration as was mentioned above in FIG. 2, and is attached at a tip of a filmy suspension 154. Here, the head slider 3 mounts the magnetic recording head according to the embodiment mentioned above, for example, near the tip thereof.

The rotation of the recording medium disk 180 results in a balance between a pressure generated by the suspension 154 and a pressure arising at the medium-facing surface (ABS) of the head slider 3, thereby holding the medium-facing surface of the magnetic recording head apart from the surface of the recording medium disk 180 by a prescribed flying height. The magnetic recording apparatus 150 may be of so called a "contact run type" where the head slider 3 runs in contact with the recording medium disk 180.

The suspension 154 is connected to an end of an actuator arm 155 with a bobbin portion to hold a drive coil not shown in the figure. The other end of the actuator arm 155 is provided with a voice coil motor 156, i.e., a kind of a linear motor. The voice coil motor 156 can be configured with the drive coil (not shown) and a magnetic circuit, the drive coil being wound up onto the bobbin portion of the actuator arm 155, the magnetic circuit including a permanent magnet arranged as facing so as to sandwich the coil, and a facing yoke.

The actuator arm 155 is held by ball bearings which are provided on upper and lower two sides of a bearing portion 157, and can rotate slidably by the voice coil motor 156. As a result, it is possible to move the magnetic recording head to an arbitrary position of the recording medium disk 180.

FIG. 24A is a perspective view illustrating a configuration of a portion of the magnetic recording apparatus according to this embodiment, and enlarges a head stack assembly 160. FIG. 24B is a perspective view illustrating a magnetic head stack assembly (head gimbal assembly) 158 to configure a portion of the head stack assembly 160. As illustrated in FIG. 24A, the head gimbal assembly 158 has an actuator arm 155 extending from the bearing portion 157 and a suspension 154 extending from the actuator arm 155.

The head slider 3 having the magnetic recording head according to the embodiment of the invention is attached to a tip of the suspension 154. As mentioned above, one of the magnetic recording heads according to the embodiments of the invention is attached to the head slider 3.

That is, the magnetic head assembly (head gimbal assembly) 158 according to the embodiment of the invention is provided with one of the magnetic recording heads according to the embodiments of the invention, the head slider 3 mounting the magnetic head, the suspension 154 mounting the head slider 3 at one end thereof and the actuator arm 155 connected to the other end of the suspension 154.

The suspension 154 has a lead for write-in/read-out of signals, a lead for a heater to adjust the flying height and a lead not shown in the figure for the oscillation of the spin torque oscillator, the leads electrically connecting to the respective electrodes of the magnetic recording head built into the head slider 3.

The electrode pads not shown in the figure are provided in the head gimbal assembly 158. The "electrode pads" are referred to as the "pads" simply below. For example, the head gimbal assembly 158 is provided with two pads for the coils of the main magnetic pole 61, two pads for a magnetic reproducing element 71, two pads for DFH (dynamic flying height), and two pads for the electrodes of the spin torque oscillator 10. In addition, when the controlling magnetic pole coil 63a is provided to the head gimbal assembly 158, the head gimbal assembly 158 is provided with two pads for the controlling magnetic pole coil 63a. When the controlling magnetic pole modulation coil 63b and the main magnetic pole modulation coil 61b are provided to the head gimbal assembly 158, the head gimbal assembly 158 is provided with two pads and another two pads for the controlling magnetic pole modulation coil 63b and the main magnetic pole modulation coil 61b, respectively. Alternatively, two or more pads may be shared as a common pad in order to reduce the number thereof.

Then, a signal processor 190 not shown in the figure to write and read a signal on the magnetic recording medium using the magnetic recording head is also provided to the head gimbal assembly 158. The signal processor 190 is mounted onto the back side of the drawing of the magnetic recording apparatus 150 illustrated in FIG. 23, for example. Input-output lines are connected to the electrode pads of the head gimbal assembly 158, and electrically combined with the magnetic recording head.

Thus, the magnetic recording apparatus 150 according to this embodiment is provided with the magnetic recording medium, one of the magnetic recording heads of the above-mentioned embodiments, a movable portion, a position control portion and a signal processor. The movable portion enables the magnetic recording medium and the magnetic recording head to relatively move to each other in separate or in contact while making the medium and the head face each other. The position control portion positions the magnetic recording head at a prescribed position on the magnetic recording medium. The signal processor writes and reads a signal on the magnetic recording medium.

That is, the recording medium disk 180 is used as the magnetic recording medium mentioned above. The above-mentioned movable portion can include the head slider 3. The above-mentioned position control portion can include the head gimbal assembly 158.

That is, the magnetic recording apparatus 150 according to this embodiment is provided with the magnetic recording medium (a magnetic recording disk 180), the magnetic head assembly (the head gimbal assembly 158) according to the embodiment of the invention, and the signal processor 190 writes and reads a signal on the magnetic recording medium using the magnetic recording head mounted onto the magnetic head assembly.

According to the magnetic head assembly (the head gimbal assembly 158), using the magnetic recording head according to the embodiments mentioned above allows it to provide a magnetic head assembly capable of performing a stable high frequency magnetic field assist recording with a lower intensity high frequency magnetic field. Then, according to the magnetic recording apparatus 150 of this embodiment, using the magnetic recording head according to the embodiments mentioned above allows it to provide a magnetic recording apparatus capable of performing a stable high frequency magnetic field assist recording with a lower intensity high frequency magnetic field.

In the magnetic recording apparatus 150 according to this embodiment, the external magnetic field Hext applied to the spin torque oscillator 10 includes either a signal (the modulation signal Sm) changing at a frequency higher than that of the recording signal Sw of the recording magnetic field Hw, or a signal (the modulation signal Sm1) having the same frequency as the recording signal Sw to change its absolute value in one cycle. In order to apply such an external magnetic field Hext, the magnetic recording apparatus 150 is provided with various kinds of circuits being explained below.

Figure 25:
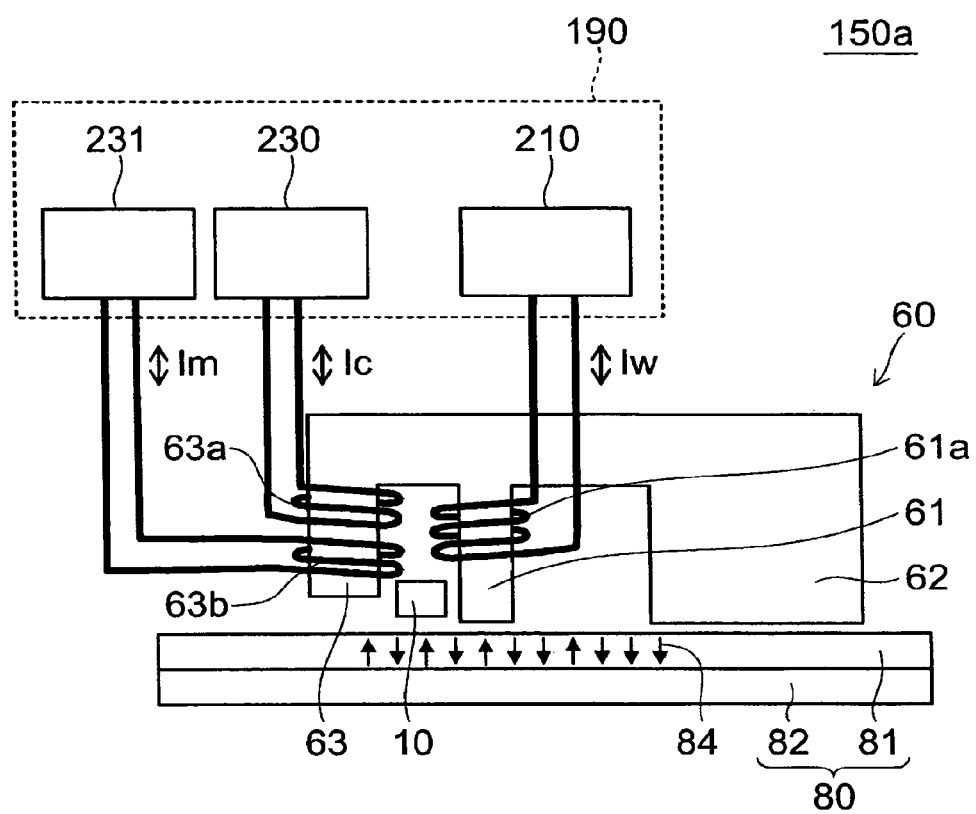
FIG. 25 is a schematic view illustrating a configuration of a portion of another magnetic recording apparatus according to the fifth embodiment of the invention.

FIG. 25 is a schematic view illustrating a configuration of a portion of another magnetic recording apparatus according to the fifth embodiment of the invention. That is, FIG. 25 illustrates the configuration of the magnetic recording apparatus employing either one of the magnetic recording heads 51, 51b, and 51c which are provided with the controlling magnetic pole 63, the controlling magnetic pole coil 63a to magnetize the controlling magnetic pole 63, and the controlling magnetic pole modulation coil 63b.

As illustrated in FIG. 25, in another magnetic recording apparatus according to the fifth embodiment, the signal processor 190 is provided with a recording current circuit 210 (a first current circuit), a magnetic pole current circuit 230 (a third current circuit), and an controlling magnetic pole modulation current circuit 231 (a modulating current circuit, i.e., a second current circuit). The recording current circuit 210 supplies the recording current Iw to the main magnetic pole coil 61a for recording on the magnetic recording medium 80. Here, the recording current Iw includes the recording signal Sw for recording on the magnetic recording medium 80. The magnetic pole current circuit 230 supplies the controlling current Ic to the controlling magnetic pole coil 63a. The controlling magnetic pole modulation current circuit 231 supplies the controlling magnetic pole modulation current Im to the controlling magnetic pole modulation coil 63b. The controlling current Ic is a current which changes coincident with a polarity reversal of the recording current Iw.

Thereby, the recording current Iw, the controlling current Ic, and the controlling magnetic pole modulation current Im illustrated in FIGS. 5A to 5D are supplied to generate the respective magnetic fields illustrated in FIGS. 6A to 6E, thereby allowing it to apply the external magnetic field Hext, e.g., illustrated in FIG. 6E to the spin torque oscillator 10.

Thereby, it is possible to modulate the frequency of the high frequency magnetic field Hac which the spin torque oscillator 10 generates, thus providing a magnetic recording apparatus capable of performing a stable high frequency magnetic field assist recording using a lower intensity high frequency magnetic field. Alternatively, the magnetic pole current circuit 230 (the third current circuit) may be provided if needed.

Figure 26:
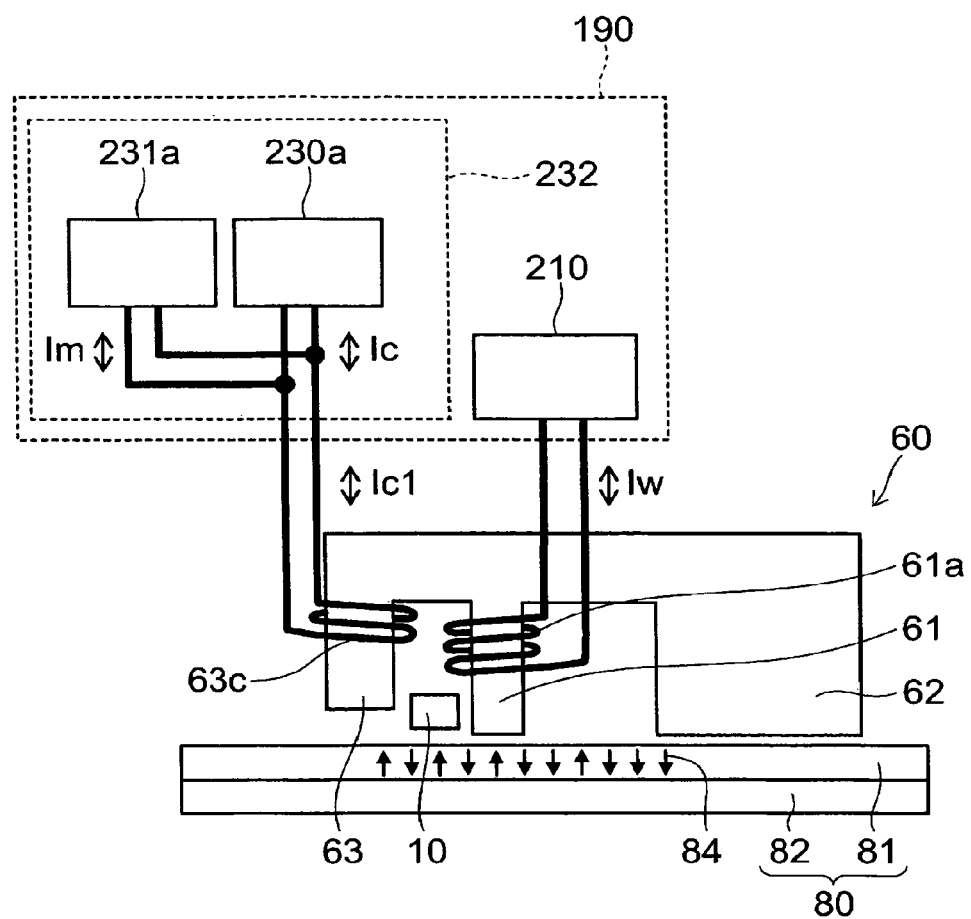
FIG. 26 is a schematic view illustrating a configuration of a portion of another magnetic recording apparatus according to the fifth embodiment of the invention.

FIG. 26 is a schematic view illustrating a configuration of a portion of another magnetic recording apparatus according to the fifth embodiment of the invention. That is, FIG. 26 illustrates the configuration of the magnetic recording apparatus employing the magnetic recording head 51a which are provided with the controlling magnetic pole 63 having a coil 63c.

As illustrated in FIG. 26, in another magnetic recording apparatus 150b according to this embodiment, the recording current circuit 210 and a current circuit 232 (a second current circuit). The recording current circuit 210 supplies the recording current Iw including the recording signal Sw for recording on the magnetic recording medium 80 to the main magnetic pole coil 61a. The current circuit 232 (the second current circuit) supplies a modulating current to the coil 63c.

In this example, it is assumed that the modulating current mentioned above is formed of the controlling current Ic and the controlling magnetic pole modulation current Im which are superimposed on each other. In this case, it is possible to provide an controlling current circuit 230a and a modulation signal current circuit 231a to the inside of the current circuit 232. The controlling current circuit 230a supplies the controlling current Ic. The modulation signal current circuit 231a supplies the controlling magnetic pole modulation current Im to modulate the intensity of the external magnetic field Hext applied to the spin torque oscillator 10.

The controlling current Ic is a current which changes coincident with a polarity reversal of the recording current Iw. Alternatively, the controlling current Ic may include retardation in phase or phase lead to some degree for the reversal polarity of the recording current Iw. On the other hand, the controlling magnetic pole modulation current Im includes either a signal (modulation signal Sm) which oscillates at a frequency higher than that of the recording signal Sw, or a signal (modulation signal Sm1) having the same frequency as the recording signal Sw to change its absolute value in one cycle.

Thereby, the recording current Iw and the controlling magnetic pole current Ic1, e.g., illustrated in FIGS. 12A and 12C, respectively, are supplied to apply the external magnetic field Hext, e.g., illustrated in FIG. 12E to the spin torque oscillator 10.

Thereby, according to the magnetic recording apparatus 150b, the frequency of the high frequency magnetic field Hac which the spin torque oscillator 10 generates can be modulated, and a magnetic recording apparatus capable of performing a stable high frequency magnetic field assist recording using a lower intensity high frequency magnetic field is provided.

Then, leaving out the controlling magnetic pole modulation coil 63b simplifies the configuration of the magnetic recording head, and reduces the number of interconnections of the head gimbal assembly 158, thereby yielding a merit. Then, providing the controlling current circuit 230a and the modulation signal current circuit 231a to the inside of the current circuit 232 allows it to regulate an controlling current component (controlling current Ic) for the controlling magnetic pole 63 and a current (controlling magnetic pole modulation current Im) to modulate the external magnetic field applied to the spin torque oscillator 10, independently of each other. Thereby, it is possible to generate unprescribed external field Hext, thus enabling a highly precise operation.

As mentioned above, the modulating current is formed of the controlling current Ic and the controlling magnetic pole modulation current Im which are superimposed on each other. However, the present invention is not limited to this. That is, for example, the modulating current may include only the component of the controlling magnetic pole modulation current Im. In this case, the current circuit 232 may be provided with only the modulation signal current circuit 231a.

Figure 27:
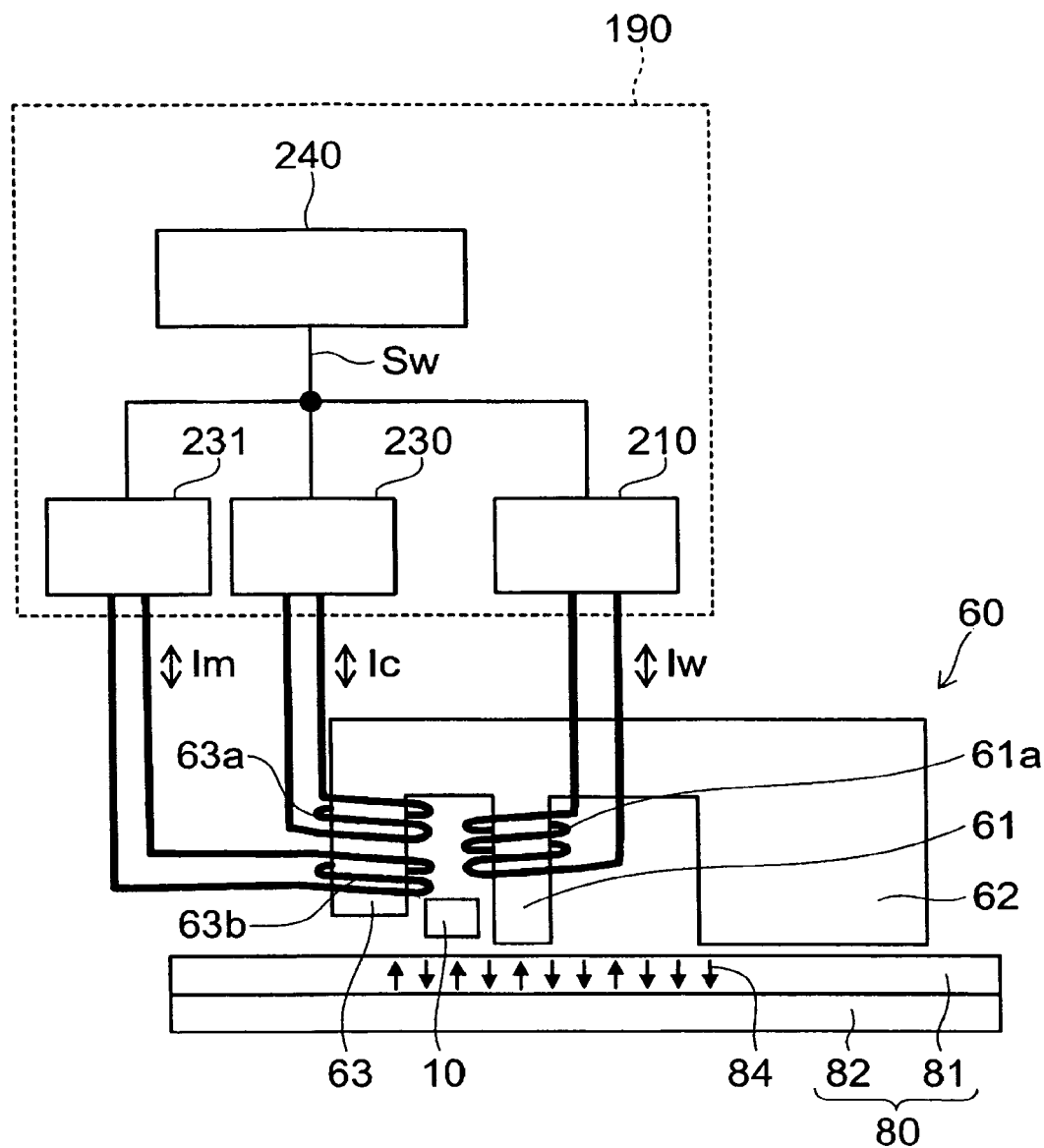
FIG. 27 is a schematic view illustrating a configuration of another magnetic recording apparatus according to the fifth embodiment of the invention.

FIG. 27 is a schematic view illustrating a configuration of another magnetic recording apparatus according to the fifth embodiment of the invention. That is, FIG. 27 illustrates the configuration of the magnetic recording apparatus employing either one of the magnetic recording heads 51, 51b, and 51c which have the controlling magnetic pole 63, the controlling magnetic pole coil 63a to magnetize the controlling magnetic pole 63, and the controlling magnetic pole modulation coil 63b.

As illustrated in FIG. 27, in another magnetic recording apparatus 150c according to the embodiment, the signal processor 190 of the magnetic recording apparatus 150a, illustrated in FIG. 25, further includes a recording signal circuit 240 connected to the recording current circuit 210, the controlling magnetic pole current circuit 230, and the controlling magnetic pole modulation current circuit 231. The recording signal circuit 240, thus configuring the signal processor 190 of the magnetic recording apparatus 150c.

The recording signal circuit 240 supplies the recording signal Sw, e.g., shown FIG. 5A to the recording current circuit 210. Thereby, the recording current circuit 210 generates the recording current Iw to supply to the main magnetic pole coil 61a. In FIG. 5A, the recording signal Sw and the recording current Iw are illustrated as identical currents. However, the recording signal Sw is for recording information, and the recording current Iw is passed through the main magnetic pole coil 61a based on the recording signal Sw. The recording current Iw may show a polarity opposite to that of the recording signal Sw depending on the winding manner of the main magnetic pole coil 61a of the main magnetic pole 61 in some cases.

The controlling magnetic pole current circuit 230 generates the controlling current Ic based on the recording signal Sw. And the controlling magnetic pole modulation current circuit 231 generates the controlling magnetic pole modulation current Im on the timing of the recording signal Sw.

Thus, providing the recording signal circuit 240 allows the signal processor 190 to operate efficiently and stably.

Alternatively, the recording signal circuit 240 may be connected to the recording current circuit 210 and the controlling magnetic pole current circuit 230 which is not connected to the controlling magnetic pole modulation current circuit 231. The controlling magnetic pole modulation current circuit 231 may generate the controlling magnetic pole modulation current Im independently of the recording signal Sw.

Alternatively, the recording signal circuit 240 may be provided to the magnetic recording apparatus 150b having the controlling magnetic pole 63, the controlling magnetic pole coil 63a, and the coil 63c, but not the controlling magnetic pole modulation coil 63b. Then, the recording signal circuit 240 is connected to both the recording current circuit 210 and the current circuit 232. That is, the recording signal circuit 240 is connected to at least one of the controlling current circuit 230a and the modulation signal current circuits 231a which are provided to the current circuit 232, thereby allowing it to generate the controlling current Ic and the controlling magnetic pole modulation current Im based on the output of the recording signal circuit 240, respectively.

Figure 28:
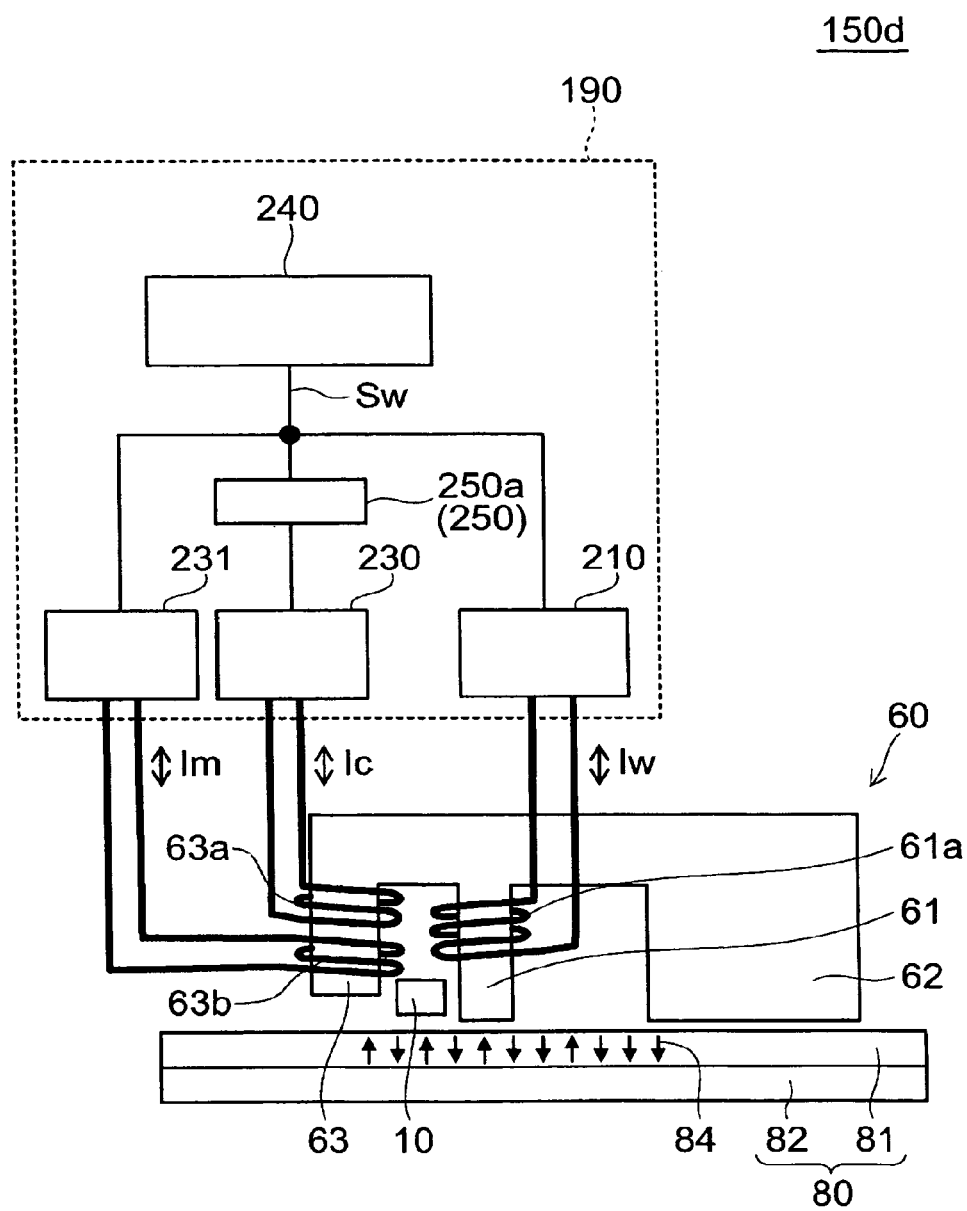
FIG. 28 is a schematic view illustrating a configuration of another magnetic recording apparatus according to the fifth embodiment of the invention.

FIG. 28 is a schematic view illustrating a configuration of another magnetic recording apparatus according to the fifth embodiment of the invention. As illustrated in FIG. 28, another magnetic recording apparatus 150d according to this embodiment corresponds to the magnetic recording apparatus 150c illustrated in FIG. 27 in which the signal processor 190 further includes a phase regulation circuit 250.
The electric signal (recording signal Sw) from the recording signal circuit 240 is input to the phase regulation circuit 250. And, the phase regulation circuit 250 supplies a phase-regulated electric signal whose phase has already been regulated to at least one of the recording current circuit 210, the controlling magnetic pole current circuit 230, and the controlling magnetic pole modulation current circuit 231.

The example of the magnetic recording apparatus 150d illustrated in FIG. 28 includes the phase regulation circuit 250a (250). The electric signal (recording signal Sw) from the recording signal circuit 240 is input to the phase regulation circuit 250a. The phase regulation circuit 250a supplies the phase-regulated electric signal whose phase has already been regulated to the controlling magnetic pole current circuit 230.

That is, the signal processor 190 further includes the phase regulation circuit 250a to advance or delay the current (the controlling current Ic in this case) supplied to the controlling magnetic pole coil 63a more than the polarity reversal of the recording current Iw by a prescribed time.

That is, the phase regulation circuit 250a is arranged between the recording signal circuit 240 and the controlling magnetic pole current circuit 230. And, the phase regulation circuit 250a can serve as a phase pre-compensation circuit or a delay circuit, for example. Thereby, the controlling current Ic is more advanced or delayed than the polarity reversal of the recording signal Sw by a prescribed time.

In addition, the phase regulation circuit 250 may be provided to, e.g., the magnetic recording head 51a with the coil 63c mounted to the controlling magnetic pole 63 as only one coil. In this case, the phase regulation circuit 250 is provided between the recording signal circuit 240 and the current circuit 232. That is, the phase regulation circuit 250 can be disposed between the recording signal circuit 240 and the current circuit 230a, or between the recording signal circuit 240 and the modulation signal current circuit 231a. Also in this case, the phase regulation circuit 250 may be disposed between the recording signal circuit 240 and the recording current circuit 210.

Figure 29A:
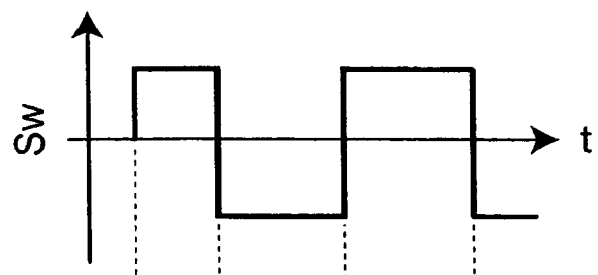
FIGS. 29A to 29C are schematic views illustrating operation currents for another magnetic recording apparatus according to the fifth embodiment of the invention.
Figure 29B:
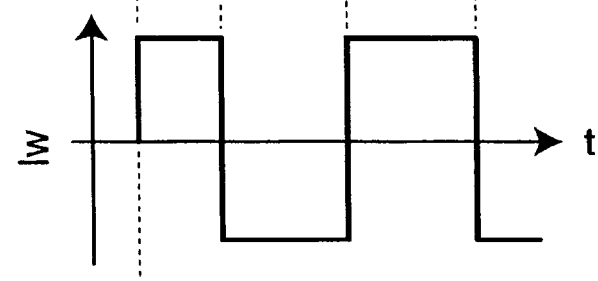
Figure 29C:
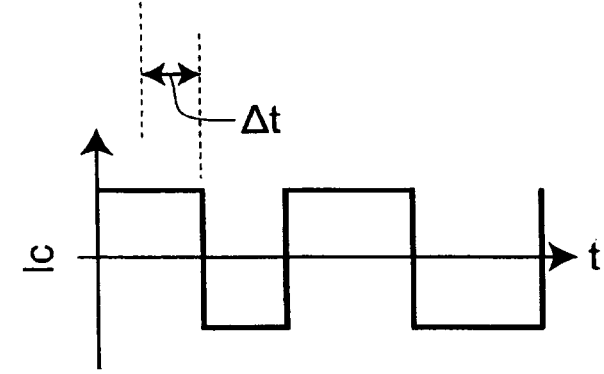

FIGS. 29A to 29C are schematic views illustrating operation currents for another magnetic recording apparatus according to the fifth embodiment of the invention. FIG. 29A illustrates the electric signal to be output from the magnetic recording apparatus 150d according to this embodiment, i.e., the recording signal Sw. FIG. 29B illustrates the recording current to be passed through the main magnetic pole coil 61a. FIG. 29C illustrates the controlling current Ic to be passed through the controlling magnetic pole coil 63a. In FIGS. 29A to 29C, the horizontal axis expresses time t. The vertical axes of FIGS. 29A, 29B, and 29C express the recording signal Sw, the recording current Iw, and the controlling current Ic, respectively.

As illustrated in FIGS. 29A and 29B, the recording current Iw changes coincident with the recording signal Sw, and has the same phase and the same polarity as the recording signal Sw in the magnetic recording apparatus 150d according to this embodiment. On the other hand, the phase of the controlling current Ic can be more advanced or delayed than that of the recording signal Sw by a predetermined phase, i.e., a predetermined time $\Delta t$.

For example, when changing the controlling current Ic coincident with the polarity reversal of the recording current Iw (i.e., when $\Delta t$ is 0), a time which the oscillation frequency of the spin torque oscillator 10 takes to reach a steady value is longer than a time which the recording current Iw takes to reverse its polarity in some cases. In such cases, it is effective to delay the phase of the controlling current Ic more than that of the recording current Iw by just a predetermined time $\Delta t$. That is, in a period of $\Delta t$ which has passed since a polarity reversal of the recording current Iw took place, a magnetic field applied from the controlling magnetic pole 63 to the spin torque oscillator 10 and a magnetic field applied from the main magnetic pole 61 to the spin torque oscillator 10 tends to intensify mutually. Thereby, the oscillation condition of the spin torque oscillator 10 reverses more rapidly. As a result, a magnetic recording apparatus capable of performing a stable and quality high frequency magnetic field assist recording is provided.

Thus, according to another magnetic recording apparatus 150d of this embodiment, it is possible to provide a magnetic recording apparatus capable of performing a stable and efficient high frequency magnetic field assist recording which is based on a rapid reversal of the oscillation condition of the spin torque oscillator 10, and a stability of the uniform oscillation frequency of the spin torque oscillator 10.

In this example, the phase regulation circuit 250b (not shown) may be provided between the recording signal circuit 240 and the controlling magnetic pole modulation current circuit 231 as the phase regulation circuit 250. That is, the electric signal (recording signal Sw) from the recording signal circuit 240 is input to the phase regulation circuit 250b. The phase regulation circuit 250b supplies a phase-regulated electric signal whose phase has already been regulated to the controlling magnetic pole modulation current circuit 231. Thereby, the phase of the controlling magnetic pole modulation current Im can be more advanced or delayed than that of the recording signal Sw by a predetermined phase. The phase regulation circuit 250b advances or delays the polarity reversal of the controlling magnetic pole modulation current Im more than that of the recording signal Sw by a prescribed time.

Alternatively, the above-mentioned phase regulation circuits 250a, 250b may be provided simultaneously. Then, the respective phase shifts according to the phase regulation circuits 250a, 250b can be controlled independently. Thereby, the external magnetic field Hext can be controlled more precisely.

Figure 30:
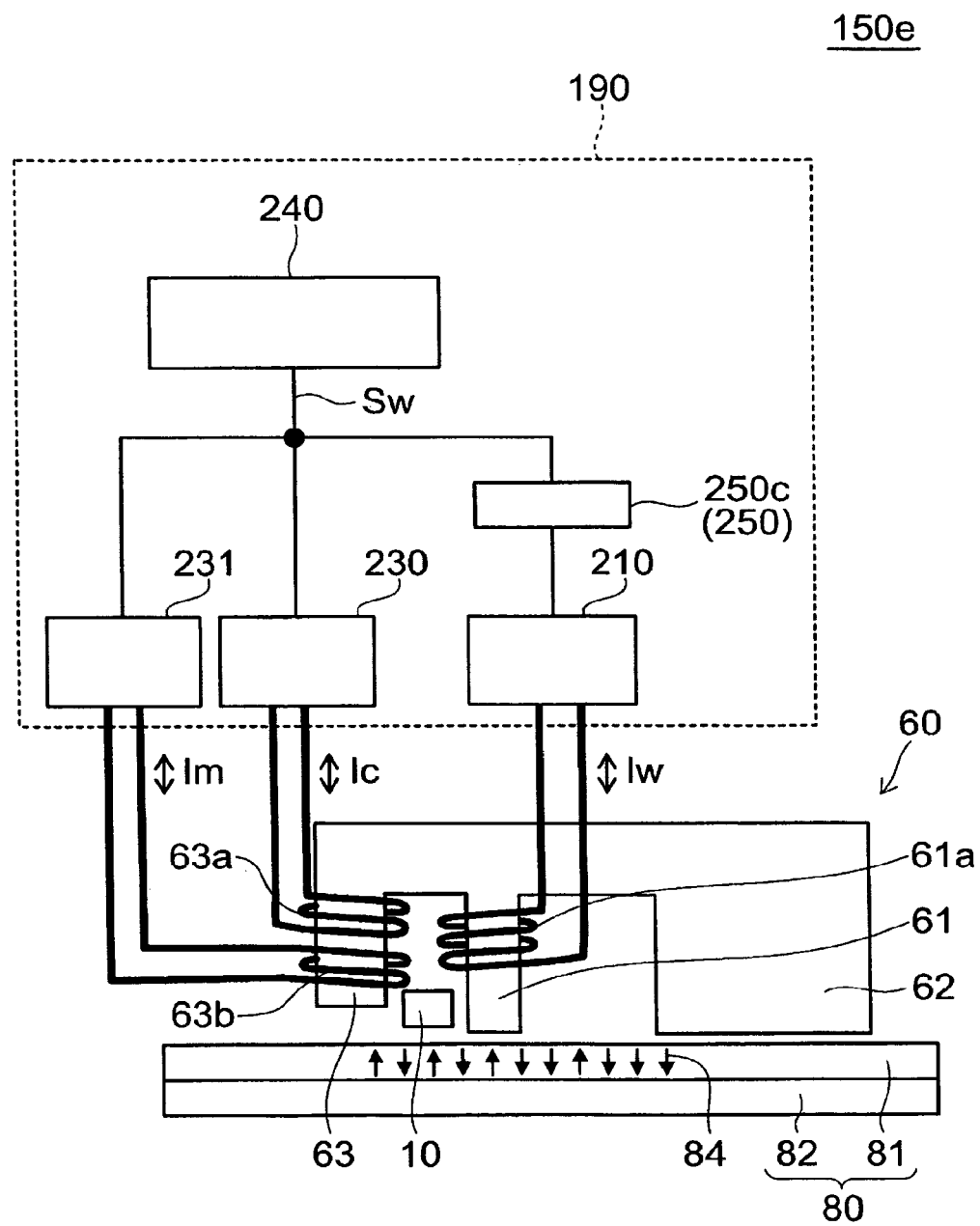
FIG. 30 is a schematic view illustrating a configuration of another magnetic recording apparatus according to the fifth embodiment of the invention.

FIG. 30 is a schematic view illustrating a configuration of another magnetic recording apparatus according to the fifth embodiment of the invention. As illustrated in FIG. 30, in another magnetic recording apparatus 150e according to the fifth embodiment of the invention, a phase regulation circuit 250c is provided between the recording signal circuit 240 and the recording current circuit 210.

The phase regulation circuit 250b advances or delays the polarity reversal of the recording current Iw more than that of the recording signal Sw by a prescribed time. Thereby, the phase of the recording current Iw is more advanced or delayed than that of the controlling current Ic by a prescribed time.

Also in this case, it is possible to provide a magnetic recording apparatus capable of performing a stable and efficient high frequency magnetic field assist recording which is based on a rapid reversal of the oscillation condition of the spin torque oscillator, and a stability of the uniform oscillation frequency of the spin torque oscillator 10.

Also in this case, the phase regulation circuit 250a may be provided between the recording signal circuit 240 and the controlling magnetic pole current circuit 230, or the phase regulation circuit 250b (not shown) may be provided between the recording signal circuit 240 and the controlling magnetic pole modulation current circuit 231 as a phase regulation circuit 250.

Thus, the phase regulation circuit 250 (for example, the phase regulation circuits 250a to 250c) provided to the signal processor 190 should just make currents such as the controlling currents, the controlling magnetic pole current Ic1, the controlling magnetic pole modulation current Im more advanced or delayed than the polarity reversal of the recording current Iw by a predetermined time. The phase regulation circuit 250 is provided at least at one of the positions which are between the recording signal circuit 240 and the recording current circuit 210, between the recording signal circuit 240 and the current circuit 232, between the recording signal circuit 240 and the controlling current circuit 230a, between the recording signal circuit 240 and the controlling magnetic pole modulation current circuits 231, and between the recording signal circuit 240 and the modulation signal current circuits 231a. Alternatively, the phase regulation circuit 250 may be housed in at least either one of the recording signal circuit 240, the recording current circuit 210, the controlling magnetic pole current circuit 230, the current circuit 232, the controlling current circuit 230a, the controlling magnetic pole modulation current circuit 231, and the modulation signal current circuit 231a.

Figure 31:
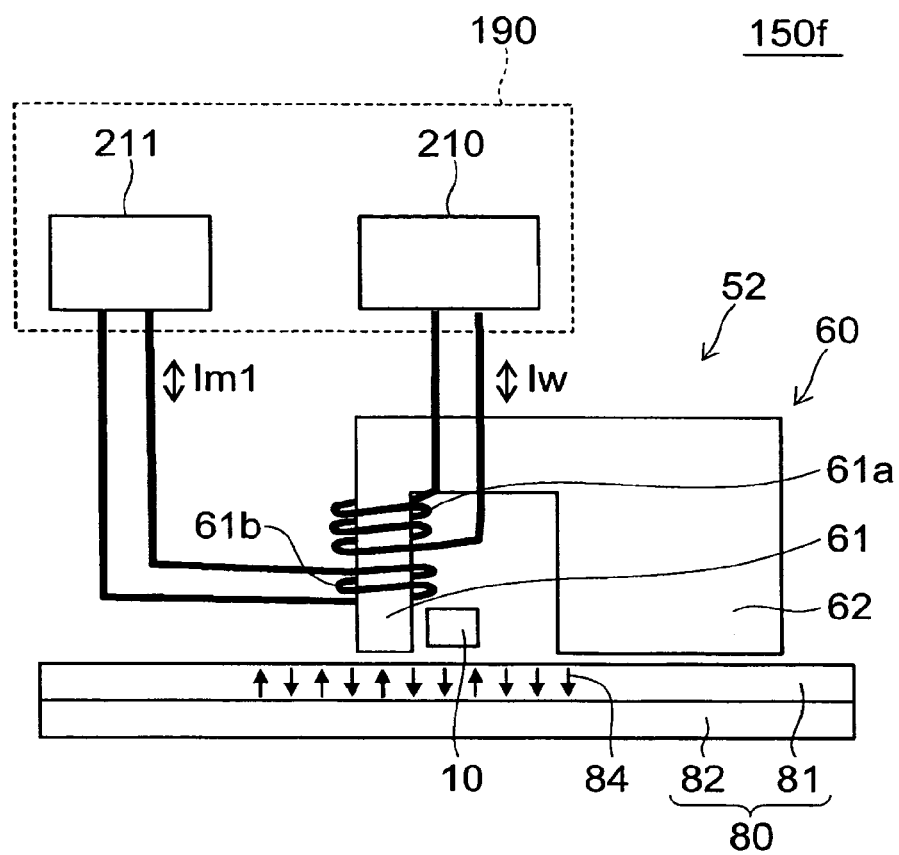
FIG. 31 is a schematic view illustrating a partial configuration of another magnetic recording apparatuses according to the fifth embodiment of the invention.

FIG. 31 is a schematic view illustrating a partial configuration of another magnetic recording apparatuses according to the fifth embodiment of the invention. That is, FIG. 31 illustrates the configuration of the magnetic recording apparatus employing the magnetic recording head 52 illustrated in FIG. 16, which is not provided with the controlling magnetic pole 63 as a magnetic recording head, but provided with the main magnetic pole coil 61a and the main magnetic pole modulation coil 61b mounted to the main magnetic pole 61.

As illustrated in FIG. 31, the magnetic recording apparatus 150f according to this embodiment is provided with the magnetic recording medium 80, the magnetic head assembly (not shown), and the signal processor 190. The signal processor 190 performs write-in on the magnetic recording medium 80 and read-out therefrom with a magnetic recording head included in the magnetic head assembly.

In the example of the magnetic recording apparatus 150f, the magnetic recording head 52, e.g., illustrated in FIG. 16 is employed, and provided with the followings:

the main magnetic pole 61 to apply the recording magnetic field Hw to the magnetic recording medium 80;

the spin torque oscillator 10 arranged in the proximity of the main magnetic pole 61;

the main magnetic pole coil 61a to magnetize the main magnetic pole 61; and the main magnetic pole modulation coil 61b (the modulating coil, i.e., the second coil) to magnetize the main magnetic pole 61, through which a current can be passed.

In addition, the magnetic head assembly is provided with the followings:

the above-mentioned magnetic recording head;

the head slider carrying the magnetic recording head;

the suspension mounting the head slider on one end thereof; and the actuator arm connected to the other end of the suspension.

The signal processor 190 is provided with the followings:

the recording current circuit 210 to supply the recording current Iw including the recording signal Sw to the main magnetic pole coil 61a for recording on the magnetic recording medium 80; and the main magnetic pole modulation current circuit 211 (the controlling current circuit).

Thereby, the recording current Iw and the main magnetic pole modulation current Im1 illustrated in FIGS. 17A and 17C are supplied to apply the external magnetic field Hext illustrated in FIG. 17E and FIG. 22E.

Thereby, it is possible to modulate the frequency of the high frequency magnetic field Hac which the spin torque oscillator 10 generates, thus providing a magnetic recording apparatus capable of performing a stable high frequency magnetic field assist recording using a lower intensity high frequency magnetic field.

Then, leaving out the controlling magnetic pole 63 and the coils to magnetize the pole 63 simplifies the configuration of the magnetic recording head, and reduces the number of interconnections of the head gimbal assembly 158, thereby yielding a merit. Then, providing the recording current circuit 210 and the main magnetic pole modulation current circuit 211 additionally allows it to regulate recording current Iw and the main magnetic pole modulation current Im1 to modulate the external magnetic field Hext applied to the spin torque oscillator 10, independently of each other. Thereby, it is possible to generate unprescribed external field Hext, thus allowing a highly precise operation.

The recording signal circuit 240 connected to the recording current circuit 210 may be further provided to the signal processor 190. Thereby, the recording current circuit 210 generates the recording current Iw based on the recording signal Sw supplied from the recording signal circuit 240, and supplies it to the main magnetic pole coil 61a.

Alternatively, the recording signal circuit 240 may be connected to the main magnetic pole modulation current circuit 211. Thereby, the main magnetic pole modulation current circuit 211 generates the main magnetic pole modulation current Im1 based on the recording signal Sw supplied from the recording signal circuit 240, and supplies the current Im1 to the main magnetic pole modulation coil 61b.

Also in this case, the phase regulation circuit 250 may be further provided at least at one of the positions which are between the recording current circuit 210 and the recording signal circuit 240, and between the main magnetic pole modulation current circuit 211 and the recording signal circuit 240, thereby allowing it to adjust the phases of the currents generated by these circuits.

Figure 32:
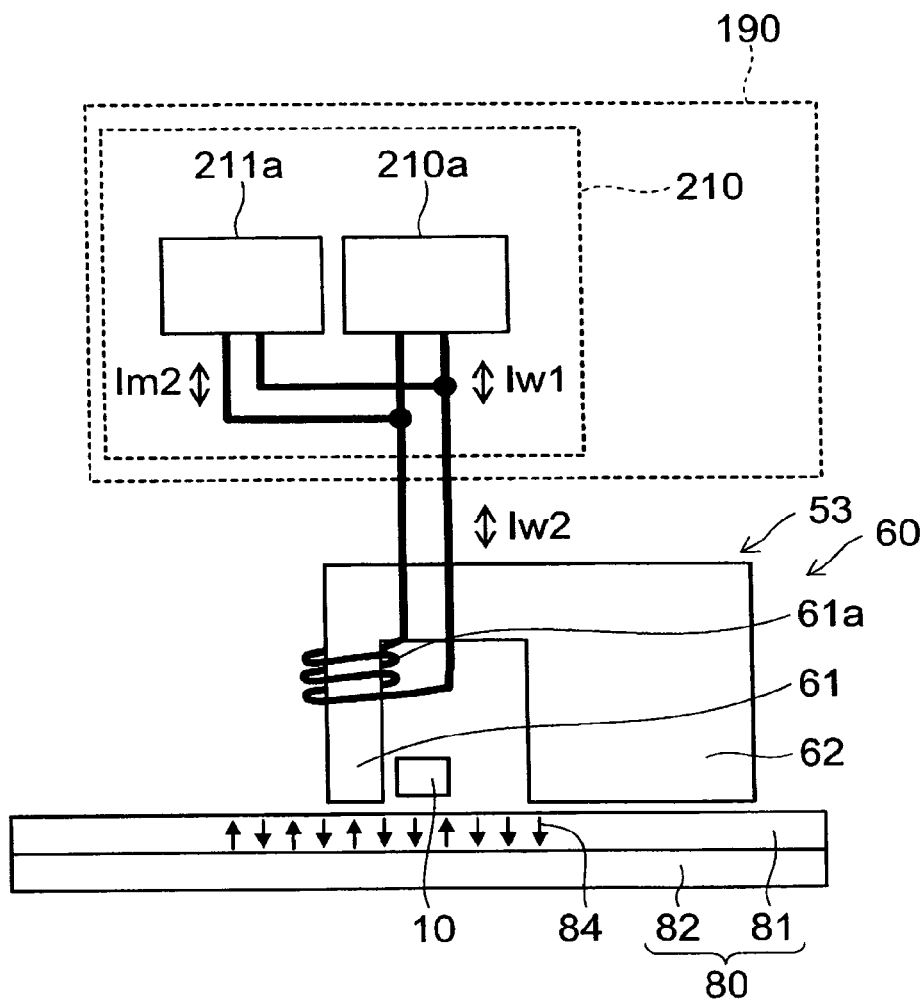
FIG. 32 is a schematic view illustrating a configuration of another magnetic recording apparatus according to the fifth embodiment of the invention.

FIG. 32 is a schematic view illustrating a configuration of another magnetic recording apparatus according to the fifth embodiment of the invention. As illustrated in FIG. 32, the magnetic recording apparatus 150g according to the fifth embodiment of the invention employs the magnetic recording head 53 illustrated in FIG. 18, which is not provided with the controlling magnetic pole 63 as a magnetic recording head, but provided with the main magnetic pole coil 61a but not with the main magnetic pole modulation coil 61b mounted to the main magnetic pole 61.

That is, the magnetic recording apparatus 150g is provided with the followings:
the magnetic recording medium 80;
the magnetic recording head 53;
the recording current circuit 210; and
the signal processor 190.
The magnetic recording head 53 is provided with the followings:
the main magnetic pole 61 to apply the recording magnetic field Hw to the magnetic recording medium 80;
the spin torque oscillator 10 arranged in the proximity of the main magnetic pole 61; and
the main magnetic pole coil 61a to magnetize the main magnetic pole 61.
The recording current circuit 210 supplies the recording current Iw including the recording signal Sw to the main magnetic pole coil 61a for recording on the magnetic recording medium 80. The signal processor 190 performs write-in on the magnetic recording medium 80 and read-out therefrom with the magnetic recording head 53.

Then, the recording current Iw2 includes either one of the following two signals. One is the modulation signal Sm changing at a frequency higher than that of the recording signal Sw of the recording magnetic field Hw. The other is the modulation signal Sm1 having the same frequency as the recording signal Sw, and changing its absolute value in one cycle.

That is, the recording current circuit 210 supplies the recording current Iw2 illustrated in FIG. 19B to the main magnetic pole coil 61a, for example. The recording current circuit 210 supplies the recording current Iw2 to the main magnetic pole coil 61a. The recording current Iw2 superimposes the modulating current Im illustrated in FIG. 21D on the recording current Iw illustrated in FIG. 21B.

That is, in this example, the recording current circuit 210 has the recording signal current circuit 210a and the modulation signal current circuit 211a. The recording signal current circuit 210a supplies the recording signal current Iw1 including the recording signal Sw. The modulation signal current circuit 211a supplies either one of the following two modulation signals. One is the signal (the modulation signal Sm) changing at a frequency higher than that of the recording signal Sw. The other is the signal (the modulation signal Sm1) having the same frequency as the recording signal Sw, and changing its absolute value in one cycle.

Thereby, the recording current Iw2 formed of the recording signal current Iw1 including the recording signal Sw and the main magnetic pole modulation signal current Im2 is supplied to the main magnetic pole coil 61a to apply the external magnetic field Hext, illustrated in FIGS. 19D and 22E, to the spin torque oscillator 10.

Thereby, according to the magnetic recording apparatus 150g, the frequency modulation of the high frequency magnetic field Hac which spin torque oscillator 10 generates can be performed, and a magnetic recording apparatus capable of a stable high frequency magnetic field assist recording with a lower intensity high frequency magnetic field Hac.

Also in this case, the recording signal circuit 240 can be provided. The recording signal current circuit 210a generates the recording signal current Iw1 based on the output of the recording signal circuit 240. The modulation signal current circuit 211a generates the main magnetic pole modulation signal current Im2 based on the output of the recording signal circuit 240. Alternatively, the phase regulation circuit 250 may be further provided at least at one of the positions which are between the recording current circuit 210 and the recording signal circuit 240, and between the main controlling magnetic pole modulation current circuit 211a and the recording signal circuit 240, thereby allowing it to adjust the phases of the currents generated by these circuits.

In any one of the magnetic recording apparatuses 150, 150a to 150g according to the embodiments of the invention, the spin torque oscillator 10 can be arranged on the reading side of the main magnetic pole 61. In this case, the magnetic recording layer 81 of the magnetic recording medium 80 firstly faces the spin torque oscillator 10, and secondly faces the main magnetic pole 61. That is, when the magnetic recording head of the magnetic recording apparatus has a reading potion 70, the spin torque oscillator 10 can be arranged on the reading side of the reading portion 70 of the main magnetic pole 61.

In any one of the magnetic recording apparatuses 150, 150a to 150g according to the embodiments of the invention, the spin torque oscillator 10 can arranged on the trailing side of the main magnetic pole 61. In this case, the magnetic recording layer 81 of the magnetic recording medium 80 firstly faces the main magnetic pole 61, and secondly faces the spin torque oscillator 10. That is, when the magnetic recording head of the magnetic recording apparatus has a reading portion 70, the spin torque oscillator 10 can be arranged on the reverse side of the reading portion 70 of the main magnetic pole 61.

Figure 33A:
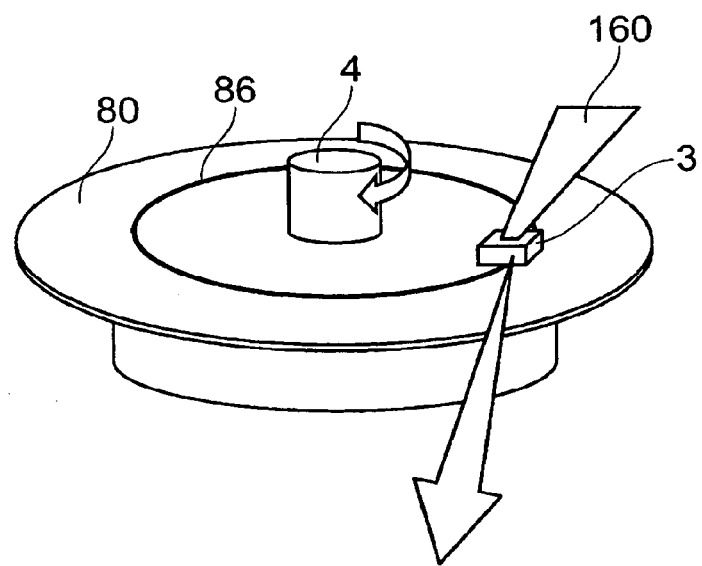
FIGS. 33A and 33B are typical perspective views illustrating configurations of the magnetic recording medium of a magnetic recording apparatus according to the fifth embodiment of the invention.
Figure 33B:
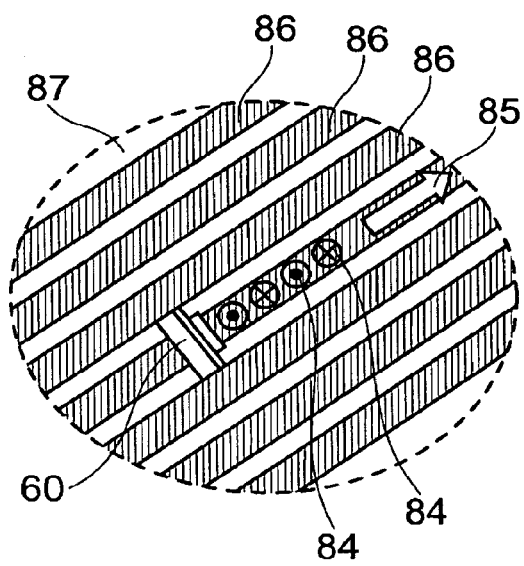

The magnetic recording medium which can be used for the magnetic recording apparatuses of the embodiments mentioned above is explained below. FIGS. 33A and 33B are typical perspective views illustrating configurations of the magnetic recording medium of a magnetic recording apparatus according to the embodiment of the invention. As illustrated in FIGS. 33A and 33B, the magnetic recording medium 80 used for the magnetic recording apparatus according to the embodiment of the invention has magnetic discrete tracks (recording tracks) 86 including magnetic grains which are separated from each other by a nonmagnetic material (or air) 87 and have magnetization perpendicularly oriented to the medium surface. When this magnetic recording medium 80 is rotated by the spindle motor 4 and moves in the medium moving direction 85, one of the magnetic recording heads according to the embodiments mentioned above is arranged in a prescribed position to thereby form recorded regions of magnetization 84. Thus, the magnetic recording medium 80 may be a discrete track medium where the adjacent recording tracks were formed to be separated by the nonmagnetic portions in the magnetic recording medium according to the embodiment of the invention.

The width (TS) of the recording portion facing the recording tracks 86 of the spin torque oscillator 10 is set to the width (TW) of the tracks 86 or larger and the recording track pitch or narrower. This setting allows it to suppress a reduction in the coercivity of the adjacent recording tracks due to a high frequency magnetic stray field from the spin torque oscillator 10. For this reason, in magnetic recording medium 80 of this example, the high frequency magnetic field assist recording can be focused just on a correct track which should be recorded.

According to this example, it is easier to use the high frequency assist recording apparatus for a narrow track rather than to use a perpendicular magnetic recording medium formed of an unprocessed continuous film. According to a conventional magnetic recording method, it was impossible to use FePt, SmCo, etc. as magnetic fine grains, because the magnetic fine grains of FePt, SmCo, etc. with extremely high magnetic anisotropy energy (Ku) were too difficult to switch the magnetization direction thereof, i.e., to write in. However, according to the high frequency assist recording method, it is possible to employ the magnetic fine grains of FePt, SmCo, etc. which are reduced even to a nanometer size, and to provide a magnetic recording apparatus capable of attaining a linear recording density much higher than that of the conventional magnetic recording method. The magnetic recording apparatus according to this embodiment can firmly record even on the discrete type magnetic recording medium 80 with a high coercivity, thereby allowing it to attain a high-density and rapid recording.

Figure 34A:
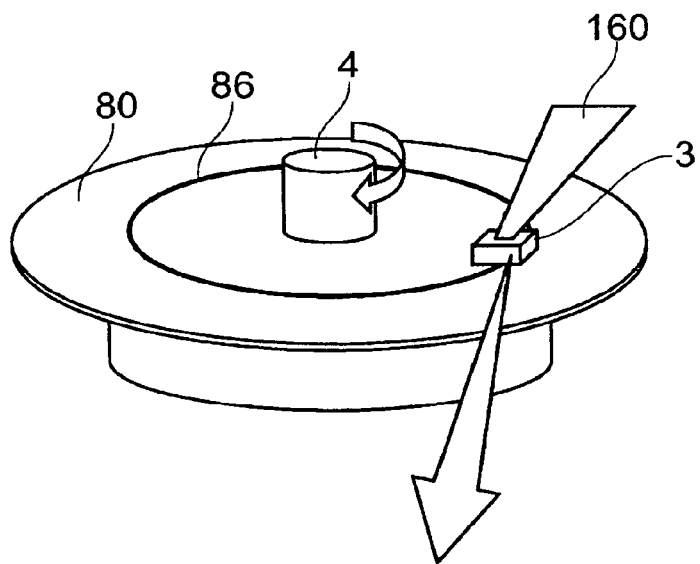
FIGS. 34A and 34B are typical perspective views illustrating configurations of another magnetic recording medium of a magnetic recording apparatus according to the fifth embodiment of the invention.
Figure 34B:
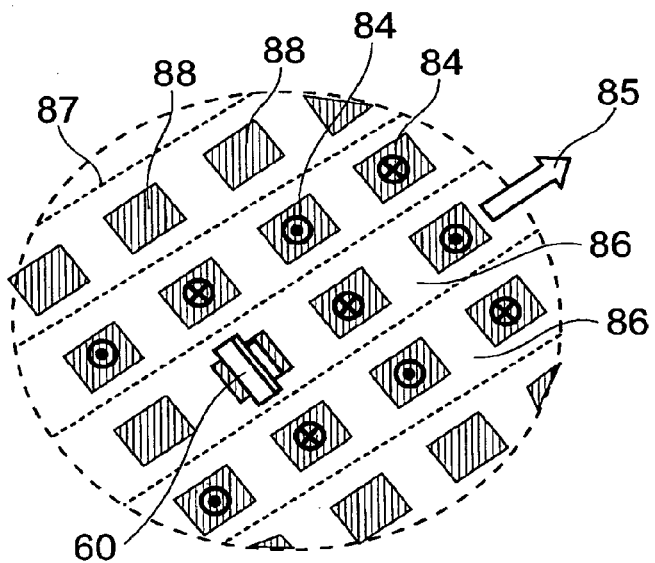

FIGS. 34A and 34B are typical perspective views illustrating configurations of another magnetic recording medium of the magnetic recording apparatus according to the embodiment of the invention. As illustrated in FIGS. 34A and 34B, another magnetic recording medium 80 which can be employed for the magnetic recording apparatus according to the embodiment of the invention has magnetic discrete bits 88 mutually separated by the nonmagnetic material 87. When this magnetic recording medium 80 is rotated by the spindle motor 4 and moves in the medium moving direction 85, the magnetic recording head according to the embodiment of the invention is arranged in a prescribed position to thereby form recorded magnetization 84. Thus, the magnetic recording medium 80 may be a discrete bit medium of which recording magnetic dots are separated by the nonmagnetic portions to be regularly arranged in the magnetic recording medium according to the embodiment of the invention.

The magnetic recording apparatus according to this embodiment can firmly record even on the discrete type magnetic recording medium 80 with a high coercivity, allowing it to attain a high-density and rapid recording.

The width (TS) of the recording potion facing the recording tracks 86 of the spin torque oscillator 10 is set to the width (TW) of the tracks 86 or larger and the recording track pitch or narrower. This setting allows it to suppress a reduction in the coercivity of the adjacent recording tracks due to a high frequency magnetic stray field from the spin torque oscillator 10. For this reason, in magnetic recording medium 80 of this example, the high frequency magnetic field assist recording can be focused just on the track which should be recorded. According to this example, enhancing the anisotropy energy (Ku) and the miniaturizing the magnetic discrete bits 88 possibly lead to a high frequency magnetic field assist recording apparatus capable of attaining a high recording density of 10 Tbits/inch$^2$ or more, as long as the heat fluctuation tolerance of the bits 88 is maintained under the environment of usage thereof.

Sixth Embodiment

Figure 35:
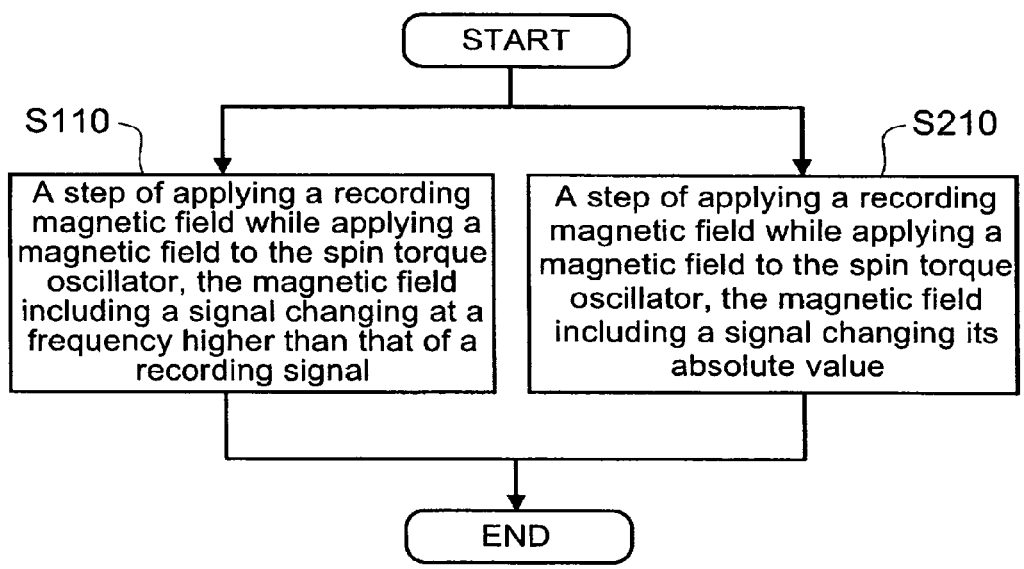
FIG. 35 is a flow chart illustrating a magnetic recording method according to a sixth embodiment of the invention.

FIG. 35 is a flow chart illustrating a magnetic recording method according to a sixth embodiment of the invention. The magnetic recording method according to this embodiment records information on the magnetic recording medium 80 using the main magnetic pole 61 to apply the recording magnetic field Hw (a first magnetic field) to the magnetic recording medium 80, and the spin torque oscillator 10 arranged near the main magnetic pole 61.

As illustrated in FIG. 35, in the magnetic recording method according to this embodiment, the recording magnetic field Hw is applied to the magnetic recording medium 80 while applying a magnetic field (the external magnetic field Hext, a second magnetic field), which includes a signal (the modulation signal Sm) changing at a frequency higher than that of the recording signal Sw, to the spin torque oscillator 10 (STEP S110).

At this time, Hext, Hext1 to Hext5 are used as the external magnetic field Hext including the modulation signal Sm as was explained with respect to FIG. 6E, FIG. 12E, FIG. 17E, FIG. 19D, and FIGS. 20B to 20F.

The recording magnetic field Hw (the first magnetic field) is applied to the magnetic recording medium 80 while applying a magnetic field (the external magnetic field Hext, the second magnetic field), which includes a signal (the modulation signal Sm1) having the same frequency as the recording signal Sw and changing its absolute value in one cycle, to the spin torque oscillator 10 (STEP S210).

At this time, the external magnetic field Hext including the modulation signal Sm1 as was explained with respect to FIG. 22E is used.

Using the magneto-resistive effect element recording method according to this embodiment allows it to modulate the frequency of the high frequency magnetic field Hac generated in the spin torque oscillator 10, and perform a stable high frequency magnetic field assist recording with a lower intensity high frequency magnetic field.

The embodiments of the invention have been explained with reference to the examples. However, the present invention is not limited to these examples. For example, when those skilled in the art appropriately select to combine two or more of the configurations of the spin torque oscillator, the magnetic recording head, the magnetic head assembly, and the magnetic recording apparatus from a known range, and the same effect as described above can be obtained, they are also incorporated in the present invention. What combined technically any two or more elements of the respective examples to the extent possible is included in the scope of the present invention as long as including the gist of the present invention.

When those skilled in the art appropriately change or modify the designs of the spin torque oscillator, the magnetic recording head, the magnetic head assembly, and the magnetic recording apparatus to practice all the changed or modified ones, and the same effect as described above can be obtained, they are also incorporated in the present invention.

In addition, those skilled in the art can change or modify the embodiments according to the invention. Then the changed or modified examples can be understood to be incorporated in the scope of the present invention.

What is claimed is:

1. A magnetic recording apparatus, comprising:
   a magnetic recording medium;
   a magnetic recording head including:
      a first magnetic pole to apply a recording magnetic field to the magnetic recording medium;
      a spin torque oscillator arranged parallel to the first magnetic pole; and
      a first coil to magnetize the first magnetic pole; and
   a signal processor to write and read a signal on the magnetic recording medium by using the magnetic recording head, the signal processor including a first current circuit to supply a recording current to the first coil, the recording current including a recording signal to be recorded on the magnetic recording medium, wherein
   the recording current includes either one of a signal changing at a frequency higher than that of the recording signal, and a signal having the same frequency as the recording signal and changing an absolute value thereof in one cycle.

2. The apparatus according to claim 1, wherein
   the first current circuit includes a recording signal current circuit and a modulation signal current circuit;
   the recording signal current circuit supplies a recording current including the recording signal; and
   the modulation signal current circuit supplies either one of a signal changing at a frequency higher than that of the recording signal, and a signal having the same frequency as the recording signal and changing an absolute value thereof in one cycle.

3. The apparatus according to claim 1, wherein
   the magnetic recording medium is a discrete track medium of which recording tracks adjacent to each other are formed to be separated by a nonmagnetic member.

4. The apparatus according to claim 1, wherein
   the magnetic recording medium is a discrete track medium of which recording magnetic bits are isolated by a nonmagnetic member to align regularly.

5. A method for recording information onto a magnetic recording medium using a magnetic recording apparatus comprising a signal processor including a current circuit configured to supply a recording current including a recording signal to be recorded on the magnetic recording medium, the method comprising:
   recording information onto the magnetic recording medium while applying a magnetic field to a spin torque oscillator arranged parallel to a magnetic pole which is magnetized by a coil to which the recording current is supplied, the recording current including either one of a first signal changing at a frequency higher than that of the recording signal to be recorded on the magnetic recording medium and a second signal having the same frequency as the recording signal and changing an absolute value thereof in one cycle.

6. The method according to claim 5, wherein the frequency of the first or second signal is lower than an oscillating frequency of the spin torque oscillator.

* * * * *